United States Patent
Papeer et al.

(10) Patent No.: US 12,035,453 B1
(45) Date of Patent: Jul. 9, 2024

(54) MULTI-DIRECTIONAL SHORT-WAVE METHODS AND SYSTEMS

(71) Applicant: L2X-LABS LTD, Jerusalem (IL)

(72) Inventors: Evgeny Papeer, Jerusalem (IL); Yechiel Refael Frank, Tzur-Hadassah (IL); Noa Kliss, Holon (IL); Yotam Mazuz-Harpaz, Jerusalem (IL)

(73) Assignee: L2X-LABS LTD, Jerusalem (IL)

( * ) Notice: Subject to any disclaimer, the term of this patent is extended or adjusted under 35 U.S.C. 154(b) by 0 days.

(21) Appl. No.: 18/382,646

(22) Filed: Oct. 23, 2023

Related U.S. Application Data

(60) Provisional application No. 63/535,350, filed on Aug. 30, 2023.

(51) Int. Cl.
*H05G 2/00* (2006.01)
*G02B 17/06* (2006.01)

(52) U.S. Cl.
CPC .......... *H05G 2/008* (2013.01); *G02B 17/061* (2013.01)

(58) Field of Classification Search
CPC ............................ H05G 2/008; G02B 17/061
See application file for complete search history.

(56) References Cited

U.S. PATENT DOCUMENTS

| | | | |
|---|---|---|---|
| 10,588,210 B1 | 3/2020 | Vinokhodov et al. | |
| 10,887,973 B2 | 1/2021 | Ivanov et al. | |
| 11,086,226 B1 | 8/2021 | Frank | |
| 11,252,810 B2 | 2/2022 | Ivanov et al. | |
| 2021/0092824 A1* | 3/2021 | Ivanov | H05G 2/006 |

FOREIGN PATENT DOCUMENTS

WO 2021247212 A1 12/2021

OTHER PUBLICATIONS

E. V. Marley, et al. Using L-shell x-ray spectra to determine conditions of non-local thermal dynamic equilibrium plasmas. Rev. Sci. Instrum. Oct. 1, 2018; 89 (10): 10F106. https://doi.org/10.1063/1.5039357.
Yechiel Frank, et al; Hydrodynamic conditions in laser irradiated buried layer experiments. Phys. Plasmas Jun. 1, 2020; 27 (6): 063301. https://doi.org/10.1063/5.0004506.

* cited by examiner

*Primary Examiner* — Nicole M Ippolito
*Assistant Examiner* — Hanway Chang
(74) *Attorney, Agent, or Firm* — CANTOR COLBURN LLP

(57) ABSTRACT

A Short-Wave Radiation (SWR) system comprising: (i) a light assembly, comprising at least one light source and being configured to: (a) illuminate a front side of an ionization target with first illumination; and (b) illuminate a back side of the ionization target with second illumination; (ii) a controller, configured to control the light assembly for illuminating the ionization target from the front side of the ionization target using the first illumination and at least partly concurrently illuminating the ionization target from the back side of the ionization target using the second illumination; and (iii) an optical assembly configured to collect SWR emitted from the front side of the ionization target and to direct the collected SWR toward a designated beam direction of the SWR system, wherein the SWR emitted from the front side results from a target illumination scheme that comprises at least the first illumination and the second illumination.

30 Claims, 16 Drawing Sheets

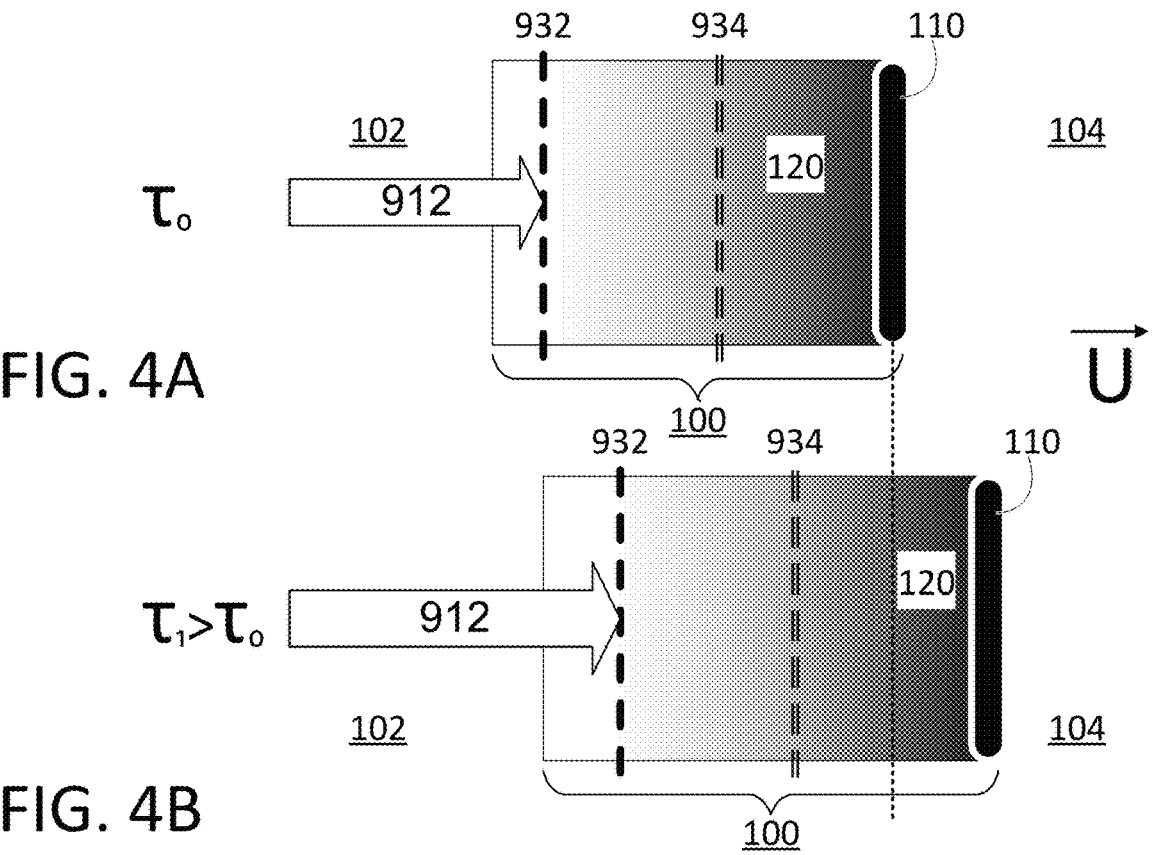
FIG. 4A
FIG. 4B
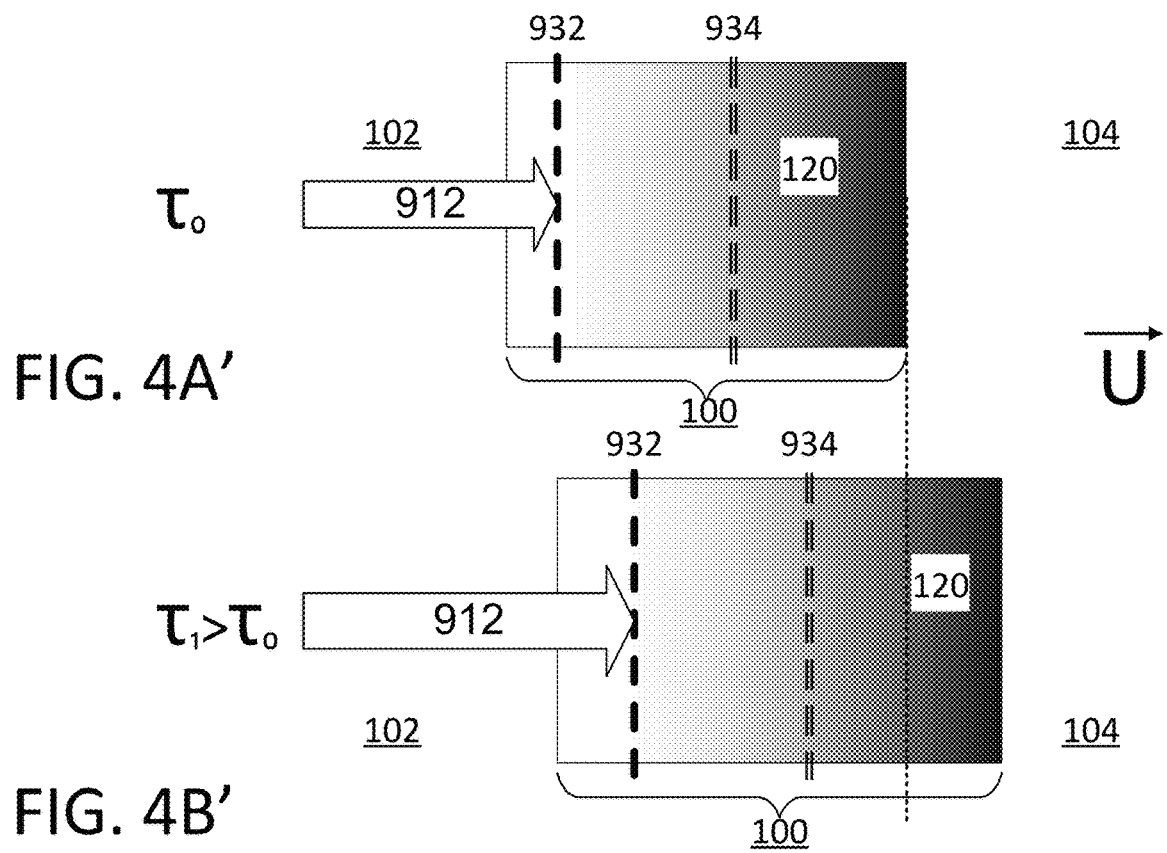
FIG. 4A'
FIG. 4B'

510 — Illuminating an ionization target according to a target illumination scheme that comprises at least a first illumination of a front side of the ionization target and a second illumination of a back side of the ionization target, thereby inducing emission of SWR radiation from the front side (and possibly also from the back side)

520 — Collecting SWR emitted from the front side of the ionization target

522 — Collecting SWR emitted from the back side of the ionization target

530 — Directing the collected SWR toward at least one designated beam direction of the SWR system

610 — Illuminating a first side of an ionization target, thereby ionizing the first side of the ionization target to emit first SWR emission having a first central SWR propagation direction

620 — Illuminating a second side of the ionization target, thereby ionizing the second side of the ionization target to emit second SWR emission having a second central SWR propagation direction

630 — Collecting the first SWR emission by a first optical assembly, the collecting comprising collecting first central SWR emission propagating along the first central SWR propagation direction

640 — Collecting the second SWR emission by a second optical assembly, the collecting comprising collecting second central SWR emission propagating along the second central SWR propagation direction

650 — Directing the first SWR emission and the second SWR emission towards at least one optical port

MULTI-DIRECTIONAL SHORT-WAVE METHODS AND SYSTEMS

RELATED APPLICATIONS

This application claims priority from U.S. provisional patent application Ser. No. 63/535,350 filed on Aug. 30, 2023, and titled "Multi-Directional Short-Wave Systems and Methods".

FIELD

The invention related to short-wave systems and methods, and especially to extreme ultraviolet (EUV) systems and methods. Such systems and methods may pertain to short-wave based technology (e.g., lithography and EUV inspection machines, systems, and methods) and especially to short-wave light sources utilized for such short-wave systems and methods.

BACKGROUND

Short-wave Radiation (SWR), i.e., radiation having a wavelength shorter than 200 nm, has a wide range of applications in fields such as lithography, material processing, and medical treatment. In particular, the use of UV radiation in lithography has become increasingly important in the semiconductor industry, where it is used to pattern photoresist and other materials with high precision. However, conventional SWR light sources often suffer from limited power, stability and energy efficiency, which can limit their usefulness in industrial applications. There is therefore a need for a new and improved light source that can generate and emit SWR radiation with high power, stability and energy efficiency, making it suitable for use in a variety of applications, such as lithography and material processing.

Ionizing radiation is a type of electromagnetic radiation that has sufficient energy to remove tightly bound electrons from atoms, a process known as ionization. Ionizing radiation is found in several sources, including nuclear reactions, radioactive decay, and high-energy particle accelerators. In recent years, there has been increasing interest in using ionizing radiation, specifically extreme ultraviolet (EUV) light, as a source for photolithography, a process used in the manufacturing of microchips and other electronic devices. Photolithography involves using light to transfer a pattern onto a substrate, such as a silicon wafer, and EUV light has the potential to significantly improve the resolution and accuracy of this process.

Extreme ultraviolet (EUV) light is a type of electromagnetic SWR. While the exact definitions used by different scientists may vary, within the context of this disclosure the term EUV pertains to a spectral range which includes at least the electromagnetic radiation with wavelengths ranging from 10-120 nm. EUV light is difficult to generate and requires specialized equipment, making it challenging to produce on high volume manufacturing condition which require high output power of the EUV system and efficient conversion of electricity power to outputted EUV (the same is also true more generally for SWR systems). There are several different approaches to generating EUV light, including plasma-based and laser-based methods, and researchers are actively working to develop more efficient and cost-effective ways of producing EUV light for use in lithography and other applications.

U.S. Pat. No. 10,588,210 by Vinokhodov, Aleksandr Yurievich, et al., published on Mar. 10, 2020 and entitled "High Brightness Short-Wavelength Radiation Source (Variants)" discusses a high-brightness short-wavelength radiation source that contains a vacuum chamber with a rotating target assembly having an annular groove, an energy beam of a pulsed laser beam focused on the target, a useful short-wavelength radiation beam coming out of the interaction zone, wherein the target is a layer of molten metal formed by a centrifugal force on a surface of the annular groove facing a rotation axis. A replaceable membrane made of carbon nanotubes may be installed on a pathway of the short-wavelength radiation beam for debris mitigation. Parameters such as laser pulse repetition rate are chosen in order to suppress debris. In other embodiments the energy beam is the electron beam produced by an electron gun and the rotating target assembly is a rotating anode.

U.S. Pat. No. 10,887,973 by Ivanov, Vladimir Vitalievich, et al., published on Jan. 5, 2021, and entitled "High Brightness Laser-Produced Plasma Light Source" discusses a laser-produced plasma light source which contains a vacuum chamber with a rotating target assembly providing a target in an interaction zone with a laser beam focused on the said target, which is a molten metal layer. A debris shield is rigidly mounted to surround the interaction zone, said shield comprising only two opening forming an entrance for the laser beam and an exit for a short-wavelength radiation beam. The means for debris mitigation can additionally include: the rotation of target with high linear velocity exciding 80 m/s; the orientation of the short-wavelength radiation beam and/or of the laser beam at an angle of less than 45° to the target surface, a nozzle supplying a high-speed gas flow to the interaction zone, etc. The technical result is the creation of the high-brightness low-debris sources of soft X-ray, EUV and VUV light at wavelengths of 0.4 to 200 nm.

U.S. Pat. No. 11,252,810 by Ivanov, Vladimir Vitalievich, et al., published on Feb. 15, 2022 and entitled "Short-Wavelength Radiation Source with Multisectional Collector Module and Method of Collecting Radiation" discusses a radiation source that contains a collector module comprising an optical collector, positioned in a vacuum chamber with an emitting plasma, further comprising a means for debris mitigation which include at least two casings arranged to output debris-free homocentric beams of the short-wavelength radiation, coming to the optical collector preferably consisting of several identical mirrors. Outside each casing there are permanent magnets that create a magnetic field inside the casings to mitigate charged fraction of debris particles and provide the debris-free homocentric beams of short-wavelength radiation. Other debris mitigating techniques are additionally used. Preferably the plasma is laser-produced plasma of a liquid metal target supplied by a rotating target assembly to a focus area of a laser beam. The technical result of the invention is the creation of high-powerful high-brightness debris-free sources of short-wavelength radiation with large, preferably more than 0.25 sr, collection solid angle.

U.S. Pat. No. 11,086,226 by Frank, Yechiel R., published on Aug. 10, 2021 and entitled "Liquid tamped targets for extreme ultraviolet lithography" discusses an EUV light source including a vacuum chamber, a droplets injector operatively connected to the vacuum chamber for directing the droplets into the vacuum chamber, droplets produced by the droplets injector wherein the droplets have one side and another side opposite the one side, the droplets including a solid higher Z bead in a low Z liquid, and at least one laser beam directed onto the one side of the droplets.

Limitations and disadvantages of conventional, traditional, and proposed approaches will become apparent to one of skill in the art, through comparison of such approaches with the subject matter of the present application as set forth in the remainder of the present application with reference to the drawings.

GENERAL DESCRIPTION

According to an aspect of the invention, there is disclosed a Short-Wave Radiation (SWR) system, which includes at least a light assembly whose illumination can ionize ionization targets resulting in emission of SWR, an optical assembly which collects and directs at least a portion of the emitted SWR, and a controller of the light assembly.

The light assembly includes one or more light sources (e.g., lasers), and is capable of illuminating the ionization from two opposing sides (referred to as the "front side" and the "back side" of the ionization target) according to a target illumination scheme provided by the controller, which results in emission of SWR from the target.

As discussed below in greater detail, the illumination of the ionization target from both sides can be tailored to any one of several use cases and to any one of several ways to improve on the one-sided illumination known in the art. As discussed below in greater detail, the illumination from both sides may optionally be done in a balanced fashion, but imbalanced illumination may also be used beneficially for many desired outcomes (e.g., balanced in geometry, power, timing, wavelength, type of light source, and so on).

Emitted SWR may be collected from either one side of the ionization target (e.g., the so called "front side" of the target) or from both sides of the ionization target, depending on the specific implementations and needs of the larger system. As discussed below in greater detail, two sided SWR collection (if implemented) may optionally be done in a balanced fashion, but imbalanced SWR collection illumination may also be used beneficially for many desired outcomes, as also discussed below in greater detail.

According to an aspect of the invention, there is disclosed a Short-Wave Radiation (SWR) system, the system including at least:
  a. a light assembly, including at least one light source, the light assembly being configured to: (i) illuminate a front side of an ionization target with first illumination; and (ii) illuminate a back side of the ionization target with second illumination.
  b. A controller, configured to control the light assembly for illuminating the ionization target from the front side of the ionization target using the first illumination and at least partly concurrently illuminating the ionization target from the back side of the ionization target using the second illumination.
  c. An optical assembly configured to collect SWR emitted from the front side of the ionization target and to direct the collected SWR toward a designated beam direction of the SWR system, such that the SWR emitted from the front side results from a target illumination scheme that includes at least the first illumination and the second illumination.

According to a further aspect of the invention, the controller may be configured to: (i) determine bidirectional illumination parameters, which guarantee that illuminating the ionization target using the bidirectional illumination parameters would keep a velocity component of a preserved part of the ionization target along a central propagation direction of the first illumination under 1 m/s; and (ii) trigger bidirectional illumination of the ionization target in compliance with the determined bidirectional illumination parameters, thereby maintaining the speed under 1 m/s.

According to a further aspect of the invention, the controller may be configured to control the light assembly to initiate the second illumination at least 1 ns after the initiation of the first illumination.

According to a further aspect of the invention, the controller may be configured to end the second illumination before the end of the first illumination.

According to a further aspect of the invention, an energy of the second illumination may be lower by a ratio of at least 1:2 with respect to an energy of the first illumination.

According to a further aspect of the invention, the SWR output of the SWR system consists of SWR collected by the optical assembly from the front side of the ionization target.

According to a further aspect of the invention, the light assembly may include a first group of at least one light source collectively configured to emit the first illumination, and a second group of at least one light source collectively configured to emit the second illumination; the SWR output of the SWR system may be implemented such that it consists of SWR collected by the optical assembly from the front side of the ionization target.

According to a further aspect of the invention, the second illumination may increase the amount of SWR emitted from the first side by at least 10%.

According to a further aspect of the invention, an optical conversion efficiency of SWR generation being a ratio between: (a) the power of SWR collected from the front side by the optical assembly, and (b) the light power of the first illumination may be at least 20% higher when both the front side and the back side of the ionization target are illuminated compared to the when only one side of the ionization target is illuminated.

According to a further aspect of the invention, a central wavelength of the first illumination may be longer than a central wavelength of the second illumination by at least 20%.

According to a further aspect of the invention, the light assembly may include a group of at least one gas laser collectively configured to emit the first illumination, and a group of at least one solid-state laser collectively configured to emit the second illumination.

According to a further aspect of the invention, the controller may be further configured to control a front side preliminary illumination and a back side preliminary illumination of the ionization target, prior to the first illumination and the second illumination, in order to modify a shape of the ionization target.

According to a further aspect of the invention, the first illumination and the second illumination may modify a shape of the ionization target, and the target illumination scheme may further include a third illumination controllably irradiated toward the front side, such that the third illumination ionizes material of the ionization target, resulting in emission of the SWR toward the optical assembly.

According to a further aspect of the invention, the controller may be configured to control the emission of the first illumination and of the second illumination for bidirectional reshaping of the ionization target, and to control emission of a third illumination toward the first side which ionizes material of the ionization target, resulting in emission of the SWR toward the optical assembly.

According to a further aspect of the invention, a thickness of the ionization target when illuminated by the first illumination and the second illumination may meet a thinness criteria ensuring that parts of the ionization target are concurrently heated by both the first illumination and the second illumination.

According to a further aspect of the invention, a thickness of a preserved part of the ionization target between the first side and the second side along a cross-target axis is less than 250 nm upon beginning of the second illumination.

According to a further aspect of the invention, the controller may be further configured to control spatial alignment of the first illumination and of the second illumination during a concurrent emission of the first illumination and of the second illumination.

According to a further aspect of the invention, the controller may be configured to: (i) apply bidirectional illumination parameters for minimizing an amount of neutral ejecta ejected from the ionization target, thereby minimizing deterioration of the system; and (ii) trigger bidirectional illumination of the ionization target in compliance with the determined bidirectional illumination timing parameters.

According to a further aspect of the invention, the optical assembly may be further configured to collect backward-emitted SWR emitted from the second side of the ionization target and to direct the collected backward-emitted SWR toward a predefined beam direction of the SWR system.

According to a further aspect of the invention, the system may further include an electromagnetic ion steering module operable to induce electromagnetic forces for steering ions away from the ionization target.

It is that the aforementioned SWR system may include any combination of one or more of the aspects discussed above, and that such combinations are not explicitly introduced in the general descriptions for reasons of brevity.

According to an aspect of the invention, there is disclosed a method for generating Short-Wave Radiation (SWR), the method including: (i) illuminating an ionization target according to a target illumination scheme that includes at least a first illumination of a front side of the ionization target and a second illumination of a back side of the ionization target, thereby inducing emission of SWR radiation from the front side; (ii) collecting the SWR emitted from the front side of the ionization target; and (iii) directing the collected SWR toward a designated beam direction of the SWR system.

According to a further aspect of the invention, the method may include: (i) determining bidirectional illumination parameters which guarantee that illuminating the ionization target using the bidirectional illumination parameters would keep a velocity component of a preserved part of the ionization target along a central propagation direction of the first illumination under 1 m/s; and (ii) triggering bidirectional illumination of the ionization target in compliance with the determined bidirectional illumination parameters, thereby maintaining the speed under 1 m/s.

According to a further aspect of the invention, the method may include initiating the first illumination, and initiating the second illumination at least 1 ns after the initiation of the first illumination.

According to a further aspect of the invention, the method may include terminating emission of the second illumination at least 1ns before the end of the first illumination.

According to a further aspect of the invention, the method may be implemented such that an energy of the second illumination is lower by a ratio of at least 1:2 with respect to an energy of the first illumination.

According to a further aspect of the invention, the method may include outputting SWR emission consisting of SWR collected by the optical assembly from the front side of the ionization target and discarding any SWR radiation emitted from the back side of the ionization target.

According to a further aspect of the invention, the method may be implemented such that a central wavelength of the first illumination is longer than a central wavelength of the second illumination by at least 20%.

According to a further aspect of the invention, the method may include bidirectionally shaping the ionization target prior to the emission of the first illumination and of the second illumination using at least a front side preliminary illumination and a back side preliminary illumination.

According to a further aspect of the invention, the method may include bidirectionally shaping the ionization target using the first illumination and the second illumination, and ionizing the ionization target after the bidirectional shaping using a third illumination toward the front side, resulting in emission of the SWR toward the optical assembly.

According to a further aspect of the invention, the method may be implemented such that a thickness of the ionization target when illuminated by the first illumination and the second illumination meets a thinness criteria ensuring that parts of the ionization target are concurrently heated by both the first illumination and the second illumination.

According to a further aspect of the invention, the method may be implemented such that a thickness of a preserved part of the ionization target between the first side and the second side along a cross-target axis is less than 250 nm upon beginning of SWR emission from the ionization target.

According to a further aspect of the invention, the method may include controlling spatial alignment of the first illumination and of the second illumination during a concurrent emission of the first illumination and of the second illumination.

According to a further aspect of the invention, the method may include: (i) determining bidirectional illumination timing parameters for minimizing an amount of neutral ejecta ejected from the ionization target, thereby minimizing deterioration of the system; and (ii) bidirectionally illuminating the ionization target in compliance with the determined bidirectional illumination timing parameters.

According to a further aspect of the invention, the method may include applying electromagnetic forces within a vacuum chamber in which the ionization target is ablated, for steering ions away from the ionization target.

According to a further aspect of the invention, the method may include collecting backward-emitted SWR emitted from the back side of the ionization target and directing the collected backward-emitted SWR toward a predefined beam direction of the SWR system.

It is that the aforementioned method for SWR generation may include any combination of one or more of the aspects discussed above, and that such combinations are not explicitly introduced in the general descriptions for reasons of brevity.

According to an aspect of the invention, there is disclosed a non-transitory computer-readable medium for controlling a SWR system, including instructions stored thereon, that when executed on a processor, perform the steps of:

a. Determining bidirectional illumination parameters for a bidirectional target illumination scheme, the determining including: (i) determining first illumination parameters for first illumination of a first side of an ionization target, the first illumination parameters including at least first timing parameters and first power parameters;

and (ii) determining second illumination parameters for first illumination a back side of the ionization target, the second illumination parameters including at least second timing parameters and second power parameters. The first illumination parameters and the second illumination parameters are such which dictate different operation settings for the first illumination and for the second illumination in at least one of: illumination start time, illumination end time, illumination duration, power level, and central wavelength.

b. triggering illuminations of the ionization target according to the bidirectional target illumination scheme, including triggering at least the first illumination and the second illumination, thereby inducing emission of SWR radiation from the front side toward an optical assembly which is configured to collect and direct the SWR radiation toward a designated beam direction of the SWR system.

BRIEF DESCRIPTION OF THE DRAWINGS

In order to understand the invention and to see how it may be carried out in practice, embodiments will now be described, by way of non-limiting examples only, with reference to the accompanying drawings (each in accordance with examples of the presently disclosed subject matter), in which:

FIGS. 4A and 4B are schematic cross-section diagrams schematically illustrating various stages of illumination-target interaction when only a single side of the ionization target is illuminated by primary illumination;

FIGS. 4A'-4F' correspond to FIGS. 4A-4F, without requiring a non-ablated center for each target;

FIGS. 9 and 10 illustrate methods for generating SWR;

Figure 1A:
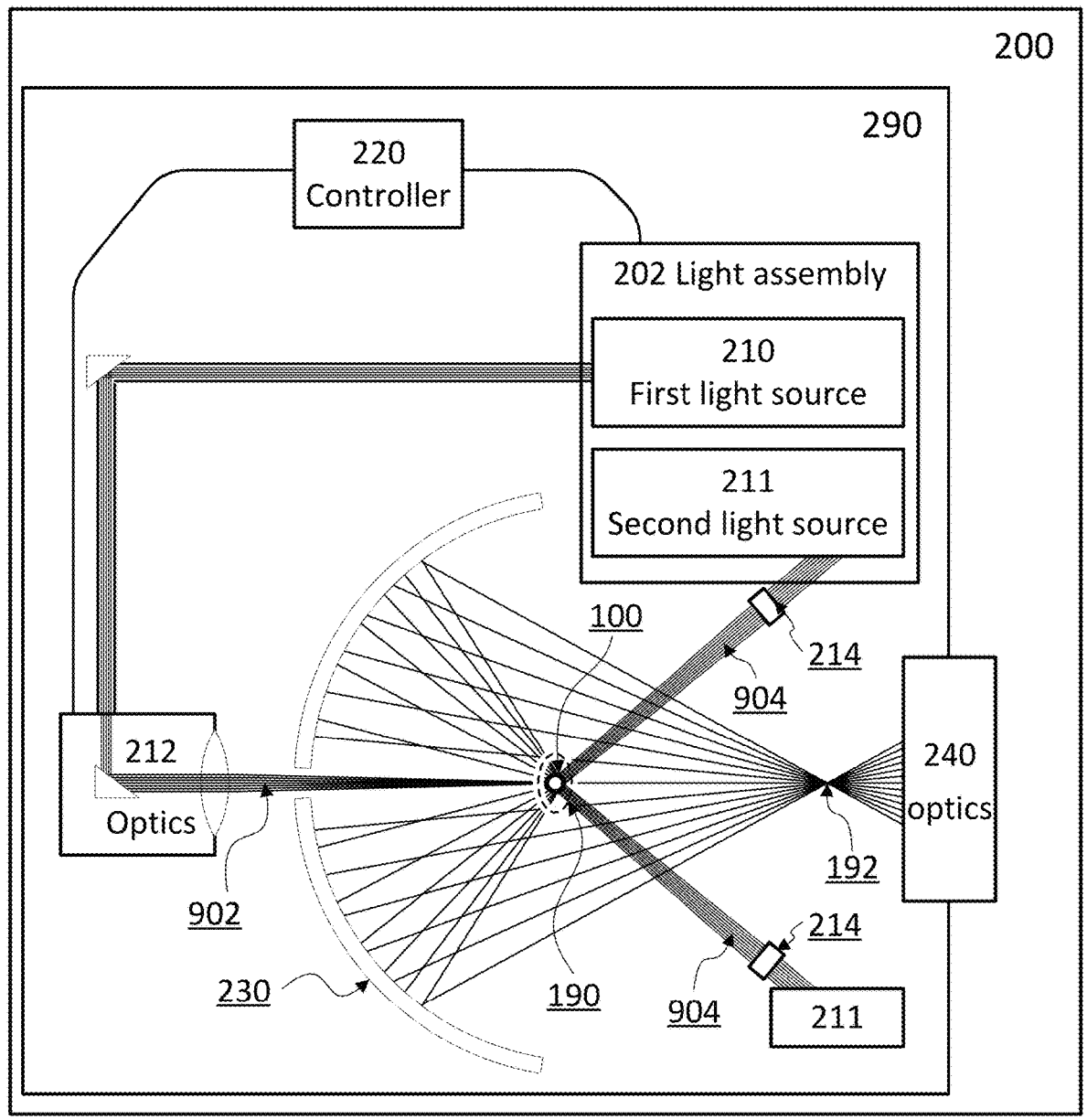
FIGS. 1A, 1B, and 1C are schematic diagrams illustrating examples of a SWR system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the drawings and descriptions set forth, identical reference numerals indicate those components that are common to different embodiments or configurations.

As used herein, the phrase "for example," "such as", "for instance" and variants thereof describe non-limiting embodiments of the presently disclosed subject matter. It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter one or more steps illustrated in the figures may be executed in a different order and/or one or more groups of steps may be executed simultaneously and vice versa. The figures illustrate a general schematic of the system architecture in accordance with an embodiment of the presently disclosed subject matter. Each module in the figures can be made up of any combination of software, hardware and/or firmware that performs the functions as defined and explained herein. The modules in the figures may be centralized in one location or dispersed over more than one location.

Any reference in the specification to a method should be applied mutatis mutandis to a system capable of executing the method and should be applied mutatis mutandis to a non-transitory computer readable medium that stores instructions that once executed by a computer result in the execution of the method. Any reference in the specification to a system should be applied mutatis mutandis to a method that may be executed by the system and should be applied mutatis mutandis to a non-transitory computer readable medium that stores instructions that may be executed by the system.

Figure 1B:
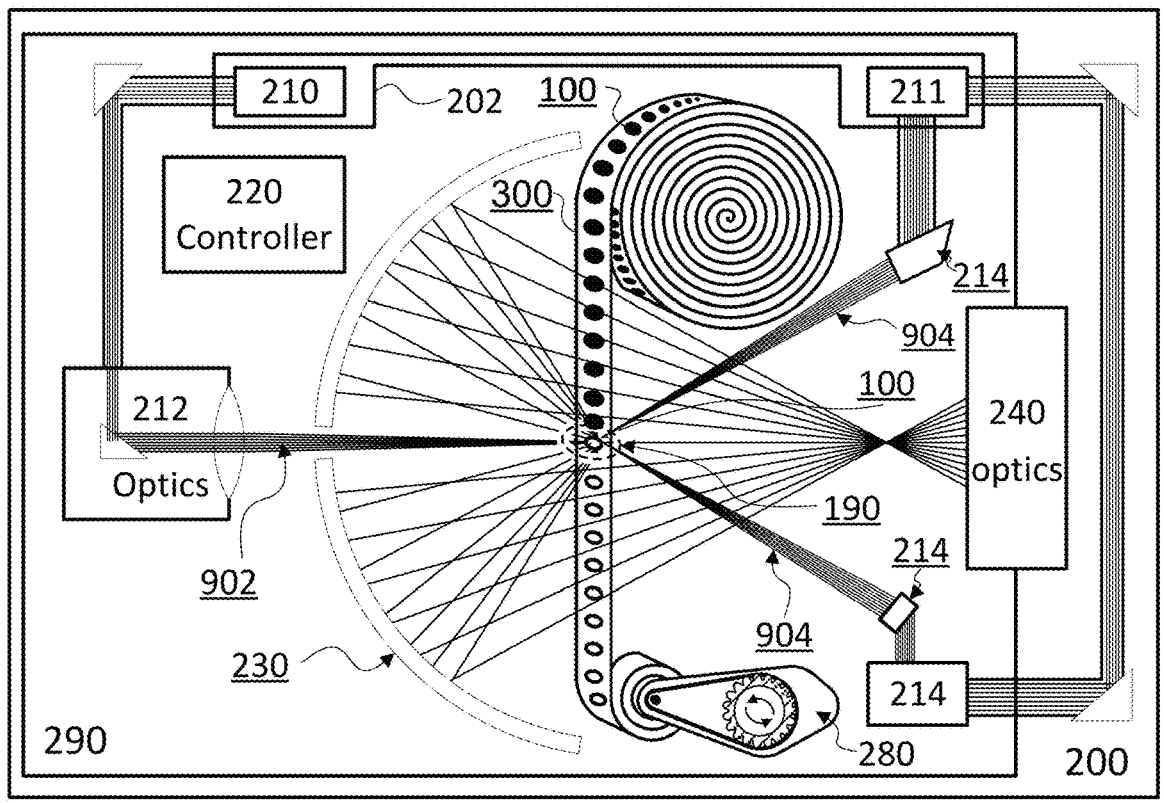
Figure 1C:
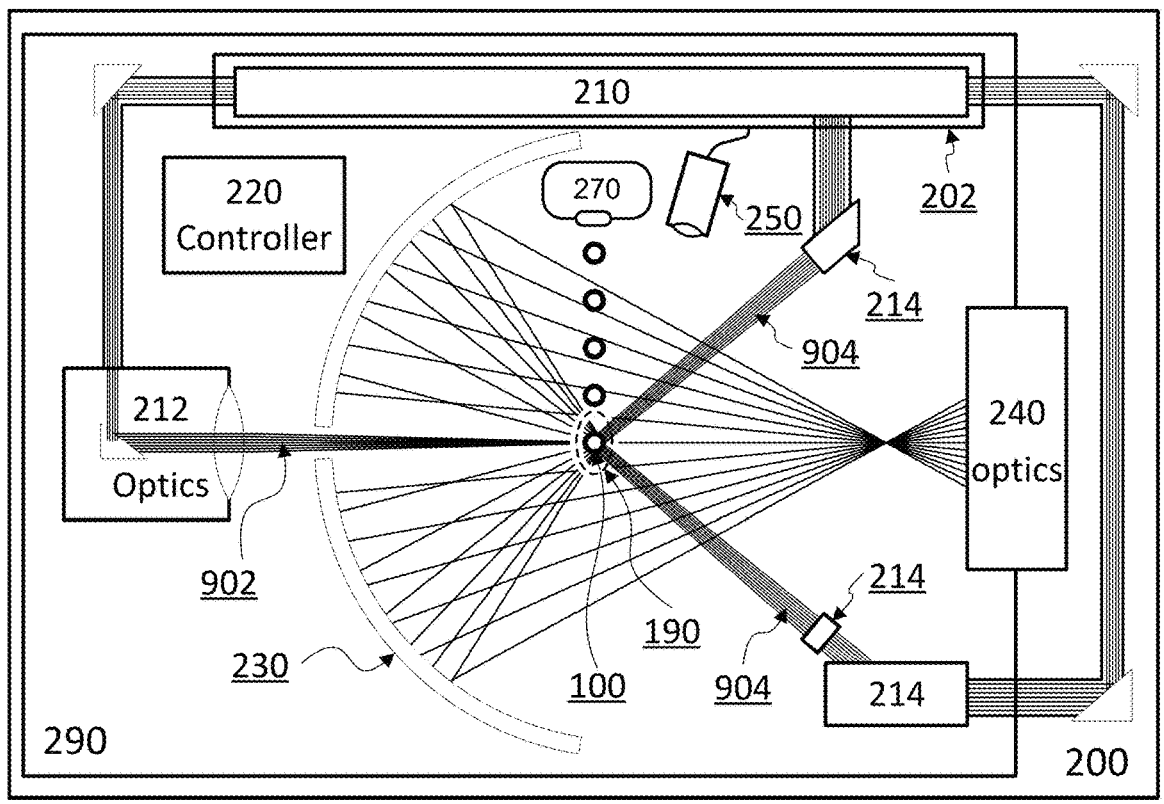

FIGS. 1A, 1B, and 1C are schematic diagrams illustrating examples of system 200, in accordance with examples of the presently disclosed subject matter. System 200 is operable to generate Short Wave Radiation (SWR, e.g., EUV light), and may optionally also include additional components which are not part of the light emission subsystem. For example, such components may utilize SWR generated by system 200 (e.g., EUV light) for different uses in chip manufacturing (e.g., lithography, inspection), or any other field, such as imaging, shadowgraphy, etc. It will be clear to a person who is of ordinary skill in the art that many other conventional components are also not illustrated or discussed (e.g., power source), as such a person may understand the invention without undue explanation of commonplace components and functionalities. The same holds with respect to figures and description of other aspects of the invention below.

The generated SWR may have a characteristic wavelength of 13.5 nm, but other SWR wavelengths may also be emitted and optionally utilized, depending on the intended use of the SWR. For example, some use cases utilize SWR having wavelength of 6.7 nm or shorter. Within the context of this disclosure, the terms short-wave radiation (SWR) pertains to all electromagnetic radiation having wavelength that is shorter than 200 nm, and especially to radiation between 0.4-200 nm. Short-wave radiation includes different parts of the electromagnetic spectrum, such as EUV and X-ray. The emitted SWR radiation (by system 200 or by any of the systems and methods disclosed herein) may have its power peak at different wavelengths, for example in order to suit the intended use of the SWR. For example, the SWR generated using the systems and methods discussed below may have a peak power at a wavelength of 1.7 nm, 4.2 nm, 6.7 nm, 13.5 nm, 50 nm, 100 nm, etc. The actual emitted SWR spectrum may be broad with respect to the desired wavelength range (e.g., 13.5 nm±1%), and the undesired emitted SWR may be filtered out, emitted anyway, lost in the system (e.g., due to optics being tailored to specific wavelengths), or handled in any other suitable fashion. By way of example, some lithography uses may require 13.5 nm±1%, while other applications may require broader spectrum.

System 200 includes light assembly 202 which includes at least one light source (e.g., first light source 210, second light source 211) which provides energy for the SWR generation process in system 200 and which is configured to illuminate ionization target 100, thereby at least partly ionizing such target (and exciting the ions of such ionized parts of target 100 for emitting SWR, e.g., EUV light). Light assembly 202 is configured to illuminate the front side 102 of the ionization target 100 with first illumination 902 and to illuminate the back side 104 of the ionization target 100 with second illumination 904. It is noted that different light sources (e.g., 210, 211) may be controlled by the same controller, but this is not necessarily so. It is noted that different light sources (e.g., 210, 211) may be physically connected to one another in different degrees of connectedness (e.g., attached to a single chassis or not). For example, system 200 may optionally include a master clock signal or a "master controller" (e.g., as a part of controller 220), and the different light sources (e.g., 210, 211) may be operated based on that master clock signal but otherwise independently of one another (e.g., be different illuminations systems considered part of a single light assembly 202 in function rather than in more sophisticated interconnectedness). Optionally, optics 212 and 214 may be controlled by a "master controller" or a feedback loop between the two optical sub-systems 212 and 214 components.

Optionally the light assembly 202 may include one or more light sources 210 uniquely defining the propagation direction of the first illumination 902 (e.g., the front side main ionization illumination) and thus uniquely defining the direction of center of mass momentum of a preserved part of ionization target which consist of at least one of the following: (a) the non-ablated material of the ionization target 110, (b) the target bulk (as defined below), and (c) target material exceeding the critical density (as defined below), also referred to as "over dense material", and located such that it is, can or ultimately will be subject to illumination. It is noted that whenever the term "preserved part" is used throughout the disclosure, any one of the definitions (a), (b), and (c) may apply. It is noted that the term "preserved part" pertains to ionization material that, while possibly affected to a small degree by the heating responsible for the ablation of lost parts of the target (e.g., converted to ejecta), the material of the "preserved part" remains as part of a bulk of ionizable material which can subject to additional heating to emit SWR. In another example, the light assembly 202 may be configured to illuminate one of the sides of ionization target 100 (i.e., front side 102 or back side 104) using multiple light sources arranged in a symmetric pattern (e.g., each hitting ionization target 100 at a predetermined angle). In another example, the light assembly 202 may be configured to illuminate one of the sides of ionization target 100 (i.e., front side 102 or back side 104) using multiple light sources arranged in an asymmetric pattern (e.g., each hitting ionization target 100 at a predetermined angle). In the context of the present disclosure, the term "non-ablated material" encompasses the portion of a target substance that, while being subjected to light interaction, has not been ionized into plasma. This material may transition from solid to liquid or from liquid to gas due to energy absorption but is not ionized. Consequently, it includes the substance in its solid, liquid, and gaseous states prior to plasma formation.

Optionally, light of a single first light source may be split into several light beams projected onto ionization target 100 from different predetermined directions, possibly in a symmetric fashion. Each one of the multiple light sources impacts pressure impulse (and a respective momentum) on the ionization target causing a non-zero velocity component of motion in a respective illumination propagation direction, resulting in a motion of the preserved part of the ionization target 100 along a central propagation direction (which could also be defined as the vector sum of the multiple acquired momenta). In many cases, especially in cases in which symmetrical illumination is used, this central propagation direction may closely coincide with the vector sum of the respective propagation directions of the multiple illuminations hitting the front side of the ionization target if the respective powers of the multiple light sources are controlled to be nearly equal, e.g., by controller 220.

It should be noted that targets 100 may be delivered to a place in which they can be irradiated in various technologies, many of which are known in the art, and are therefore described only briefly. Optionally, system 200 may include a target injector 270 (e.g., as exemplified in FIG. 1C), specialized for the precise injection of droplets of ionizable target material (e.g., tin) into the paths of first illumination 902 and of second illumination 904. Injector 270 may include a piezoelectric actuator, a nozzle, and a feedback control system. The piezoelectric actuator controls pressurized administration that forces the ionizable target material through the nozzle to create droplets of a specified size and velocity. The feedback control system, if implemented, may utilize high-speed cameras and/or other sensors, dynamically adjusting various parameters to ensure consistent droplet size, velocity, and timing, thereby optimizing the SWR generation process. It is noted that system 200 may optionally utilize a continuous target material as a target, where different parts of that continuous material serve as target 100 at different times (e.g., the parts which are located within region 190 at different times. For example, the target delivery module 270 may produce a continuous stream of thin target material. Thus, while the targets 100 used by system 200 may be discrete targets, each being irradiated independently, this is not necessarily so.

In another option, exemplified in FIG. 1B, system 200 includes a motorized continuous target carrier which comprises a continuous carrying structure 300 to which a plurality of targets are affixed while the continuous carrying structure 300 is in motion which causes movement of at least some of the plurality of targets 100 with respect to at least one light source of system 200. The targets 100 may be organized on the continuous carrying structure 300 in any suitable fashion, include 1D, 2D or 3D arrangements. The continuous carrying structure 300 may be made from any suitable material, such as thin strong film, rigid rotating disc, carrier belt, and so on. Targets 100 may be prefabricated on the continuous carrying structure 300 or applied to it during operation of system 200. System 200 may also include a mechanism 280 to support and progress continuous carrying structure 300, such that different targets 100 are delivered to the irradiation location (e.g., region 190) at different times.

Figure 2A:
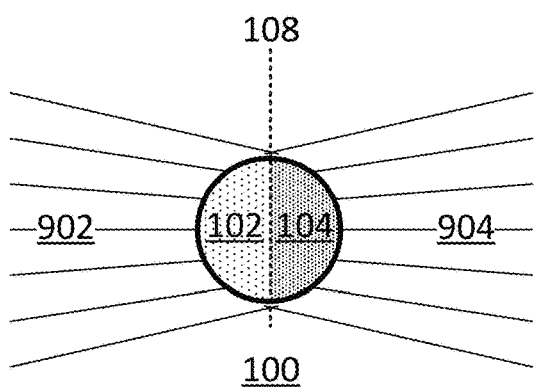
FIGS. 2A-2D illustrate the front side and the back side of an ionization target being bidirectionally illuminated by different illuminations.
Figure 2B:
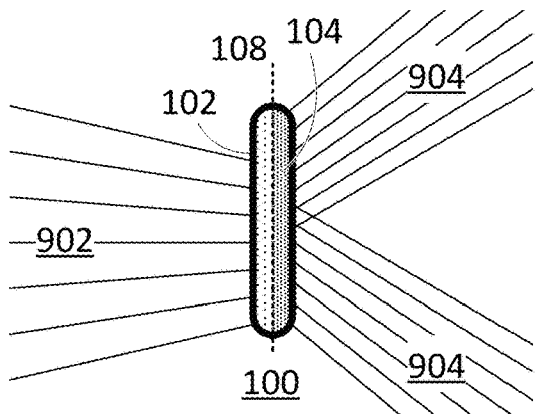
Figure 2C:
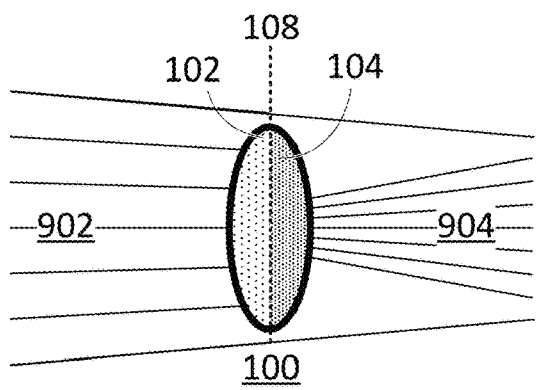
Figure 2D:
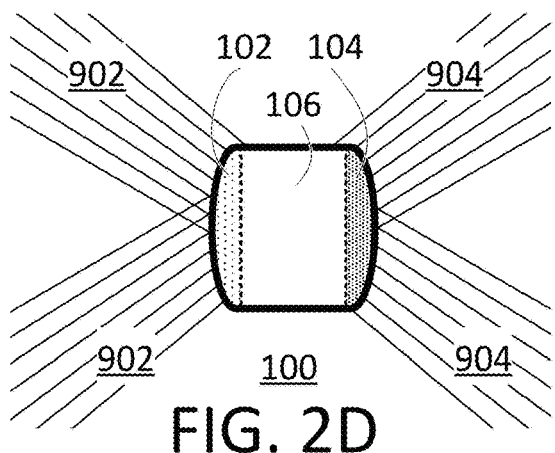

FIGS. 2A-2D illustrate front side 102 being illuminated by first illumination 902 and back side 104 being illuminated by second illumination 904, in accordance with examples of the presently disclosed subject matter. FIGS. 2A-2D may represent, for example, front side 102 and back side 104 being concurrently illuminated by main pulse ionizing illumination, resulting in substantial emission of SWR illumination. FIGS. 2A-2D may represent, for example, front side 102 and back side 104 being concurrently illuminated by pre-pulse illumination, e.g., for bidirectional shaping of ionization target prior to being irradiated with the main pulse. FIG. 2A illustrates a spherical (or practically spherical) ionization target 100; FIG. 2B illustrates a flatter disc-like ionization target 100 being subject to geometrically imbalanced target illumination scheme; FIG. 2C illustrates an ellipsoid ionization target 100 being subject to geometrically imbalanced target illumination scheme; and FIG. 2D illustrates a thick ionization target 100. It is noted that these shapes are merely examples, and ionization targets of any suitable shape may be used, e.g., in accordance with the needs, capabilities, and intended output of system 200. The ionization targets 100 ionized by system 200 may be symmetrical about at least one axis and/or about at least one plane (e.g., as exemplified in the illustrations), but this is not necessarily so. It is noted that while a border between front side 102 and back side 104 may be on a symmetry plane of the target (if applicable), this is not necessarily so. It is also noted that front side 102 and back side 104 do not necessarily border one another, and ionization target 100 may include additional sides and/or parts which do not belong to front side 102 or to back side 104. Such parts are collectively denoted 106, and may be subject to illumination as part of the target illumination scheme controlled by controller 220 (e.g., subject to shaping pre-pulse illumination), but this is not necessarily so, and such parts 106 may also remain unilluminated during the entire process.

In the illustrated example, each one of first illumination 902 and second illumination 904 comes from a single light source (not shown), but it is noted that either one or both of these illuminations (902, 904) may be produced by a plurality of light sources and/or otherwise illuminate target 100 from different directions (e.g., splitting the laser beam of a single laser source into multiple beams casted onto target 100 from different directions). FIG. 1A illustrates illuminating the back side 104 from several directions. The directions from which one of the sides of ionization target 100 is being illuminated (102, 104) may be arranged in a symmetrical fashion about a symmetry axis, but this is not necessarily so. It is noted that first illumination 902 and second illumination 904 may oppose one another (e.g., as exemplified in the diagrams of FIG. 2), but this is not necessarily so. Referring by way of examples to FIGS. 2B, 2C, and 2D, it is noted that illumination from the back side and from the front side may be balanced in some respects (e.g., overall power, propagation direction) while being imbalanced (or nonsymmetrical) in some other aspects (e.g., geometry of light propagation). It is noted that a central propagation direction of first illumination 902 and a central propagation direction of second illumination 904 may oppose one another (e.g., as exemplified in FIG. 1A), but this is not necessarily so. In the context of the present disclosure, a first illumination and a second illumination are said to be opposed to one another when they are irradiated from two distinct locations in space and their vectors of propagation form an angle close to 180 degrees, indicating they are moving in substantially opposite directions in a three-dimensional space. The degree of permitted deviation from 1800 may depend on the specific implementation, but may be, for example, accuracies of <30° or better, <100 or better, <1° or better, <0.1° or better, <0.01° or better, or <0.001° or better may be required. It is noted that the term "irradiation direction" pertains to the propagation direction of the respective illumination beam upon impinging on ionization target (where applicable), even if the respective beam was originally emitted in a different direction. For example, such illumination may be reflected or otherwise optically redirected prior to irradiating the ionization target 100. An example of this is provided by illumination 904 originally emitted by light source 211 in FIG. 1B.

In the context of the present disclosure, the central illumination direction is a direction in the space of the system that characterizes the collective behavior of multiple illuminations cast on one side of a target. This direction may be defined geometrically as the average of all illumination vectors cast on the respective side of the target. When illuminations of varying intensities are used, the central illumination direction can optionally be further refined as an intensity-weighted average of the illumination directions. Similarly, if illuminations of different durations are used, a duration-weighted average may optionally be implemented. When illuminations of different wavelengths or spectral distributions are used, a weighted average may also account for these differences, such as the effect of each wavelength on the ionization of the target. A weighted average definition of the central illumination direction may take into account any one or more of the above examples, as well as other forms of averaging. In cases where the overall effect of the illumination on the target is of primary concern, the central illumination direction can be defined as the direction of an equivalent single source that would produce the same illumination effect on the target. Illumination from different directions onto a single side of the target can be implemented in a variety of systems, each with its own considerations. Therefore, the central illumination direction can be tailored to reflect the specific characteristics of the illuminations and the requirements of the application. It is noted that any of the above definitions may be used in any of the systems and methods discussed below, and any of their variations. Optionally, symmetrical illumination may be implemented in system 200 such that illumination intensity on the target would by symmetric and optionally also uniform. This can be achieved by many configurations. This symmetry may be time-integrated over a certain period of time (e.g., several nanoseconds).

It is noted that while ionization target 100 is represented by a circle, its shape may be a sphere, a pancake-like shape, a pizza-like shape (a disc-like shape with a narrower center and wider rims), a disc-like shape, or any other suitable shape, whether symmetrical or nonsymmetric.

In the present disclosure the back side opposes the front side. In many cases, the morphology of the ionization target 100 is substantially flat or disk-like, especially directly prior to the ionization (e.g., if pre-pulses are used for shaping targets). In many such cases front side 102 and back side 104 of ionization target 100 are clearly differentiable from one another. In a more general definition, the front side 102 is a side of target 100 which is generally directed towards a collection apparatus (e.g., MLM mirror) which is used to collect SWR emitted from front side 102 of the respective target 100, while the back side of that target 100 is generally the opposite side. SWR emitted from back side 102 does not usually arrive directly to the same collection apparatus, and may or may not be collected, in dependence on the intended use and design of system 200. In a case in which SWR is collected from both sides, the distinction between front side and back side may be selected arbitrarily, or in accordance with a suitable rational (e.g., the side from which more SWR is collected, the side to which more light is provided by the light source, etc.). In the example of system 200 shown in FIG. 1A, front side 102 of ionization target 100 occupies the left hemisphere, facing the main collection optics (illustrated part of 230), and back side 104 occupies the right hemisphere of target 100, respectively. As discussed below, additional SWR components may optionally be included for collecting SWR emitted from back side 104.

In some cases (such as when utilizing types of light sources—e.g., lasers—which are incapable of generating the required pulse power for a certain system design), a plurality of individual light sources may be used in a temporal cascading fashion. In such configurations, each light source generates a pulse of shorter duration and lower power, and these pulses are then sequentially aligned and fired in rapid succession. The resultant collective output forms an elongated pulse with a duration and power level that effectively meet the system requirements. Such temporal cascading allows for the constructive summation of the energies and temporal characteristics of the individual pulses. Specific parameters such as phase coherence, timing jitter, and pulse overlap may be controlled to ensure the desired output characteristics. Moreover, the cascading approach enables the system to utilize existing laser technologies that may not individually meet the power or duration requirements, offering a cost-effective and scalable solution.

Optionally, a light source of system 200 (e.g., first light source 210, second light source 211 if any) may be configured to emit weaker pulses prior to the main ionizing pulses, e.g., for modifying a shape of the ionization target 100 before it is ionized by the main ionizing pulse. Such preliminary pulses are also referred to as "pre-pulses" in the present disclosure. For example, pre-pulses directed at one or more sides of each target 100 may be used for modifying a shape of such targets 100 from a sphere-like shape to a disk-like shape.

Pertaining either light source out of the one or more light sources of system 200 (whose illumination is being directed onto both sides of target 100), it is noted that different types of light sources may be used, such as lasers (e.g., Gas lasers, $CO_2$ laser, Solid state—SS—laser, diode laser, fiber laser, Q-switched laser, diode pumped lasers and diode pumped solid state—DPSS—lasers), pulsed light source, continuous light source (e.g., continuous wave, CW, laser), etc. When lasers are used as light sources, the same type of laser may be used to illuminate the front side 102 and the back side 104, but this is not necessarily so. Optionally, different types of lasers may be used to illuminate front side 102 and back side 104. For instance, one or more gas lasers (e.g., $CO_2$ laser) may be used to illuminate front side 102 and one or more solid-state lasers (e.g., Nd:YAG laser) may be used to illuminate back side 104. Many other combinations are obviously also possible.

Light from light assembly 202 (e.g., of light source 210, light source 211 if any) is directed onto target 100 via various optical components, collectively denoted "optics 212" and "optics 214", respectively. Optics 212 and 214 may include mirrors, curved mirrors, parabolic and spherical mirrors, prisms, lenses, adaptive optics, deformable mirrors, and any other types of equipment which may be used for transforming light propagation. In the example of FIG. 1B the first light source 210 is directed to front side 102 and illumination of a single second light source 211 is split (not shown) and delivered via various optics 214 and directed onto back side 104 from multiple directions. In the example of FIG. 1C illumination of a single first light source 210 is split (not shown) and delivered via various optics 212, 214 to both front side 102 (from a single direction) and back side 104 (from multiple directions). The illustrated examples do not exhaust all of the options to illuminate opposing sides of a single target 100 by system 200, and are intended as illustrative examples only. For example, front side 102 may be illuminated from different directions, by one or more light sources 210.

While not necessarily so, optics 212 and 214 may optionally include controllable components for changing properties of light, such as (but not limited to): propagation direction, focusing properties, optical wavefront of the light beam directed toward the target 100, beam shaping, optical path, and so on. Some examples for optics 212 and 214 (and any other SWR optics discussed below) include: motorized optics, deformable mirrors, piezoelectric actuators, optical modulators, optical isolators.

Referring to light assembly 202, it is noted that the one or more light sources which are used for the actual ionization and excitation of targets 100 may optionally also be used for other uses. For example, such one or more light sources may emit weaker pulses prior to the main, ionizing pulses for modifying a shape of the hit target 100 (e.g., from a sphere-like shape to a disk-like shape). Such weaker pulses are also referred to as "pre-pulses". Alternatively, such pre-pulses may be emitted by one or more light sources that are not used for the target excitation that leads to the emission of SWR as discussed above. Optionally, an energy level of the pre-pulse may be significantly lower (e.g., <10%) than the ionizing main pulse, and may optionally have the same wavelength or a hormonic of the wavelength of the main (ionizing) pulse. Optionally, the pre-pulses and the main pulses may differ from one another in any one or more parameters, such as: unrelated wavelengths, different time durations, different starting times, different focusing configurations, differing optical paths (and being manipulated by different optical components), and so on.

A nonlimiting example may include a main pulse of an Nd:YAG laser having energy of 100 mJ at 1064 nm wavelength, while the pre-pulse is emitted by the same laser, has energy of less than 10 mJ and wavelength of either 1064, 532 or 266 nm. Optionally, the pre-pulse may also be emitted by a different laser system with a different wavelength from the main pulse. Optionally, the pre-pulse may have different time duration than the main pulse (e.g., much shorter, such as by a scale of ×10, ×100 ×1,000 and so on) and/or different spatial properties (e.g., different focal spot or position). For example, the main pulse can be emitted by a $CO_2$ laser or Nd:YAG and the pre-pulse may be emitted by a Ti:Sapph laser, Ytterbium laser, solid-state laser, and so on. It is noted that such pre-pulses may also ionize parts of the target, but to a lesser extent due to their much lower intensity. For example, the duration of a main pulse may be measured in nanoseconds (e.g., tens to hundreds of nanoseconds), while the duration of the pre-pulse may be measured in picoseconds (e.g., tens to hundreds of picoseconds).

Light assembly 202 is controlled by controller 220 of system 200 (which may also control other components of system 200, and optionally of other systems as well). Controller 220 is configured to control light assembly 202 for illuminating ionization target 100 from front side 102 of the ionization target 100 using first illumination 902 and for—at least partly concurrently illuminating ionization target 100 from back side 104 of ionization target 100 using second illumination 904. This, of course, may be repeated for many different ionization targets 100. The repetition (if implemented) may be a periodic repetition (also referred to as "regular repetition"), an aperiodic repetition (also referred to as "irregular repetition"), or even randomly or stochastically.

The scope of functionalities of controller 220 may vary greatly, depending on various system requirements. For some implementations a simple timer or clock signal generator may suffice, while for other implementations an array of advanced CPUs may be used. According to one minimalistic example, controller 220 may substantially consist of a timing module (optionally predefined/preprogrammed and static) that orchestrates the temporal order of events (e.g., laser emission). Optionally (e.g., in such a minimal example), the configuration of controller 220 may be done once, and controller 202 may continue to operate according to the configuration, without having to be adaptive or responsive. According to an example, controller 220 may include (or even consist of) a function/delay generator that can accept, arrange, and provide electrical triggers, for temporal synchronization of all system components (at the very minimum: synchronization of the target placement to the light source). It is noted that some timing aspects of the system—e.g., related to light irradiation onto target 100—may be implemented in a passive manner, e.g., using optical delay lines, mirrors, and space, which collectively determine a temporal order of illumination events (e.g., the delay between front and back side pulses) without any electronics.

Controller 220 may control any one or more operational parameters of light assembly 202 and/or of the individual light sources (210, 211), such as any one or more parameters out of: illumination intensity, illumination timing (e.g., beginning, duration, frequency), wavelength, light source selection (if applicable), or any combination of the above, as well as other operational parameters, many of which are known in the art (e.g., heat management, power management). The control can be based on instructions provided by a user, automated programming, responses to sensor inputs, or any combination thereof. Controller 220 may also optionally control optics 212 and/or 214 for controlling the progression of light from light assembly 202 towards the different sides of target 100. For example, controller 220 may control location and/or orientation of various optical components, optical power of various components, as well as their transmittance properties, focusing parameters, and so on. Controller 220 may control optics 212 and/or 214 to various ends, such as shaping the waveform or conditioning of the illumination (if applicable), controlling the polarization states of the transmitted light (if applicable), beam shaping and alignment of each beamline, and so on. The control over these parameters allows for fine-tuning of the light propagation from the illumination assembly 202 towards target 100, enabling precise control over characteristics such as light distribution, intensity gradient, or specialized effects like speckle reduction. As with the control of the light sources, the control over these optical parameters can be user-driven, based on automated protocols, adaptive to sensor feedback, or any combination thereof, offering a flexible and customizable operation of the light assembly 202.

Controller 220 may be implemented using any combination of one or more processors, memory modules, storage devices, input/output (I/O) interfaces, and communication links, as well as any other component which may be required for its operation (e.g., cables, sensors, power supply, and so on). Controller 200 may incorporate various types of processors, such as any one or more of: central processing unit (CPU), graphics processing unit (GPU), digital signal processor (DSP), microprocessor, or any combination thereof. These processors may be standalone components or integrated circuits (ICs) and could be application-specific integrated circuits (ASICs) or field-programmable gate arrays (FPGAs). In some embodiments, the processors could be a heterogeneous combination of different types, each optimized for a specific task within the electro-optical system. Controller 220 may be implemented using any suitable combination of hardware, firmware, and/or software.

Controller 220 may optionally also include memory and storage modules which may serve as a reservoir for data and instructions. Such module (or modules) could include various types of volatile and non-volatile memory such as random-access memory (RAM), read-only memory (ROM), flash memory, as well as storage devices like solid-state drives (SSDs), hard disk drives (HDDs), or optical drives. These modules can store operational instructions, calibration data, system configuration settings, the system's firmware, user settings, system logs, or raw and processed data from various components of system 200. The memory and storage modules could optionally be internal or external, removable, or upgradable, allowing for flexibility in system enhancements or modifications. System 200 as a whole, and especially controller 220 as an example, may include various input/output (I/O) and communication interfaces that enable interaction and connectivity with other components of the system and of external devices or networks. This can include digital or analog I/O interfaces, universal serial bus (USB), Ethernet, alongside wired or wireless communication links such as Wi-Fi, Bluetooth, or cellular networks. These interfaces and links serve various purposes, such as data transfer, remote system control, system updates, or cloud-based storage and processing. In some embodiments, these interfaces can be dedicated to specific system components, while others may serve as general-purpose conduits for information and command exchange.

Controller 220 is configured to control emission of light by the light assembly according to a target illumination scheme, which includes illuminating target 100 from both front side 102 and back side 104, either completely concurrently, or partly concurrently (i.e., in partial temporal overlap), thereby inducing emission of SWR from the target. The target illumination scheme includes first illumination 902, second illumination 904, and optionally other illuminations as well. First illumination 902—and likewise second illumination 904—may be the primary illumination (which causes significant emission of SWR from target 100) or the preliminary illumination (a pre-pulse). Different ionization targets 100 (including sequentially illuminated targets) may be illumination using the same target illumination schemes, using similar target illumination schemes, or using significantly different target illumination schemes. For example, controller 220 may implement target illumination scheme which qualifies to any of the following categories:

a. Bidirectional primary illumination, without preliminary illumination ("pre-pulses");

b. Bidirectional primary illumination preceded by bidirectional preliminary illumination;
c. Bidirectional primary illumination preceded by unidirectional preliminary illumination (onto either front side 102 or back side 104);
d. Unidirectional primary illumination (onto either front side 102 or back side 104) preceded by bidirectional preliminary illumination (onto either front side 102 or back side 104);
e. Unidirectional primary illumination (onto either front side 102 or back side 104) preceded by unidirectional preliminary illumination (onto the other side). It is noted that in such case the illumination from both sides is not concurrent, which is a variation on the predominant portion of the disclosure which focuses on target illumination scheme in which there is at least a partial temporal overlap between illumination cast on front side 102 and on back side 104 of a single ionization target 100. It is nevertheless noted that any applicable variation discussed with respect to systems in which there is such temporal overlap may also be applied to systems in which there is no temporal overlap between illumination from the different directions (belonging to any of the categories a-e), mutatis mutandis.

In each of the above categories (a-e), a bidirectional illumination—whether a primary or a preliminary illumination—the illumination from front side 102 may be balanced with the illumination from back side 104 (in geometry, intensity, duration, wavelength, laser type, etc.), but this is not necessarily so, and quasi-balanced, near-balanced, somewhat balanced, and even imbalanced illumination scheme may also be used. It is noted that if both primary and preliminary illumination are included in the target illumination scheme dictated by controller 220, the partial or full concurrency between illumination from both sides may be applied only to the primary illumination, only to the preliminary illumination, or to both. It is noted that the term "balance" may include various form of balance between the front side and the back side (of ionization target 100, of system 200, etc.). For example, such balance may imply symmetry between the front side and the back side.

The SWR emitted from front side 102 (and possibly also from back side 104 and/or from other portions of target 100 if applicable—e.g., if target 100 is elongated horizontally between the first side and the second side) results from illuminating the target according to the target illumination scheme (applied to at least one target 100) that includes at least first illumination 902 and the second illumination 904 (e.g., front side main pulse and back side main pulse). The emitted SWR is then collected by optical assembly 230 of system 200, which is configured at least to collect SWR emitted from front side 102 of the ionization target 100 and to direct the collected SWR toward a designated beam direction of the SWR system. Optionally, optical assembly 230 may be further configured to collect SWR emitted from back side 104 of the ionization target 100 and to direct the collected SWR toward a designated beam direction of the SWR system—whether the same designated beam direction as the one to which SWR emitted from front side 102 is directed, or another one. Optionally, optical assembly 230 may be further configured to collect SWR emitted from other sides of the ionization target 100 (if applicable) and to direct that collected SWR toward a designated beam direction of the SWR system-whether the same designated beam direction as the one to which SWR emitted from front side 102 and/or back side 104 is directed, or another one.

Optical assembly 230 is configured to collect SWR emitted from the front side 102 of the ionization target and to direct the collected SWR toward a designated beam direction of the SWR system, wherein the SWR emitted from the front side 102 results from a target illumination scheme that includes at least first illumination 902 and second illumination 904 (e.g., front side main pulse and back side main pulse, or a combination including a back side pre-pulse, etc.). Optical assembly 230 (also referred to as "optics 230") is represented in FIGS. 1A and 1B by a concave mirror (e.g., suitable for EUV wavelengths) and is configured to direct the collected emitted light towards outward optics 240 (also referred to as "optics 240"). It is nevertheless noted that other types of mirrors, as well as other types of optical components may be used for collecting and/or directing SWR toward optics 240. While not necessarily so, one or more of the optional mirrors of optical assembly 230 may be a multilayered mirror (MLM). MLMs are mirrors which may be made from a substrate material (e.g., quartz, silicon, glass), shaped in different shapes (e.g., plane, concave, convex, paraboloid, ellipsoidal etc.) which is coated in multiple layers of different coating (e.g., selected from the group consisting of Ru/Si, SiC/Mg, Mo/Si, Zr/Al, Cr/C, etc.), which assist in reflecting SWR (e.g., EUV light). In some examples, the emitted Short-Wave Radiation (SWR) emitted from target 100 is collected by the MLM (or other type of optics 230) and reflected backwards towards a designated beam direction, e.g., toward optics 240. While not necessarily so, the directed SWR may pass through a point named intermediate focus 192, but system 200 does not have to necessarily include such an intermediate focus.

In the description below, in case pulsed light sources are used for first illumination 902 and/or second illumination 904, the following terms may also be used: "front side illumination of the ionization target with first illumination" may be referred to as "front side pulse" or "front pulse", while "backside illumination the ionization target with second illumination" may be referred to as "backside pulse" or "secondary pulse".

Referring to system 200 generally, it is noted that system 200 may optionally include one or more sensors 250 that are configured to provide to controller 220 information indicative of kinematic parameters of target 100, such as location within system 200 (and especially within its SWR emission module 290), orientation, shape, size, velocity, acceleration, spin, etc. Optionally, one or more sensors 250 may provide to controller 220 information indicative of other parameters of the target 100 (e.g., temperature, color, structure, position, velocity), of other components of the system (e.g., laser orientation, temperature), and so on. Controller 220 may use such parameters to control the operation of light assembly 202, of optics 212, of optics 214, or of any other component of system 200. Examples of types of sensors 250 which may be implemented include cameras, radar, diodes, power meters, wavefront sensors, pressure sensors, material sensors (mass spectrometers), temperature sensors, and so on.

Figure 3:
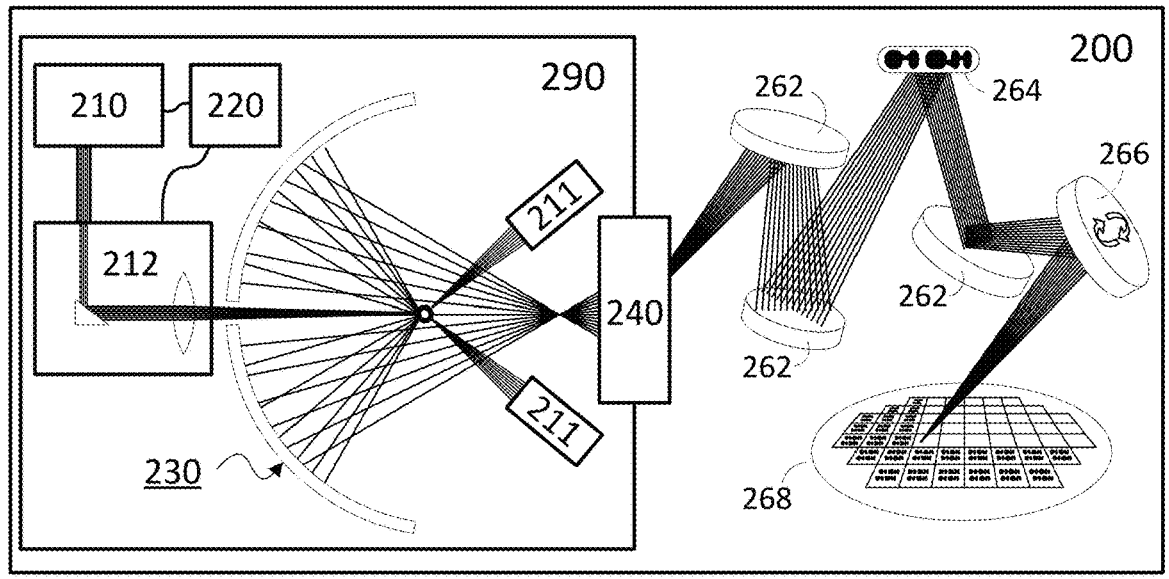
FIG. 3 is a schematic diagram illustrating an example of an SWR system used for lithography.

SWR (e.g., EUV light) resulting from the ionization of at least a part of target 100 is emitted in different directions (e.g., in a uniform or in a directional form), and is then collected and/or directed toward outward optics 240 (or in any other one or more designated beam direction), which may be used to directing SWR out of system 200 (e.g., to another system), or from SWR emission module 290 to other parts of system 200 (e.g., optional SWR lithography components of system 200 as exemplified in FIG. 3).

It is noted that different types of ionization targets 100 may be selected, differing in shape but also in material and composition. For example, the wavelength of the SWR emitted by system 200 greatly depends on the material of which ionization target 100 is made of. Some additional factors determining the wavelengths of the emitted SWR include wavelength of light source radiation, its intensity, and its total energy. Geometrical properties of the interaction, plasma temperature, and plasma density can also determine the wavelengths of the emitted SWR. For example, ionization target 100 which is made of Tin (Sn) may be selected for system 200 to emit EUV light having a spectral peak at about 13.5 nm. However, other materials for target 100 (also referred to as "emitters") can be used as well, among them are various high Z materials such as rare earth metals or higher Z metals such as gold or lead, gadolinium, as well as structures and materials that combine several elements, such as layered or mixed materials.

Pertaining to the optional use of pre-pulses in system 200, it is noted that the at least one light source used for emitting such pre-pulses (from either side of the target) may be the same light source used for emitting the main illumination, but this is not necessarily so. For example, controller 220 may be configured to control a front side preliminary illumination and a back side preliminary illumination of the ionization target, prior to primary illumination, in order to modify a shape of the ionization target (e.g., from a sphere-like shape to a disk-like shape). Such preliminary illumination is also referred to as "pre-pulses". Optionally, such pre-pulses may be generated by one or more light sources that are not used for the target excitation that leads to the emission of SWR as discussed above. Optionally, the energy of the pre-pulses may be significantly lower (e.g., <10%) than that of the ionizing main pulses and may optionally have the same wavelength or a harmonic of the wavelength of the main (ionizing) pulses. A nonlimiting example may include a main pulse of an Nd:YAG laser having energy of 100 mJ at 1064 nm wavelength, while the pre-pulse is emitted by the same laser, has energy of less than 10 mJ and wavelength of either 1064 nm, 532 nm or 266 nm.

Optionally, the pre-pulse may also be generated by a different laser system with a different wavelength from the main pulse. Optionally, the pre-pulse may have different time duration than the main pulse (e.g., much shorter, such as by a scale of ×10, ×100 ×1,000 and so on) and/or different spatial properties (e.g., different focal spot or position). For example, the main pulse can be generated by a $CO_2$ laser or Nd:YAG and the pre-pulse may be generated by a Ti:Sapph laser, Ytterbium laser, solid-state laser, and so on. It is noted that such pre-pulses may also ionize parts of the target, but to a lesser extent due to their much lower intensity. Further, the pre-pulses may not have exactly the same propagation directions as the main illumination pulses, e.g., when different lasers are used for the pre-pulses than for the main illumination. It should be noted that system 200 may implement either a single-sided pre-pulse for purpose of modifying the shape of ionization target 100, or two-sided pre-pulse shaping. The latter option may have better shaping symmetry, or other possible advantages such as stopping or slowing motion of the preserved part of ionization target, as discussed below in greater detail. Optionally, first illumination 902 and second illumination 904 are ablating illumination resulting in emission of collectable SWR, while the pre-pulse illumination is either bidirectional or unidirectional.

Implementing a bidirectional pre-pulse illumination scheme may be implemented for any one or more of the following reasons (among others):

a. Preventing or limiting movement of ionization target 100 (especially along the direction of illumination) by canceling out opposing forces resulting from the illumination of the different sides of ionization target 100. This prevention or reduction of movement allows for: (i) easier alignment of illumination on the ionization target (pre-pulse illumination and/or primary illumination); (ii) positional consistency between shots (different ionization targets arrive to the same plane at different times, enabling better overlap between the light source radiation and the ionization targets); and (iii) positional consistency in SWR emission (SWR is emitted from the same plane/location for different ionization targets 100), resulting in better optical properties of the SWR beam, and better beam stability between shots.

b. Compression of target 100 from both sides in order to achieve axial confinement and stronger expansion of the target in the in-plane direction. This may be used, for example, to use bidirectional pre-pulses to shape thinner targets than what is achievable in unidirectional pre-pulse illumination scheme. As discussed below, thinner targets may produce more SWR under bidirectional illumination.

c. In order to reduce the effect of variation in the individual pulse energy, resulting in more consistency across different shaped ionization targets (both the shape of the target itself as well as its trajectory after the pre-pulse). This may be even more pronounced when the same combination of one or more light sources (e.g., laser) is split to create both back illumination and front illumination for the pre-pulse.

d. More consistent target shape allows better matching between the target and the spot size. Improving CE and leaving less neutral ejecta.

e. More consistent target shape and better matching between the target and the spot size also simplifies the aiming, potentially reducing cost and increasing aiming yield (and hence also average SWR power).

f. Potentially, the bidirectional pre-pulse may be used to facilitate using more energetic pre-pulses, while maintaining the mechanical stability and integrity of the target, thus reaching thinner resulting target for the main pulse.

g. Utilizing bidirectional pre-pulse illumination scheme which includes more degrees of freedom in the shaping of the ionization target, allowing more optimized target shape for the application.

h. Utilizing bidirectional pre-pulse illumination scheme may be used for faster deformation of the target into the required shape. This might allow shortening of the time between the pre-pulse and the main pulse, which in turn leaves less time for perturbations (either in the shape of the target or in its trajectory) to evolve.

Optionally, first illumination 902 and second illumination 904 may serve as the shaping illumination (pre-pulses), and may thus be followed by SWR generating illumination, which may be either one sided or two sided (in which case it may be balanced or not), depending on various system design considerations, examples of which are provided throughout the disclosure. For example, system 200 may optionally be configured such that first illumination 902 and second illumination 904 modify a shape of ionization target 100 (i.e., first illumination 902 and second illumination 904 in such case are pre-pulses irradiated from both sides of the ionization target 100), and the target illumination scheme further includes a third illumination controllably irradiated toward the front side, wherein the third illumination ionizes material of ionization target 100, resulting in emission of the SWR toward optical assembly 230 (i.e., in such case, the primary illumination is referred to as "third illumination"). In this scheme, the first and the second illuminations serve as the pre-pulses shaping the target, e.g., making it thinner. It is noted that the thinning of the ionization target, if implemented (whether bidirectional or unidirectional) may optionally include ablation of a thicker target, a process which may take some time and during which SWR may optionally be emitted. However, in many cases such SWR would be emitted when the target is positioned outside a relatively small location 190 from which optics 230 may efficiently collect SWR and direct the collected SWR toward the designated beam direction (e.g., toward optics 240), which means that in such cases, SWR emitted during the shaping process may not be effectively collected (e.g., for being use in lithography). It is also noted that bidirectional pre-pulse illumination may enable system 200 to manipulate ionization targets into shapes and/or kinetic behavior which is not possible using unidirectional pre-pulse.

In case first illumination 902 and second illumination 904 are both pre-pulse illumination (as discussed above) and the primary illumination which ionizes material of ionization target 100 in order to induce SWR emission is also bidirectional, the target illumination scheme further includes a fourth illumination controllably irradiated toward the back side, wherein the fourth illumination ionizes material of ionization target 100, resulting in emission of the SWR toward optical assembly 230. That is, in such case the bidirectional primary illumination includes the third illumination and the fourth illumination. However, in most of the disclosure, bi-directional primary illumination is described in a non-limiting way using the terms of "first illumination" and 'second illumination".

FIG. 3 is a schematic diagram illustrating an example of system 200 used for lithography, in accordance with examples of the presently disclosed subject matter. In the example of FIG. 3, SWR (e.g., EUV light) generated by ionization of one or more targets 100 is directed by outward optics 240 toward lithography mask 264 via various optical components (such as but not limited to mirrors 262). From lithography mask 264, patterned short-wave light (patterned and/or modulated by mask 264) is deflected via various optical components (such as but not limited to mirrors 262, steerable mirrors 266) toward wafer 268 (e.g., a silicon wafer, a germanium wafer, silicon oxide wafer) where it is used to pattern parts of the wafer using lithography. It is noted that other types of optical components may be used for directing and managing light in its path from outward optics 240 to an aiming point of system 200 (e.g., on the wafer), such as but not limited to: mirrors, multi-layer mirrors (MLM), grazing incidence reflectors, Curved MLM, spherical or parabolic MLM, reflection masks, masks, beam blockers, pellicles, lenses, prisms, waveguides, and so on, all of which could be controllable (e.g., steerable) or not. A few other examples of uses for short-wave radiation (e.g., EUV light) of system 200 which are not illustrated in FIGS. 3 include wafer inspection during wafer manufacturing, mask inspection for lithography masks used in lithography (whether of wafers or other), MLM inspection and light source used for research, metrology, soft x-ray imaging and other non-semiconductor related applications, and so on. It is however noted that the SWR output of system 200 may be put to any use, and not just to the example uses provided in this paragraph.

Figure 4C:
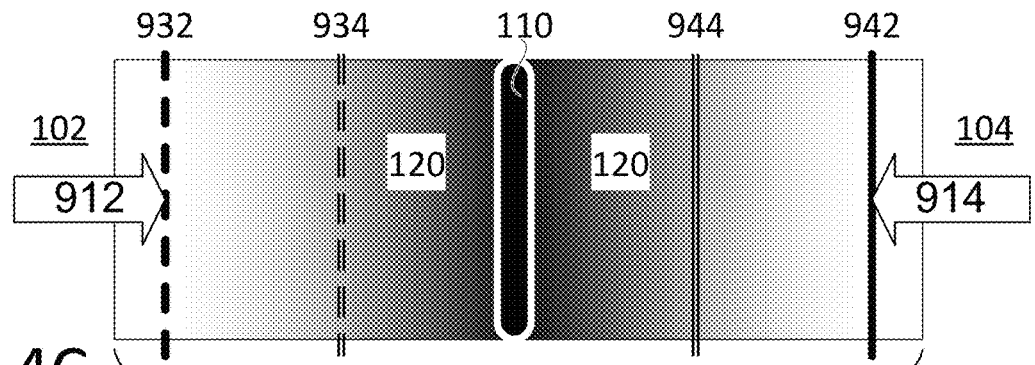
FIGS. 4C and 4D are schematic cross-section diagrams schematically illustrating illumination-target interaction when both sides of the ionization target are illuminated by primary illumination.

FIGS. 4A and 4B are schematic cross-section diagrams schematically illustrating various stages of illumination-target interaction (e.g., laser-target interaction) when only a single side of the ionization target (front side 102) is illuminated by primary illumination, in accordance with examples of the presently disclosed subject matter. The one-sided illumination is denoted 912, and it may include (or even consist of) first illumination 902, but this is not necessarily so. For example, as discussed above, in some cases first illumination 902 may be a pre-pulse illumination, in which case the primary illumination 912 is different than the aforementioned first illumination 902. It is noted that while illumination 912 is illustrated as being provided from a single direction, it may also be irradiated from multiple directions (e.g., using multiple light sources), mutatis mutandis. Referring to all of FIGS. 4A-4F and 4A'-4F', it is noted that these drawings are schematic and simplified. For example, these diagrams focus on the gradual densities of ionizable material along one axis, and for the sake of clarity of the diagram-do not refer to 2D or 3D distribution of matter in other parts of the space of target 100.

FIGS. 4A and 4A' illustrate the illumination-target interaction during an optional initial stage of the illumination pulse, between 0 and $\tau_0$ sec from the beginning of illumination. For example, $\tau_0$ may be in the range of 0.1 ns-1 ns, or larger. During the initial stage ($\tau < \tau_0$, e.g., where $\tau_0$ is about 0.1-0.5 ns) of the interaction between the illumination beam (in this case illumination 912, e.g., one or more laser pulses) and the target (e.g., tin target), some target material gets heated and ionized and a plasma gradient is created at the illuminated surface of the target. Once the plasma cloud 120 is formed, it further absorbs the laser energy, primarily by free electrons. The energy is further transferred to the plasma ions through collisions between the free electrons and the ions. Those collisions further ionize the plasma ions and excite some of its bound electrons to excited states. Those highly excited bound electrons can then decay to a lower energy state. In other cases, a free electron can re-combine with an ion moving it to a lower energy state. These processes (along with other atomic processes) result in emission of SWR. Proper selection of target material and illumination parameters can be used to determine the emission spectral range, e.g., predominantly in the EUV range. The size, shape, and density of the plasma cloud 120 changes with time, both during continued illumination and directly following the ceasing (termination) of the illumination. After the formation of the initial plasma cloud the target can be roughly divided to two types of regions: Low-density regions where the plasma electron density is significantly below the laser critical density, as defined below (e.g., outwards of lines 932 and 942), and a high-density part where the electron density is approximately critical or higher than critical (e.g., approximately between lines 932 and 942, possibly somewhat larger). Material of the first type of region is propelling away from the target and can be considered as "lost material" as it no longer interacts with the illuminating beam. The high-density part can be defined as the "target bulk" or the main remaining target. The target bulk can optionally include regions that are at a neutral solid/liquid phase (e.g., over dense material 110, such as non-ablated material 110) in addition to lower density and ionized material (e.g., the rest of the material between lines 932 and 934). In any case the target bulk is the part of the target into which the laser light has not penetrated yet. When subject to ongoing illumination, this region becomes smaller, and more material becomes "lost material". The part of target material that absorbs most of the illumination energy and being significantly heated by that energy (e.g., approximately between lines 932 and 934, possibly somewhat larger) is sometimes referred to as the "interaction region". In this context, significant heating is a heating that brings the energy density in the target material at least close to the ionization energy of that material (e.g., to at least ×0.01 of that energy, to at least ×0.1 of that energy, to at least ×0.5 of that energy, to at least ×0.95 of that energy, and so on). It should be noted that other parts of the ionization target may reach much higher energy density during the SWR generation process, such as ×2, ×5, ×10, or more times the ionization energy of that material. It is noted that the discussion of this paragraph is intentionally simplified (e.g., in being "one dimensional", and not discussing local deviations that can arise in a realistic scenario), trusting that a person who is of skill in the art would be able to clearly differentiate between the two types of regions. As aforementioned, the aforementioned "preserved part" of the ionization target may optionally consist of the "target bulk" as defined in this paragraph.

Referring to all of FIGS. 4A-4F, it is noted that target 100 may or may not include an over dense material component 110 (e.g., non-ablated component 110). FIGS. 4A'-4F' correspond to FIGS. 4A-4F for targets 100 which do not include a non-ablated component 100 (at least not at the corresponding moment in time).

The heating of ionization target 100 by illumination 912 results in generation of SWR resulting from exciting some of the preserved part material. The generated plasma expands rapidly, mostly in the direction opposite to the central propagation direction of illumination 912 and/or perpendicular to the surface of the target. The expansion of the plasma cloud 120 imparts momentum on the remaining preserved part material and propels it along the opposite direction (e.g., laser propagation direction) with non-zero velocity $\vec{U}$.

FIG. 4B illustrates the displacement of the preserved part at a later time $\tau_1$, $\tau_1 > \tau_0$ while illumination 912 is irradiated (either as a single pulse or a series of pulses). The propulsion velocity U of the preserved part constitutes a loss channel of the total deposited laser energy (especially for main pulse illumination 912). In the context of the main illumination, lost energy is any energy that is not invested in heating the plasma or the preserved part of the target, ultimately leading to SWR emission. As discussed below in greater detail, illumination in the substantially opposite direction may optionally be used to limit the amount of kinetic energy channeled into propulsion of the preserved part.

Referring to line 932, it should be understood that most of the primary illumination is absorbed near the critical plasma electron density $n_c$. This is the density where the plasma frequency equals the frequency of the laser light, and most of the absorption of the laser energy by the plasma occurs around it. The penetration of laser radiation into regions of the plasma where the density is higher than the critical density is vanishingly small. This critical plasma electron density is denoted by line 932. When bidirectional illumination is introduced in relation to the following diagrams (e.g., FIG. 4C), line 942 represents the critical plasma electron density of second side illumination 914 (acting as a second side primary illumination).

Beyond the maximal penetration of the laser (represented by line 932 in FIGS. 4A and 4B), the energy absorbed by the target is transferred in both directions (having inward motion component toward back side 104, or having outward motion component toward front side 102). Several physical processes transfer the energy in the target, (e.g., emission and re-absorption, heat conduction, and electron transfer). Energy transferred through plasma cloud 120 toward the target bulk heats parts of the plasma cloud, where characteristic distance of this energy transfer into the target is schematically represented by line 934. In other words, part of the absorbed light energy is transported into the higher-density region (i.e., stretching from area of critical density towards non-ablated material 110) potentially contributing to further plasma ionization and SWR emission. Thus, most of the SWR is generated in the interaction region: the volume between 932 and 934 (i.e., between the 2D surfaces represented by these lines in the cross-section diagram).

As illumination 912 continues, both the zone of critical plasma electron density $n_c$ (represented by line 932) and the boundary of the heated volume (represented by line 934) move toward the preserved part, at first expanding the distance between them (and thus the also expanding the volume of the SWR generation volume), as demonstrated in the differences between diagrams 4A and 4B. In cases primary illumination 912 continues long enough in a steady intensity, the ablation process reaches a steady pace (possibly reaching also a self-similar state), and the volume of SWR generation keeps progressing toward the preserved part, continuously ablating ionizable target material (e.g., tin) and as a result continuously generating SWR at a substantially steady state. The steady pace ablation continues until illumination 912 changes or stops, or when the SWR generation volume reaches the remote side of the target 100, in which case the continued ablation reduces the available matter for further excitation.

It should be noted that the actual contours of plasma electron density in the vicinity of the ionization target may have complex forms and the straight lines used in FIGS. 4A to 4F (932, 934, 942, 944) (and the corresponding FIGS. 4A' to 4F') are chosen for clarity of presentation of the major principles of the present disclosure, and are not intended to limit the invention or simplify the explanation in any way.

Thickness of Ionization Targets

Figure 4D:
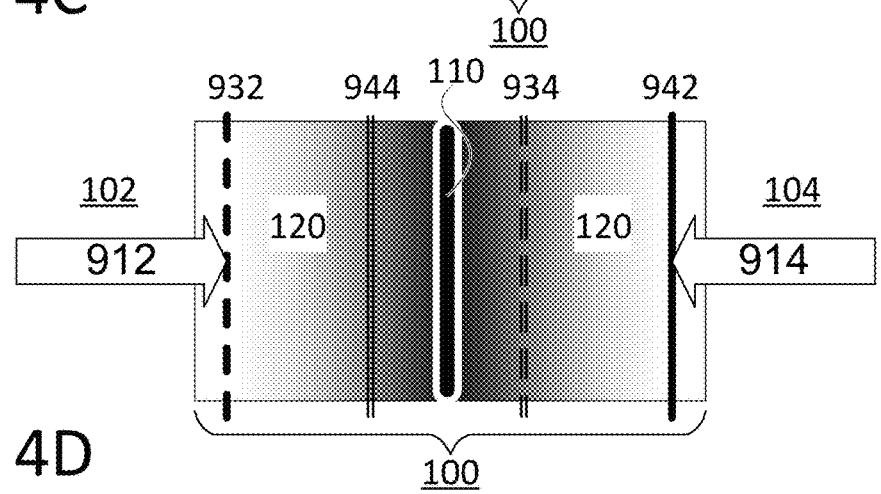
Figure 4C:
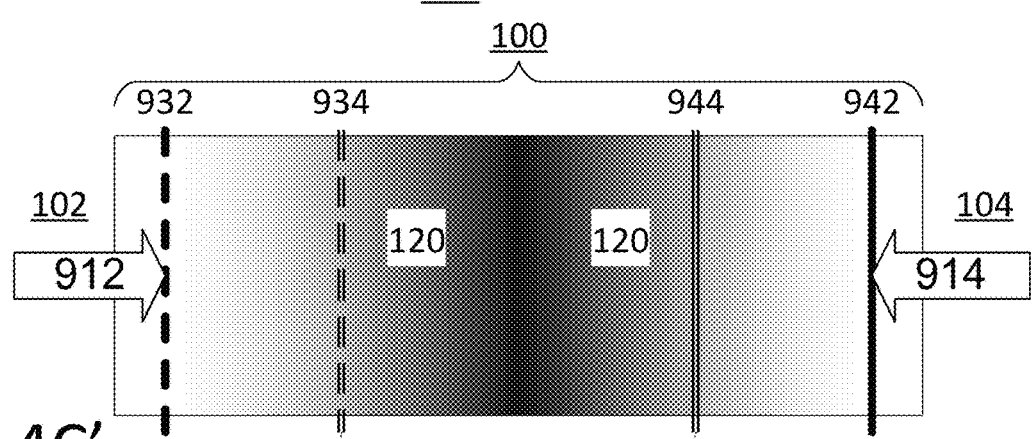
Figure 4D:
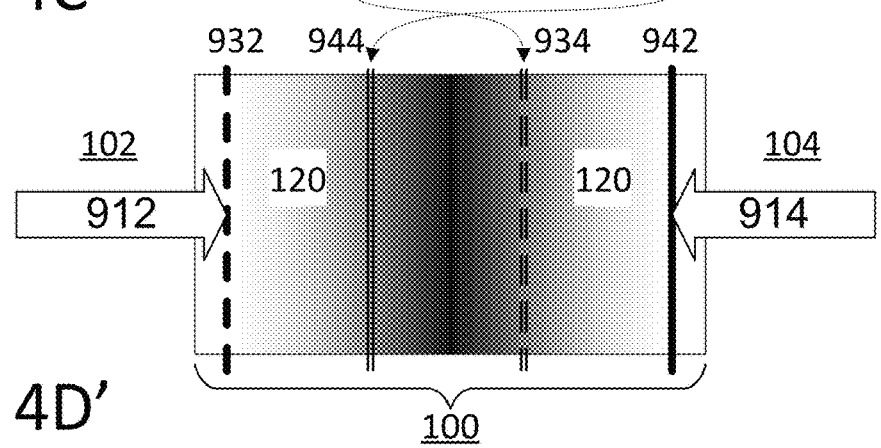

FIGS. 4C and 4D (as well as the corresponding 4C' and 4D') are schematic cross-section diagrams schematically illustrating illumination-target interaction (e.g., laser-target interaction) when both sides of the ionization target (front side 102 and back side 104) are illuminated by primary illumination, in accordance with examples of the presently disclosed subject matter. FIGS. 4C and 4C' pertain to the process in a relatively thick target 100 while FIGS. 4D and 4D' pertain to the process in a relatively thin target 100. Bidirectional illumination using first primary illumination 912 irradiating front side 102 of target 100 and second side illumination 914 irradiating back side 104 of target 100 may be achieved, for example, using system 200 and/or by executing method 500.

First illumination 912 may include (or even consist of) first illumination 902, but this is not necessarily so. For example, as discussed above, in some cases the term "first illumination 902" may be used to pertain to a pre-pulse illumination, in which case illumination 912—which is primary illumination irradiated from the front side—is different than illumination 902. In the same manner, second side illumination 914 may include (or even consist of) second illumination 904, but this is not necessarily so. It is noted that while each of illumination 912 and illumination 914 is illustrated as being provided from a single direction, either one or both of them may optionally be irradiated from multiple directions (e.g., using multiple light sources, or split beams from a single light source), mutatis mutandis. As further discussed above with respect to illumination 912, either one or both of illumination 912 and illumination 914 may be a continuous illumination (e.g., a single pulse) or an interrupted illumination (e.g., a plurality of pulses). Each instance of continued illumination in illumination 912 and/or in illumination 914 may optionally be of substantially constant intensity, but this is not necessarily so, and any form of intensity modulation may be implemented, e.g., in order to improve efficiency, or for any other reason.

The ionization target 100 shown in FIGS. 4C and 4C' is a thick target, wherein a thick target is defined as an ionization target in which there is no transfer of heat, radiation, or electrons between the interaction regions on both sides (with the possible exception of negligible transfer, e.g., of electrons, to a degree which do not affect the ionization process by more than 1%). It is noted that if a thick target (as illustrated in the examples of FIGS. 4C and 4C') is being illuminated for sufficiently long by either unidirectional or bidirectional illumination, it may turn to a thin target (as illustrated in the examples of FIGS. 4D and 4D').

A thick target is shown in FIGS. 4C and 4C', in which the interaction regions, approximately found between light penetration region 932 and heat penetration boundary 934 on front side 102, and between light penetration region 942 and heat penetration boundary 944 on back side 104 of the target are nonoverlapping. While there is no synergetic affect between the heating processes on both sides (as occurs for thin targets, as discussed below), such bidirectional target illumination scheme (which may be implemented by controller 220) may nevertheless improve the SWR generation process in system 200 (and/or when executing method 500). It is noted that the SWR generation process may derive benefit from bidirectional illumination even if SWR collection is applied only to SWR emitted from the first side (e.g., as demonstrated in FIGS. 1A, 1, and 1C).

Providing back side illumination 914 at least partly concurrently to the first side primary illumination may contribute to the SWR output in different ways, such as by eliminating or substantially reducing motion of the center-of-mass of the preserved part. Reducing or eliminating the motion of the preserved part both reduces light energy lost to kinetic energy instead of to SWR generation, and also simplifies the system/process, especially with respect to consistently directing the illumination at a target which is moving, with possibly not easily determinable position and velocity. Additionally, reduction or elimination of the center of mass momentum of the preserved part also means that less neutral ejecta is produced in the process, reducing contamination and degradation. It is noted that these beneficial effects are present regardless of the thickness of the target, meaning that double-sided illumination is implementable also for a thick target.

It should be noted that implementing a target illumination scheme by controller 220 which would reduce or even cancel the motion of ionization target 100 may be implemented for the primary illumination phase, for the pre-pulse illumination phase (if applicable), or for both. Controller 220 may implement such a target illumination scheme in any of these phases in order to improve accuracy of the illumination, to simplify the target tracking process, to improve aiming yield for the primary illumination, to reduce energy lost to kinetic energy, or for any other reasons. Such a target illumination scheme may be implemented for a thin target, for a thick target, or for any other type or shape of ionization target 100.

It is also noted that the discussion pertaining to the motion of the target referred only to center of mass motion of the preserved part, resulting from the illumination itself (primarily along the central illumination direction of primary illumination 912). However, target 100 may have initial velocity (e.g., perpendicularly to that axis central illumination direction, but not necessarily) which is not affected by illumination 912, illumination 914, or any other illumination by light assembly 202 discussed above. Additionally, it is noted that motion related to in-plane expansion of the target results from the illumination and deforms the target into a thin shape (i.e., having much smaller dimension parallel to the illumination direction than its dimension perpendicular to it). The system might be configured to enhance this effect and impart more energy into this motion, or impart it with higher energy efficiency, by employing a double-sided illumination. For example, a balanced illumination cancels out components of center of mass velocity of the preserved part which are parallel to the direction of illumination. This ultimately results in a thinner target, and/or to lower illumination energy required to achieve the same thickness. As an example, this can be employed at the pre-pulse illumination stage, in order to achieve a thinner target resulting from that illumination. As another example, this can be employed at the primary illumination, catalyzing further thinning of the target during that illumination.

Reverting to the discussion of system 200, it is noted that optionally controller 220 may be configured to determine bidirectional illumination parameters (e.g., as part of the target illumination scheme), which guarantee that illuminating ionization target 100 using the bidirectional illumination parameters would keep a velocity component of the preserved part along a central propagation direction of the first illumination under 10 m/s (in either direction). Possibly, controller 200 may optionally implement a target illumination scheme which is capable of maintaining the absolute value of the velocity component of the preserved part along a central propagation direction of the first illumination under 0.1 m/s, under 1 m/s, under 5 m/s, or under 20 m/s.

The controller 220 may optionally be further configured to trigger bidirectional illumination of ionization target 100 in compliance with the determined bidirectional illumination parameters, thereby maintaining the speed under 1 m/s. The bidirectional illumination parameters include at least one of the following: respective timing and power of first illumination 902 and of second illumination 904. Thus, the bidirectional illumination scheme may optionally be configured such that the ratio between (a) energy of the front side primary illumination converted to heating of the ionization target and (b) energy of the front side primary illumination converted to motion of a center-of-mass of the preserved part may exceed 10:1.

A thin target, as shown for example in FIG. 4D, is defined as a target which is thin enough such that the interaction regions on both sides (found mostly between light penetration region 932 and heat penetration border 934 on front side 102, and between light penetration region 942 and heat penetration border 944 on back side 104 of the target) are at least partly overlapping. Clearly, whether a target is considered thin depends on system parameters, such as material properties of the target, intensity and wavelength of the illumination on either side and so on. For example, for targets having certain widths, overlap between the interaction regions on both sides of the target may be reached in systems with stronger light sources but not in systems of lesser intensity. As another example, for targets having certain widths, overlap between the interaction regions on both sides of the target may be reached in systems of relatively short illumination wavelength (for which the critical density is higher), but not in systems where a longer illumination wavelength (having lower critical density) is used.

Below a certain thickness of the target, heat and electrons and photons from one side of the target can travel into the other side and affect the plasma density, the temperature profiles, and/or other properties of plasma there. In addition, SWR (and radiation in other parts of the spectrum) emitted by the plasma on one side might travel through the sample and be absorbed in the plasma on the other side, or even escape to the other side altogether. The SWR output from a thin target, on both sides, is hence sensitive to the thickness of the target. The thickness under which a target can be considered a thin target depends, among other factors, on the wavelength of the exciting laser, which determines the distance the laser radiation will travel into the plasma until it is absorbed in it. Depending on the implementation of system 200, and below certain thickness of the target, the second illumination 904 may increase the amount of SWR emitted from the first side by a significant amount (e.g., by at least 5%, by at least 10%, by at least 25%, by at least 50%, by at least 100%, and so on).

Referring to FIGS. 4D and 4D' and to system 200, it is noted that optionally, ionization targets 100 must meet a thinness criteria relating to different timings with respect to the SWR generation process. Such criteria, if implemented, take into account that it is possible to start with a relatively thick target, but time-sensitive thinness criteria may be observed in system 200 in order to utilize the bidirectional illumination for effective SWR generation. For example, the thickness of ionization target 100 may be required to meet a thinness criteria ensuring that parts of ionization target 100 (e.g., between regions 934 and 944) are concurrently heated by both the front side primary illumination (e.g., 902, 912) and the back side primary illumination (e.g., 904, 914), in any selected combination of one or more of the following points at time (e.g., selected based on the specific implementation of system 200, and on its intended SWR output parameters):

a. When illuminated by both first illumination 902 (or illumination 912, if different) and second illumination 904 (or illumination 914 respectively, if different than illumination 904);
b. At the beginning of the primary illumination (which excites ionizable target material and results in significant emission of SWR) of ionization target 100 (during which ionization target is subject to bidirectional illumination), possibly after a brief ramp up time for the ablation process to begin.
c. At the beginning of subjecting ionization target 100 to bidirectional illumination during the primary illumination of ionization target 100, possibly after a brief ramp up time for the ablation process to begin.
d. Upon beginning of SWR emission from the ionization target.
e. Upon beginning of the second illumination.
f. Upon beginning of the latter out of the main front side illumination and the main back side illumination.

It is noted that the concurrent heating takes place during at least part of the duration of the respective front side illumination and during at least part of the duration of the respective back side illumination.

Optionally, system 200 may be designed (and/or method 500 performed) such that the thickness of ionization target 100 in any one or more of the aforementioned points in time (a-d of last paragraph) is between 10 nm to 250 nm. Optionally, system 200 may be designed (and/or method 500 performed) to implement even more strict thinness criteria, such that the thickness of ionization target 100 in any one or more of the aforementioned points in time (a-d of last paragraph) is between 10 nm to 100 nm. Optionally, system 200 may be designed (and/or method 500 performed) to implement even more strict thinness criteria, such that the thickness of ionization target 100 in any one or more of the aforementioned points in time (a-d of last paragraph) is between 10 nm to 50 nm. By way of comparison, some prior art EUV generation systems use much thicker targets, e.g., over 0.5 µm.

Optionally, a thickness of unablated material of ionization target 100 between its front side 102 and its back side 104 (measured along a cross-target axis) is less than 250 nm upon beginning of SWR emission from the ionization target and/or upon beginning of the second illumination. Optionally, the cross-target axis may coincide with the central illumination direction of first illumination 902, but this is not necessarily so. Optionally, the cross-target axis may coincide with the optical axis of the collection. Optionally, the cross-target axis may be perpendicular to a symmetry plane defining a substantial mirror symmetry of the target. Such a symmetry plane may be represented, for example, by line 108.

Optionally, a length of ionization target 100 along a first direction perpendicular to the cross-target axis is at least 5 times the thickness (e.g., the vertical dimension of target 100 in the diagrams is at least 5 times longer than the horizontal dimension of target 100) and wherein a length of the ionization target along a second direction perpendicular to the cross-target axis and to the first direction is at least 5 times the thickness (referring to the diagrams, an example is that the cross-section illustrated has a rotational symmetry, and therefore the depth dimension of the target is identical to the vertical dimension of the target 100). It is noted that the ×5 factor is merely exemplary, and much higher ratios may occur between the dimensions (e.g., ×10, ×100, ×1,000, and so on).

Imbalanced Bidirectional Illumination

The target illumination scheme to which an ionization target 100 is subjected during the SWR generation process (e.g., as implemented by controller 220) may be a balanced target illumination scheme, an imbalanced target illumination scheme, or a partly-balanced target illumination scheme. A bidirectional illumination is said to be balanced if it features a form of symmetry between first illumination 902 and second illumination 904. A partly balanced target illumination scheme is a target illumination scheme in which during some of the stages (e.g., shaping using pre-pulses, exciting illumination) and/or during some spans of time the illumination is balanced, while in other times it is imbalanced. For example, the preliminary shaping phase may include balanced illumination (e.g., symmetrical application of pre-pulses from front side 102 and from back side 104) while the primary illumination may be imbalanced. In another example, the preliminary shaping phase may include imbalanced illumination while the primary illumination may be balanced.

Optionally, any symmetry referred to above (either using the word "symmetry" or pertaining to the concept of balance) may be a strict symmetry (e.g., in which the light sources are arranged in symmetrical fashion in the front side and in the back side). Optionally, the symmetry may be any one or more of the following less strict types of symmetry: functional symmetry (the function or role of the components on each side is performed symmetrically, irrespective of the physical differences in the components themselves), effective symmetry (the output or result of the operation is identical on both sides, irrespective of the physical arrangement of the components), energetic symmetry (the energy input or output on each side of the system is identical, regardless of the different configurations of the energy sources), kinematic symmetry (the motion, momentum and/or impulse induced by the system is symmetrical, irrespective of the variations in the causative factors), dynamic symmetry (the change or variation in the system over time is equivalent on both sides, regardless of the different initial conditions or inputs, ablative symmetry (the removal, excitation, or reduction of material on each side is symmetrical, regardless of the different intensity or configuration of the ablating sources).

It is noted that optionally, second side illumination 914 may be different than first primary illumination 912 in any one of many different ways. For example, second side illumination 914 may be of different intensity (e.g., of lower intensity), of different wavelength, of different duration, emitted at different timings (e.g., starting sooner or later than first primary illumination 912, ending sooner or later than first primary illumination 912, having a different repetition rate than first primary illumination 912 if applicable, and so on). It is noted that optionally, second illumination 904 may be different than first illumination 902 in any one of many different ways. For example, second illumination 904 may be of different intensity (e.g., of lower intensity), of different wavelength, of different duration, emitted at different timings (e.g., starting sooner or later than first illumination 902, ending sooner or later than first illumination 902, having a different repetition rate than first illumination 902 if applicable, and so on).

It should be noted that when the terms "nonsymmetric" or "asymmetric" in the context of this present patent application may pertain to different levels of diversion from symmetry, e.g., as discussed below.

Intensity Imbalance in Bidirectional Illumination

Optionally, an intensity of the back side illumination impinging on illumination target 100 at any one stage of the SWR generation (e.g., shaping stage, primary heating stage) may be substantially different than the front side illumination impinging on illumination target at that respective stage. While not necessarily so, the intensity of the back side illumination in such case may be lower than that of the corresponding first side illumination, e.g., by a factor of at least ×2, by a factor of at least ×4, by a factor of at least ×8, by a factor of at least ×25. For example, optionally, the intensity of the second illumination 904 (e.g., shaping second illumination or main second illumination) may be lower than an intensity of corresponding first illumination 902 (e.g., shaping first illumination or main first illumination, respectively) by a ratio of at least 1:2 (or by even more imbalanced ratio, such as at least 1:4, at least 1:8, at least 1:25, and so on). It should be noted that while some heating of the target may also occur in the shaping stage (if implemented), such heating is usually minor when compared to the heating of the primary heating stage, and it is not the essence of the shaping stage. In comparison, the heating of the primary heating stage is such which results in emission of substantial amounts of SWR.

Figure 4E:
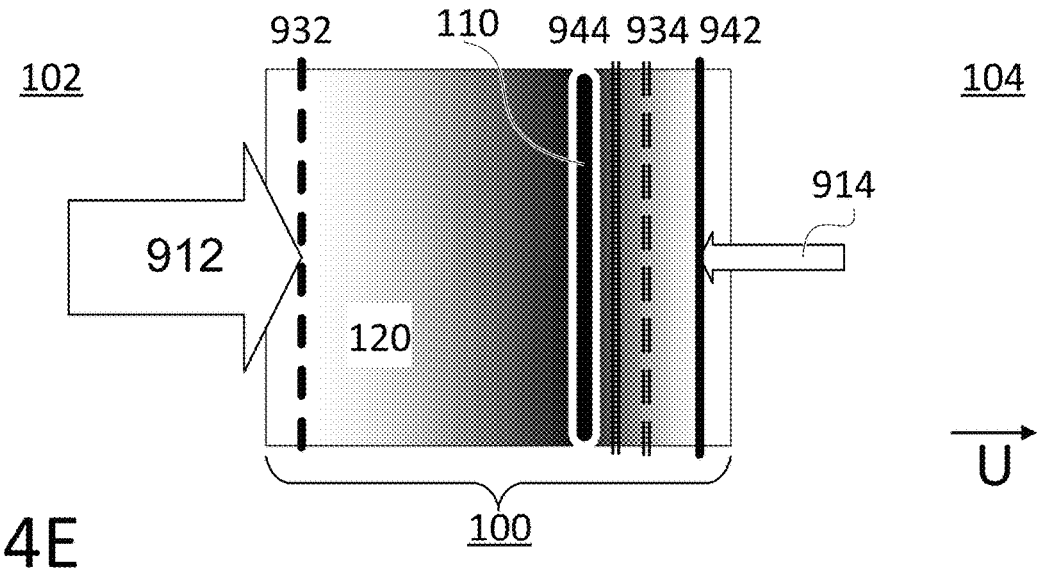
FIG. 4E is a schematic cross-section diagram schematically illustrating illumination-target interaction when both sides of the ionization target are subjected to illumination of imbalanced intensity.

FIG. 4E is a schematic cross-section diagram schematically illustrating illumination-target interaction (e.g., laser-target interaction) when both sides of the ionization target (front side 102 and back side 104) are subjected to illumination of imbalanced intensity, in accordance with examples of the presently disclosed subject matter.

As discussed above in great detail, bidirectional illumination in SWR generation systems and methods may be used in order to improve the primary heating and exciting process of the ionization target by affecting the plasma density, the temperature profiles, and/or other properties of plasma during that process. However, bidirectional illumination may also be used in other ways during the SWR generation process, e.g., by cancelling or reducing the movement of the ionization target resulting from the light-target interaction, e.g., as discussed above. It is noted that the kinematic effects of the light-target interaction are not expected to have linear correlation to the intensity of impinging light, and it is therefore possible (in at least some operational scenarios) to at least partly offset the kinematic effect of front side illumination (e.g., first illumination 902) using lower intensity back side illumination (e.g., second illumination 904), and vice versa. For example, if front side illumination of intensity I induces force F onto the illumination target, it is possible to implement back side illumination of intensity a·I to induce force (−b)·F by the back side illumination, where b>a. Such countering effect would happen, for example, if a=0.1 and b=0.8, if a=0.5 and b=0.95, and so on. If in any one of the sides multiple light beams are used, the combined intensity of these light beams (optionally averaged to compensate for differing angles) may be considered.

It is noted that using lower intensity illumination on one of the sides (e.g., the back side) may be implemented for any one or more reasons such as: lower cost of light source, lower cost of operation, lower power consumption, use of different type of light source, simplification of the SWR generation system, reducing amount of undesired particles emitted from the process (e.g., ions, ejecta, etc.), and so on.

Spectral Imbalance in Bidirectional Illumination

Optionally, a wavelength of the back side illumination impinging on illumination target 100 at any one stage of the SWR generation (e.g., shaping stage, primary heating and exciting stage) may be substantially different than a wavelength of the front side illumination concurrently impinging on illumination target at that respective stage. For example, a central wavelength of the front side illumination (e.g., first illumination 902) may be longer than a central wavelength of the back side illumination (e.g., second illumination 904) by at least 20%. In other examples, the central wavelength of the front side illumination (e.g., first illumination 902) may be longer than a central wavelength of the back side illumination (e.g., second illumination 904) by a factor of between ×1.1-×1.2, by a factor of between ×1.2-×1.5, by a factor of between ×1.5-×5, or even longer. It is noted that if types of light sources other than laser are used in system 200, the differences of at least 20% may apply to other spectral parameters of the two illumination such as peak wavelength, spectral band, and so on. Configurations in which the back side illumination has a shorter central wavelength than concurrent front side illumination may also be implemented.

Figure 4F:
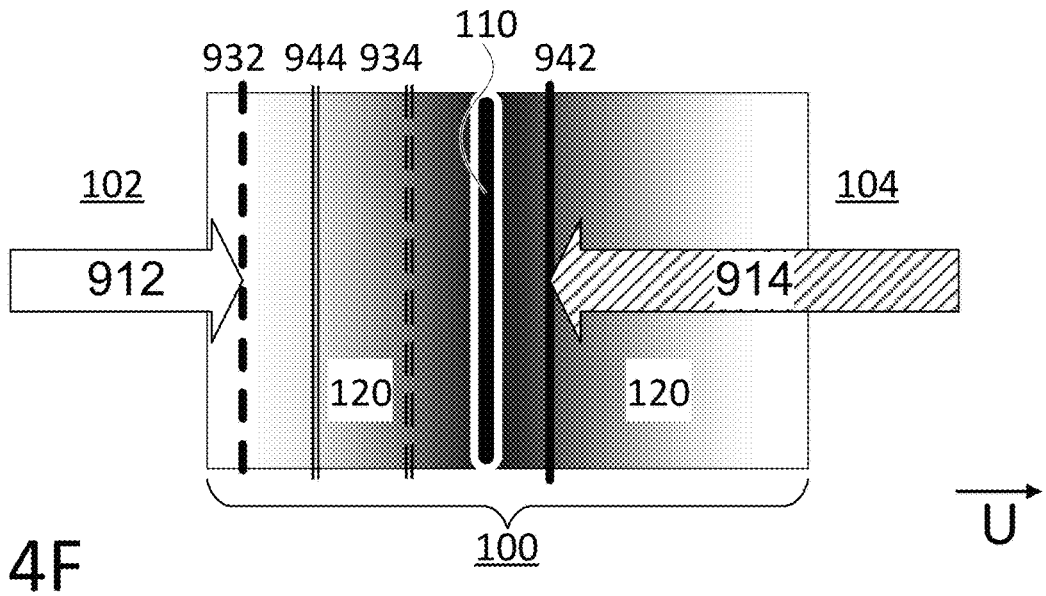
FIG. 4F is a schematic cross-section diagram schematically illustrating illumination-target interaction when both sides of the ionization target are subjected to illuminations of different wavelengths.
Figure 4E:
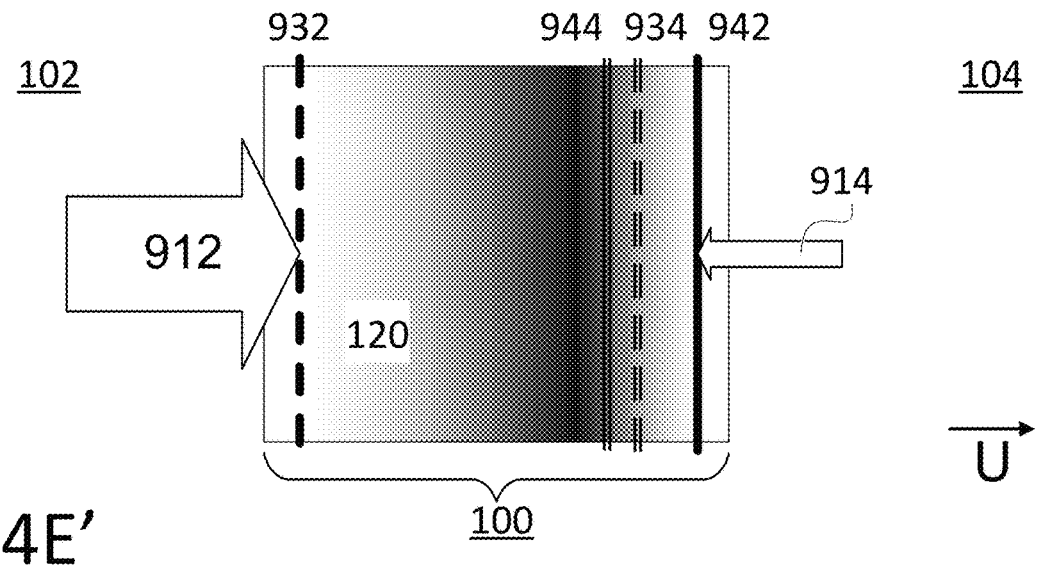
Figure 4F:
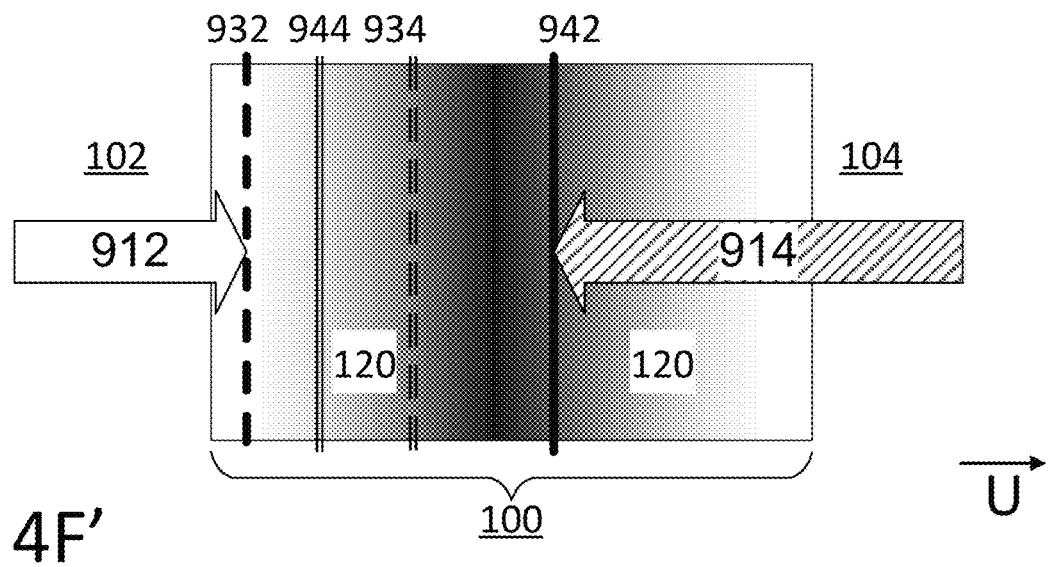

FIG. 4F is a schematic cross-section diagram schematically illustrating illumination-target interaction (e.g., laser-target interaction) when both sides of the ionization target (front side 102 and back side 104) are subjected to illuminations of different wavelengths, in accordance with examples of the presently disclosed subject matter. For example, at least one first light source 210 emitting first illumination 902 may be a laser having wavelength of 10.6 µm (CO2 Laser), while at least one second light source 211 emitting second illumination 904 may be a laser having wavelength of 1.06 µm (Nd:YAG) (represented as the pair (10.6 µm, 1.06 µm)). Other wavelengths which may be used in any combination include 9.6 um, 1.04 um, 800 nm, 1.05 um, 2 um, 532 nm and so on.

The ability of illumination (e.g., laser light) to infiltrate a plasma cloud is modulated by several parameters, including laser wavelength, plasma density, and ionization state. The laser's penetration depth is primarily determined by the relationship between the plasma's electron density and the laser's critical density—a measure directly proportional to the square of the laser frequency. High-frequency (shorter wavelength) lasers correspond to a higher critical density, allowing such lasers to penetrate deeper into plasmas with a density less than this critical value. Conversely, low-frequency (longer wavelength) lasers exhibit a lower critical density, potentially limiting penetration in plasmas with densities above this critical threshold. Further influencing this interaction are the mechanisms of Inverse Bremsstrahlung Absorption and Resonance Absorption, both of which can absorb the laser light, effectively decreasing its penetration depth, and are more prominent at shorter wavelengths. It is noted that the specific conditions of the plasma also affect penetration depth, e.g., temperature, density, and composition.

When discussing bidirectional primary illumination at the primary heating stage of the SWR generation process, it is noted that illuminating the back side 104 with shorter wavelength illumination that is casted on front side 102 means that the second illumination 904 penetrates deeper into ionization target 100, and the interaction between the heating caused by first illumination 902 the heating caused by second illumination 904 happens closer to front side 102. That means that optionally, interaction of second illumination 904 with ionization target 100 creates little or no SWR on back side 104, while still contributing to effectiveness of SWR generation at front side 102. Implementing such spectral imbalance in the bidirectional illumination of system 200 (or method 500) may therefore enable system 100 to work with relatively thick targets (e.g., thicker than 0.25 µm, thicker than 0.5 µm, thicker than 1 µm, and so on), while still achieving synergetic heating effect (and thus an improved SWR generation) using bidirectional illumination. Thus, benefits of bidirectional illumination in SWR system 200 may be obtained when using an ionization target source (e.g., tin droplet injector) which generates relatively thick targets, which may be simpler, cheaper, or preferable for any other reason. It should be noted that optionally, especially (but not only) if spectrally different back side illumination is used is such a way, controller 220 may implement a target illumination scheme in which second illumination 904 is stopped while first illumination is still being casted (e.g., in order to not to interfere with the SWR generation toward the end of the primary heating phase).

Using spectrally imbalanced bidirectional illumination in such a way may be optionally implemented in system 200 in which SWR is collected by optics assembly 230 only from front side 102 of ionization target. However, this is not necessarily so, and spectrally imbalanced bidirectional illumination may be used in system 200 in which SWR is collected by optics assembly 230 from both front side 102 and back side 104 for different reasons, some of which are discussed below.

Using a back side illumination with a different wavelength than the front side illumination may also be used for other reasons such as motion compensation (offsetting motion resulting from the front side illumination), shaping of the ionization target (e.g., using a cheaper back side light source for back side pre-pulses), and so on. Also, implementing spectrally imbalanced bidirectional illumination in system 200 (or method 500) means that it is possible to choose a second light source 211 which is cheaper, more reliable, simpler to implement, or otherwise preferable. Choosing a light source of different wavelength also means optionally, second light source may even include types of light sources which may be less desirable for first light source 210 in some situations, such as solid-state lasers, quasi-continuous-wave (QCW) laser, and so on.

In the following numerical example, it is shown that choosing shorter wavelength for the back side illumination, e.g., a solid-state laser, can be translated into improved wall-plugged efficiency. Consider a prior art system with a 100 ns-long front side pulse with 1J energy at wavelength of 10 µm, produced by a $CO_2$ laser having 1% wall-plugged efficiency. In the present disclosure, a back side illumination may be implemented by a 1 µm solid-state laser having 10% wall plug efficiency. The back side laser pulse may be 50 ns long and timed to temporally overlap with the later 50 ns of the front side pulse, and to contain 0.5 J of energy. While the overall laser input energy increases by 150%, the input electrical energy is only raised by 5%. As a result, the collected SWR increases: an increase of only 5% (e.g., from 500 to 525 W) corresponds to unchanged CE, and an increase of 25% (e.g., from 500 to 625 W) corresponds to almost 20% improvement in the overall CE. While improving wall plug efficiency is not the only motivation for utilizing this scheme, this example demonstrated the potential of the scheme to improve the CE from electricity to laser. There are several additional benefits to utilizing this scheme: (a) the above-mentioned improvement in CE, (b) this is a way to extract more SWR out of the system (regardless of the cost or energy consumption of the system, utilizing bidirectional illumination as disclosed in the present disclosure may be the only physically viable way to have a SWR system of a given dimensions and target rate to emit more SWR), and (c) extracting more SWR out of the system without adding target material to the chamber (e.g., without increasing the amount of tin in the chamber).

Using Light Source of Different Types for Bidirectional Illumination

Following the examples provided above, it is noted that in some cases one or more second light sources 211 used for illuminating back side 104 of ionization targets 100 may be of outright different type of light source than at least one first light source 210 used for illuminating front side 102 of the ionization targets 100.

For example, light assembly 202 may include a group of at least one gas laser collectively configured to emit the first illumination (i.e., system 200 may include at least one first light source 210 which is a gas laser), and a group of at least one solid-state laser collectively configured to emit the second illumination (i.e., system 200 may include at least one second light source 211 which is a solid-state laser).

Such a combination of light sources of different types (e.g., gas lasers and solid-state lasers) in system 200 may be selected for varied reasons, such as (but not limited to) cost, simplicity, required wavelength, required intensity, power efficiency, reliability, and so on. For example, using a solid-state laser as second light source 211 may allow higher wall-plug efficiency than that of a typical $CO_2$ laser which may serve as first light source 210 used for illuminating front side 102. Solid-state lasers are simpler, more reliable, and cheaper. For example, the wall-plug efficiency of $CO_2$ laser might be 1% or less, and that of a solid-state laser might be as high as 10%. This also contributes significantly to the conversion efficiency (CE) of the whole scheme, when considering CE from electricity to SWR.

Temporally Imbalanced Bidirectional Illumination

Optionally, the timing of first illumination 902 may be different than the timing of a partly concurrent second illumination 904 that illuminates the same ionization target 100. Especially, the timing of the front-side primary illumination may be different than the timing of a partly concurrent back-side primary illumination that illuminates the same ionization target 100. The timings of these illuminations may differ in various temporal parameters such as: start time, end time, duration, repetition rate (if applicable), duty cycle (if applicable). Such temporal parameters may be predefined, or may be controlled and optionally determined by controller 220 (e.g., as part of the target illumination scheme). Below are several examples of differences in temporal parameters between first illumination 902 and second illumination 904, pertaining primarily (but not exclusively) to front-side primary illumination and to back-side primary illumination. In the following discussion, any time first illumination 902 and second illumination 904 are referred to, those terms—in the context of the following paragraphs—may pertain to front side primary illumination (e.g., 912) and to back side primary illumination (e.g., 914):

a. Optionally, controller 220 may be configured to control light assembly 202 to initiate second illumination 904 at least Δt after the initiation of the first illumination. For example, Δt>1 ns, Δt>2 ns, Δt>10 ns, Δt>10 ns (ns being the International System of Units symbol for nanosecond). Starting the second illumination after the first illumination may be used, for example, in cases a relatively thick ionization target 100 is used at the beginning, and controller 220 triggers the second illumination 904 at a time in which ionization target 100 is already relatively thin (due to ablation), and the synergetic effects of bidirectional illumination may have a significant effect. This is useful, for example, if system 200 implements collection of SWR emitted only from front side 102. It is noted that in such a case, second illumination 904 may end before, after, or concurrently with the end of first illumination 902. Another example of a possible reason to implement such a scheme (e.g., starting the backside illumination after the front side primary illumination started, such as 10 ns-30 ns later than the start of the front side primary illumination) is to improve the SWR output from the front side of the ionization target 100, which may deteriorate compared to the earlier stages for various reasons (e.g., resulting from the dynamics of transmission of SWR into the back side, as the target's bulk becomes thinner). Other examples of a possible reasons to implement such a scheme are that laser technology that satisfies key requirements (e.g., of wavelength, energy, repetition rate etc.) of the system is only available having certain maximal pulse length. Additionally, such a back side laser with shorter pulse than the front side pulse might be more energy or cost effective. Another reason to terminate the back side illumination no later than the termination of the front side illumination is that such imbalanced illumination might result with increased propulsion of neutral ejecta towards the front side and specifically toward the collection optics. This might catalyze degradation of the collection optics.

b. Optionally, controller 220 may be configured to control light assembly 202 to initiate second illumination 904 after the first illumination reduced a width of the ionization target from at least 0.3 μm to less than 0.2 μm. This option may be implemented for similar reasons to the previous ones. It is noted that in such a case, second illumination 904 may end before, after, at concurrently with the beginning of first illumination 902.

c. Optionally, controller 220 may be configured to end second illumination 904 before the end of the first illumination 902. An example in which such a temporal difference may be selected was discussed above with respect to spectrally imbalanced bidirectional illumination. It is noted that in such a case, second illumination 904 may start before, after, at concurrently with the beginning of first illumination 902.

It is noted that other temporal differences may also be implemented. For example, optionally second illumination 904 may end after first illumination 902 ends, optionally second illumination 904 may start before first illumination 902 starts. While the pulses duration of the front side primary illumination may be selected according to various considerations (such as the ones discussed above), some example durations include first illumination 904 pulses of between 10 ns-50 ns, between 50 ns-150 ns, between 150 ns-500 ns.

Coming back to the example in which controller 220 times pulse of first illumination 902 to hit the ionization target 100 first, and as the ablation caused by first illumination continues, the thickness of the ionization target drops. Controller 220 may then time second illumination 904 to hit ionization target 100 later, e.g., when it becomes a thin target. In such case, the loss of energy that is absorbed at back side 104 at times in which ionization target 100 is a thick target (e.g., if SWR is collected only from front side 102) may be avoided, wherein this loss of energy may reduce the CE significantly. When ablating a thick target, the illumination of back side 104 contributes mostly to SWR that is emitted from back side 104 (assuming a suitable second light source 211 is used), with small to negligible positive effect on SWR emission from front side 102. Therefore, this scheme is beneficial in a single sided SWR collection scheme, as it adds energy to ionization target 100 mostly at times where the CE to the front side is most affected by it. Although the overall SWR output of this scheme might be lower than what is possible using a completely balanced (i.e., concurrent) double-sided illumination (even in single sided SWR collection), the total CE is typically significantly higher. However, comparatively late starting of second illumination 904 in such case does not invoke from the beginning of light-target interaction the possibly desired effects of target stabilization and mitigation of energy loss to kinetic energy. For this reason, it is possible to initially start second side illumination at a lower intensity or using a different wavelength (e.g., in order to reduce kinetic effects of first illumination 902), and at a later time (e.g., at the aforementioned Δt, or after the width of the ionization target 100 was reduced by ablation to less than 0.2 μm) increase the intensity of backside illumination 904 to achieve also the synergetic plasmatic effects discussed above.

This effect may also occur at the end of the front side pulse, the target at this stage may not be thick but the plasma cloud at the front side may be large enough to reduce the contribution of the backside pulse to SWR generation at the front side. Therefore, the controller 220 may be configured to end the second illumination before the end of the first illumination. The backside pulse duration and timing may be tuned in such a way that the energy transfer and the contribution of the secondary pulse will be effective enough.

Bidirectional Kinematic Feedback

As mentioned above, system 200 may optionally include one or more sensors 250 that are configured to provide to controller 220 information indicative of kinematic parameters of target 100, such as location within system 200 (and especially within its SWR emission module 290), orientation, shape, size, velocity, acceleration, spin, etc. Optionally, one or more sensors 250 may provide to controller 220 information indicative of other parameters of the target 100 (e.g., temperature, color, structure, position, velocity), of other components of the system (e.g., laser orientation, temperature), and so on. Controller 220 may use such parameters to control the operation of light assembly 202, of optics 212, of optics 214, or of any other component of system 200. While not necessarily so, controller 220 may utilize both front side illumination and back side illumination in order to control a feedback based kinematic control of ionization target 100 within system 200 (e.g., controlling illumination from both sides in order to direct ionization target 100 towards region 190). While not necessarily so, controller 200 may control changing operational parameters of light sources and/or optics used for illumination of ionization target 100 on both sides of ionization target 100, based on the data provided by the sensors (e.g., sensors 250). Optionally, controller 220 may be configured to control spatial alignment of first illumination 902 and of second illumination 904 during a concurrent emission of first illumination 902 and of second illumination 904. For example, the spatial alignment between first illumination 902 and second illumination 904 may include concurrently directing both illuminations 902 and 904 to a spot in which ionization target 100 is momentarily positioned, potentially following ionization target 100 as it moves through an internal space of system 200. For example, the spatial alignment between first illumination 902 and second illumination 904 may include at least 90% spatial overlap between the front optical mode and the back optical mode on the plane of the target (i.e., spatial overlapping the two beams) of the least 95% spatial overlap between the two, at least 99% spatial overlap between the two.

Contaminants Management in Bidirectional SWR System

SWR generation process which includes exciting ionization targets 100 in order to induce plasma generation, and in turn emission of SWR, is often characterized by emission of resulting undesirable contaminants, which may reduce the effectivity of the SWR generation process and also possible long-term damages to system 200 itself (e.g., to the mirror or other optical components). Such contaminants may include, for example, tin debris (or debris of other ionization target material used if different; the ionization material may form unintended particulates, often in the form of non-ionized particles that get dislodged during the SWR generation process), ionized particles (i.e., particles that have been charged during the process. these particles can cause damage to the collector mirror and other components due to their high energy), neutral particles (particles that maintain their neutrality and do not get ionized during the process), and energetic photons (this includes all forms of emitted light energy, specifically, high-energy photons that are not part of the desired SWR emission; these photons can cause damage to sensitive equipment).

Optionally, system 200 may implement bidirectional illumination in a way which either reduces the amount of such contaminants, or change their composition. For example, system 200 may implement a target illumination scheme which increases the relative portion of charged particles (especially ions) within the totality of emitted contaminants in comparison to neutral particles (e.g., in comparison to unidirectional illumination).

System 200 may optionally include an Electromagnetic Ion Steering Module (EISM), which is operable to induce electromagnetic forces for steering ions and other charged particles away from ionization target 100 (e.g., into a charged particle collection module). Such an EISM may include any suitable component for generating, amplifying, directing, or otherwise controller magnetic, electric, or electromagnetic fields, such as (but not limited to): coil systems, permanent magnets, superconducting magnets, electromagnets, capacitor plates, electric and magnetic field generators, electrodes, radio frequency (RF) fields generators, hall effect thrusters, quadrupole ion traps, triple quadrupole systems, and ion optics. It should be noted that the configurations of the EISM may be implemented to match the configuration of the at least one illumination module and/or the at least one collection module. In particular, the EISM might optionally be double-sided or multi-sided with respect to ionization target 100 in embodiments where double sided illumination and/or collection are employed. The configuration of the EISM may be affected by the characteristics of generated charged debris, which is related to the illumination configuration. It may also be affected by the configuration of various elements of the collection module, which are to be protected by the EISM from the impact of said charged particles. It is noted that EISM may be implemented on one side of the target (front or back), on both sides of the target, and so on. The implementation of the EISM may be balanced on both sides (i.e., have front-back symmetry) or not.

Such an EISM may have synergetic effect in system 200 with a bidirectional target illumination scheme which bolsters generation of charged particles on the expense of neutral particles. For this reason, it is possible to use back side illumination in SWR generation system 200 even solely for the effect of bolstering ion generation, to be combined with the aforementioned EISM. Pertaining for example to the examples of FIGS. 4E and 4F, it is noted that bolstering ion generation may be achieved using relatively week back side illumination, back side illumination of a different wavelength (e.g., selected to maximize ion generation on the expense of neutral particles), and/or different type of laser.

It is noted that alternatively (or in addition), for utilizing the heightened proportion of ions-to-neutral-particles for removing contamination, it may also be utilized, using one or more electromagnetic component (e.g., such as those discussed with respect to the EISM) for other ends, such as confinement of plasma, in order to make the SWR generation process more efficient. System 200 may implement one of these uses, or more than one (e.g., at different times at the process).

Efficient Target Heating Using Bidirectional Illumination

Looking at the process of SWR emission as a result of excitation of ionized target material in system 200, it is noted that the efficiency of this process may be improved in different ways, by implementing different operation parameters for different components of system 200.

For example, introducing back side illumination concurrently with the primary front side illumination may be designed to increase the efficiency of the process by shortening density and temperatures gradients within the illuminated ionization target 100. Since ionization target 100 is being heated in a nonuniform manner, bringing some areas of the target to efficient SWR generation energies (e.g., between 30-70 eV) results in other parts of the target being heated to substantially lower energies (e.g., 1-15 eV) which requires significant energy for the heating, but does not result in substantial SWR emission. It is noted that the term "temperature" in the context of the present disclosure may be used to describe an equivalent temperature of the energy density in parts of the plasma, as commonly used in the art.

System 200 may utilize bidirectional illumination (e.g., as discussed with respect to FIG. 4D) for narrowing the size of such areas (which are very hot yet not sufficiently hot for effective SWR emission), thereby improving the conversion efficiency of system 200. Bidirectional illumination may also be used in system 200 for maintaining a clean process, by significantly limiting the creation of neutral ejecta, as the vast majority of the ionizable material of ionization target 100 is being burnt by the bidirectional illumination.

Optionally, controller 220 may be configured to:
a. Apply (and possibly previously determine) bidirectional illumination parameters (e.g., timing parameters, power parameters, or any other illumination parameters discussed with respect to system 200) for minimizing an amount of parasitic or other unwanted ejecta (e.g., neutral ejecta, multi-atomic aggregates) which is ejected from ionization target 100, thereby minimizing deterioration of different components of system 200 (or even damage to other modules like a lithography mask, etc.); This stage may apply to the preliminary (shaping) radiation (if implemented) and/or to the primary ionization radiation.
b. Trigger bidirectional illumination (optionally at least partly concurrently) of the ionization target in compliance with the determined bidirectional illumination parameters.

Optionally, an optical conversion efficiency of SWR generation is at least 20% (e.g., 20-30%) higher when both the front side and the back side of the ionization target are illuminated compared to implementations or times in which only one side of the ionization target is illuminated. An optical conversion efficiency of SWR generation is the ratio between: (a) the power of SWR collected from the front side by the optical assembly, and (b) the light power of the first illumination, Combinations of Different Illumination Parameters in Bidirectional Illumination In the paragraphs above many ways in which the first side illumination—whether preliminary illumination (e.g., prepulses), primary heating illumination, or else—may differ than the concurrent (or partly concurrent) illumination irradiated onto ionization target 100 from the back side. While there are many ways of implementing asymmetric (i.e., imbalanced) illumination in system 200 (and method 500), e.g., as discussed above, symmetrical (i.e., balanced) illumination may also be very useful in many cases, especially when SWR is collected symmetrically from both sides (e.g., as discussed below, such as with respect to FIGS. 5 and 7). If bidirectional but imbalanced SWR collection is implemented (e.g., collecting a comparatively large quantities of SWR emission from front side 102 while collecting smaller quantities of SWR emission from back side 104)—e.g., as discussed below, such as discussed with respect to FIG. 8—the illumination may also be implemented in an imbalanced fashion, for any number of reasons (e.g., reducing cost, reducing power consumption, improving CE, simplifying geometric constrains, and so on.)

It is noted that in imbalanced implementation of illumination and/or imbalanced implementation of SWR collection in system 200 (and 500) may include some aspects being implemented symmetrically, while other aspects being implemented non-symmetrically to differing degrees. For example, the wavelength and pulse timing of illumination may be different on both sides of the target, while the geometric arrangement of the light source is symmetric.

As aforementioned, symmetric aspects of implementation may be fully symmetric, or fulfil any combination of one or more of the following types of symmetry: functional symmetry, effective symmetry, energetic symmetry, kinematic symmetry, and dynamic symmetry (all of which were discussed above). When a technical aspect of system 200 (e.g., of illumination, of collection) is "nonsymmetric" or "asymmetric" with respect to any of these definitions of symmetry, the degree of deviation from symmetry may differ. For example, the difference in durations of primary light pulse from both sides may be 5-10%, but it may also be 50-100%, and so on. The degree of difference between implementation on the front side and on the back side of the system may depend on various system design considerations, many examples for which were provided above.

A nonexhaustive list of illumination related parameters includes: geometrical arrangement (e.g., of light sources, optical components, illumination directions, angle of incidence, etc.), energy, power, spot size, intensity, timing parameters, wavelength (or other spectral parameters), types of light source. Optionally, the illumination aspect of system 200 (e.g., as implemented by any one or more of: light assembly 202, controller 220, optics 212, 214) may include symmetric implementation of a first subgroup of any one or more of the aforementioned illumination related parameters and a nonsymmetric implementation of a second subgroup of any one or more of the aforementioned illumination related parameters. Some examples were given above, but these examples are not exhaustive, and all practical combinations may be implemented, and are not detailed for reasons of brevity of the disclosure.

A nonexhaustive list of collection related parameters includes: geometrical arrangement (e.g., of optical component, collection directions, optical output ports, size), optical characteristics (e.g., lens power, focal distance), timing parameters, collected wavelength (or other spectral parameters), amount of collected SWR, percent of emitted SWR collected. Optionally, the SWR collection aspect of system 200 (e.g., as implemented by any one or more of: controller 220, optics 230) may include symmetric implementation of a first subgroup of any one or more of the aforementioned collection related parameters and a nonsymmetric implementation of a second subgroup of any one or more of the aforementioned collection related parameters. Some examples are given below, but these examples are not exhaustive, and all practical combinations may be implemented, and are not detailed for reasons of brevity of the disclosure.

Furthermore, bidirectional illumination may be implemented in system 200 and in method 500 for a wide variety of reasons, such as (but not limited to) any combination of one or more of the following:
a. Maximizing amount of SWR emitted from front side 102;
b. Efficiently generating SWR from front side 104;
c. Inducing emission from both sides of the ionization target, and collecting SWR emitted from both sides;
d. Limiting kinetic effects of illumination on the target, either to improve amount or efficiency of SWR generation and/or for simplifying feedback loops required for operation of the SWR system;
e. Bolstering ion generation on the expense of neutral ejecta, for efficiently removing contaminants and improving longevity and/or up times of system 200.

Bidirectional SWR Collection

The examples of FIGS. 1A-1C illustrate system 200 in which one-sided SWR collection is implemented. In such systems, the SWR output of the SWR system 200 consists of SWR collected by the optical assembly from the front side of the ionization target. This means that either system 200 does not encompass mechanisms to gather SWR from the back side or from other sides of ionization target 100, or it is operated in an operation mode which does not utilize such mechanisms. Both options can be selected. Optionally, the collection in SWR system 200 may be strictly unidirectional, gathering SWR emitted only from front side 102 of ionization target 100, and neglecting any potential SWR from any other direction (especially from back side 104), if any. Optionally, the scope of SWR collection by system 200 may be solely limited to SWR emitted from front side 102, optionally using optical component which are positioned only at the front side of the ionization target (e.g., as illustrated in the example of FIGS. 1A-1C (pertaining only to optical assembly 230, not to optics 240, with respect to the illustrated examples of FIGS. 1A-1C).

Optionally, light assembly 202 includes a first group of at least one light source 210 collectively configured to emit first illumination 902, and a second group of at least one light source 211 collectively configured to emit second illumination 904, while the SWR output of SWR system 200 consists of SWR collected by the optical assembly from front side 102 of ionization target 100 (i.e., no collection of SWR emitted from back side 104 is implemented in this case). Optionally, light assembly 202 includes a group of at least one light source 210 collectively configured to emit both first illumination 902 and second illumination 904 (a nonlimiting example is illustrated in FIG. 1C), while the SWR output of SWR system 200 consists of SWR collected by the optical assembly from front side 102 of ionization target 100 (i.e., no collection of SWR emitted from back side 104 is implemented in this case).

Alternatively, system 200 may implement bidirectional SWR collection, in which system 200 collects SWR emitted from both front side 102 and back side 104. Optionally, optical assembly 230 may be further configured to collect backward-emitted SWR emitted from back side 104 of ionization target 100, and to direct the collected backward-emitted SWR toward a predefined beam direction of the SWR system. The predefined beam direction may be the same beam direction as the aforementioned "designated beam direction" or different therefrom. Some examples are provided in the following figures.

Figure 5A:
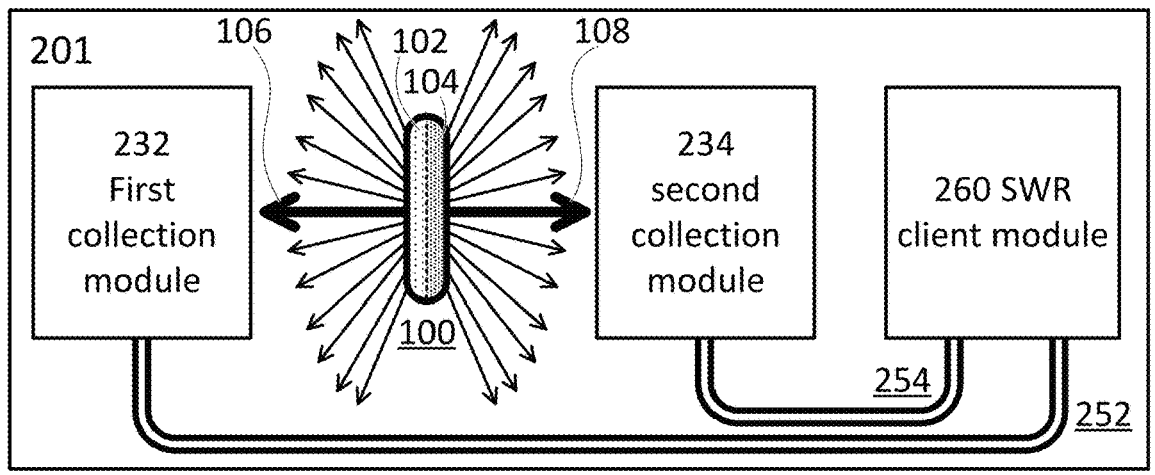
FIGS. 5A, 5B, 6, 7, and 8 are schematic diagrams illustrating examples of SWR systems.
Figure 5B:
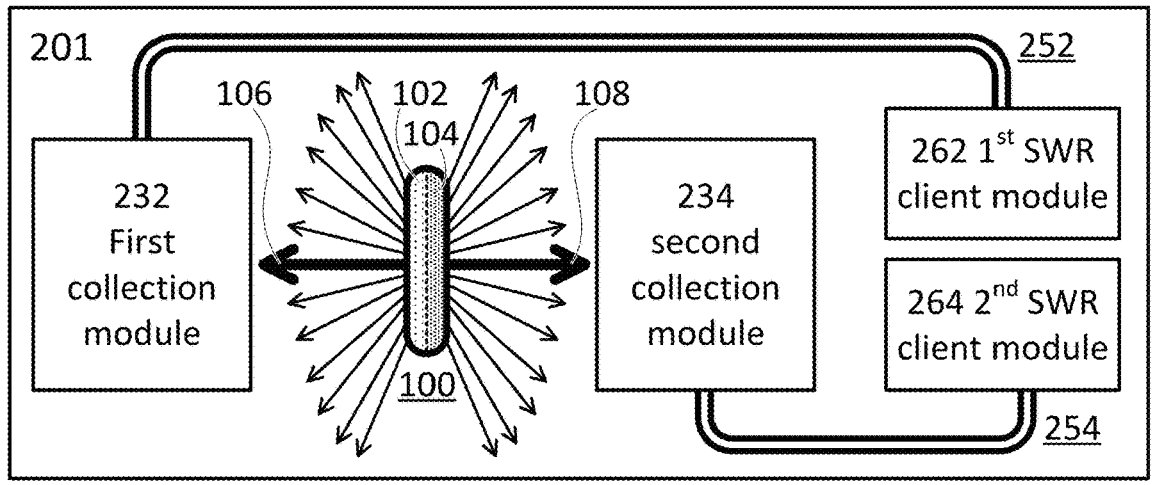
Figure 6:
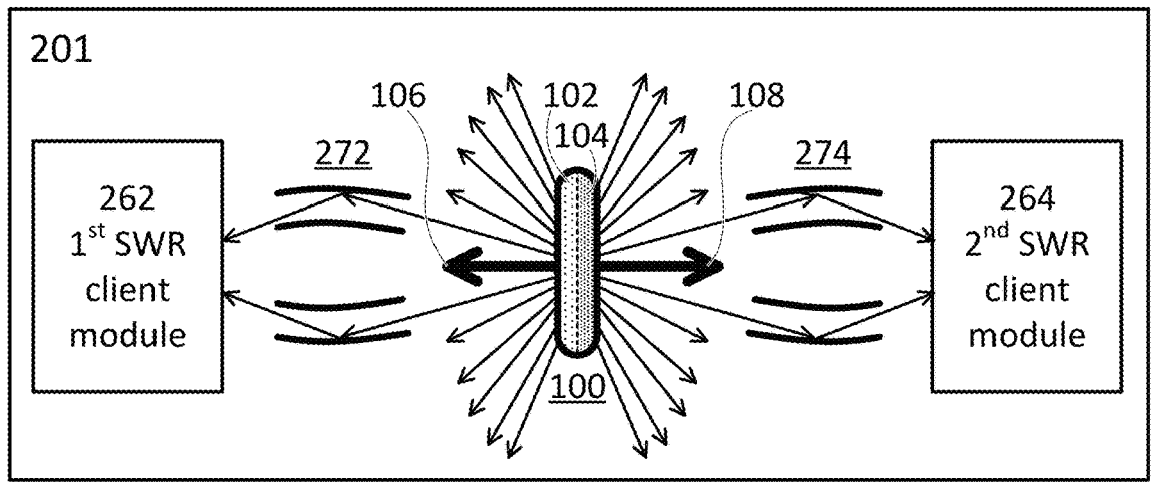

FIGS. 5A, 5B, and 6 are schematic diagrams illustrating examples of system 201, in accordance with examples of the presently disclosed subject matter. System 201 is operable to generate Short Wave Radiation (SWR, e.g., EUV light), and may optionally also include additional components which are not part of the light emission subsystem. For example, such components may utilize SWR generated by system 201 (e.g., EUV light) for different uses in chip manufacturing (e.g., lithography, inspection), or any other field, such as imaging, shadowgraphy, etc. It will be clear to a person who is of ordinary skill in the art that many other conventional components are also not illustrated or discussed (e.g., power source), as such a person may understand the invention without undue explanation of commonplace components and functionalities. The same holds for figures and description of other aspects of the invention below.

While not necessarily so, system 201 may be a variation on system 200. However, system 201 may also be implemented as a stand-alone system which is different than system 200. In the latter case, any component of system 201 that have similar name to a component of system 200 may be composed, structured, operable, functioning and/or interact in a similar manner to the corresponding component of system 200, or alternatively act as suggested by its description within the context of system 201.

System 201 is a SWR system, which includes at least:
a. A light assembly (not denoted in the diagrams) that includes at least one light source (210' and/or 211' illustrated in FIGS. 7 and 8), the light assembly being configured to: (a) illuminate front side 102 of an ionization target 100, thereby ionizing front side 102 of ionization target 100 to emit first SWR emission having first central SWR propagation direction 106; and (b) illuminate back side 104 of ionization target 100, thereby ionizing back side 104 of ionization target 100 to emit second SWR emission having second central SWR propagation direction 108 substantially opposing first SWR propagation direction 106. Optionally, the light assembly may illuminate front side 102 and second 104 concurrently or partly concurrently, but this is not necessarily so. It is further noted that the first SWR and the SWR may be spatially distinct from one another (i.e., separated by directions in which no SWR is emitted), but this is not necessarily so.
b. An optical assembly (represented by two distinct collection modules 232 and 234, even though other configurations are also possible) that is configured to:
    collect by a first optical assembly (also referred to as first optical sub-assembly, e.g., first collection module 232) the first SWR that propagates along the first central SWR propagation direction (this may include parts of the SWR emitted from front side 102, or all of it);
    collect by a second optical assembly (also referred to as second optical sub-assembly, e.g., second collection module 234) the second SWR that propagates along the second central SWR propagation direction (this may include parts of the SWR emitted from back side 104, or all of it); and
    direct the first SWR emission and the second SWR emission towards at least one optical port, from which it can be transferred to one or more auxiliary systems or modules, e.g., to be used in lithography, shadowgraphy, or in any process in which SWR is useful.

System 201 may optionally include first beamline 252 for transmitting first SWR radiation collected by first collection module 232 to a SWR client module (260, 262) or an auxiliary SWR system where the first SWR radiation can be utilized. System 201 may optionally include second beamline 254 for transmitting second SWR radiation collected by second collection module 234 to a SWR client module (260, 264) or an auxiliary SWR system where the first SWR radiation can be utilized. As illustrated in FIGS. 5A and 5B, beamlines 252 and 254 may both lead to the same SWR client module or system, or to different modules or systems. In another option that is not illustrated, beamline 252 and beamline 254 may be combined within system 201 into a single beamline (not shown) which transfers both the first SWR and the second SWR to a single SWR client module or system.

In the context of optical systems, particularly those used in extreme ultraviolet (EUV) lithography, a "beamline" refers to the physical path or trajectory that a beam of light, in this case, SWR radiation, follows through the system.

This path can be through free space or within an optical or mechanical system, such as mirrors, lenses, and other components.

The optical assembly of system 201 as a whole, and each of first collection module 232 and or second collection module 234 (if implemented) may include any component discussed above with respect to optical assembly 230, such as (but not limited to) mirrors, multi-layer mirrors (MLM), grazing incidence reflectors, Curved MLM, spherical or parabolic MLM, reflection masks, masks, beam blockers, pellicles, lenses, prisms, waveguides, and so on, all of which could be controllable (e.g., steerable) or not. FIG. 6 illustrates system 201 in which first SWR emitted from front side 102 is collected by first grazing incidence reflector 272 and transmitted to a first client, while second SWR emitted from back side 104 is collected by first grazing incidence reflector 272 and transmitted to a second client. Another example of optional combination in system 201 includes collecting SWR emission of one side of ionization target 100 (102 or 104) by a grazing incidence reflector, and collecting SWR emission of the other side of ionization target 100 (104 or 102, respectively) by an MLM mirror. It is noted that these are just a few examples, and other combinations and implementations are obviously also possible. Optionally, the first optical assembly includes a multilayer mirror and the second optical assembly includes a grazing incidence collector.

While not necessarily so, system 201 may include controller 220' that is configured to control the light assembly for illuminating ionization target 100 from both front side 102 and back side 104. Optional controller 220' may also be used to control any other component and/or activity of system 201.

It is noted that double-sided collection of SWR emission may be implemented also for a thick target illuminated from both sides, having both an increased amount of emitted SWR (albeit not synergistically), and the energetic saving offered by controlling the reduction of motion of the target by the target illumination scheme implemented by the controller.

Figure 7:
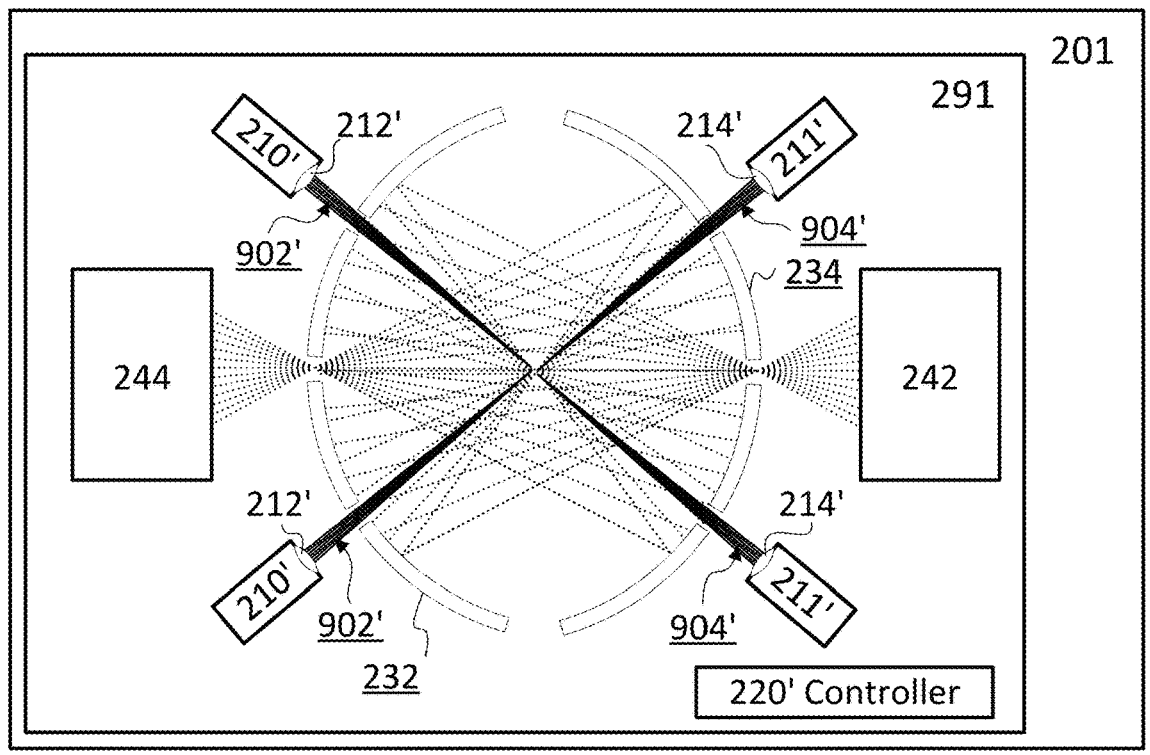
Figure 8:
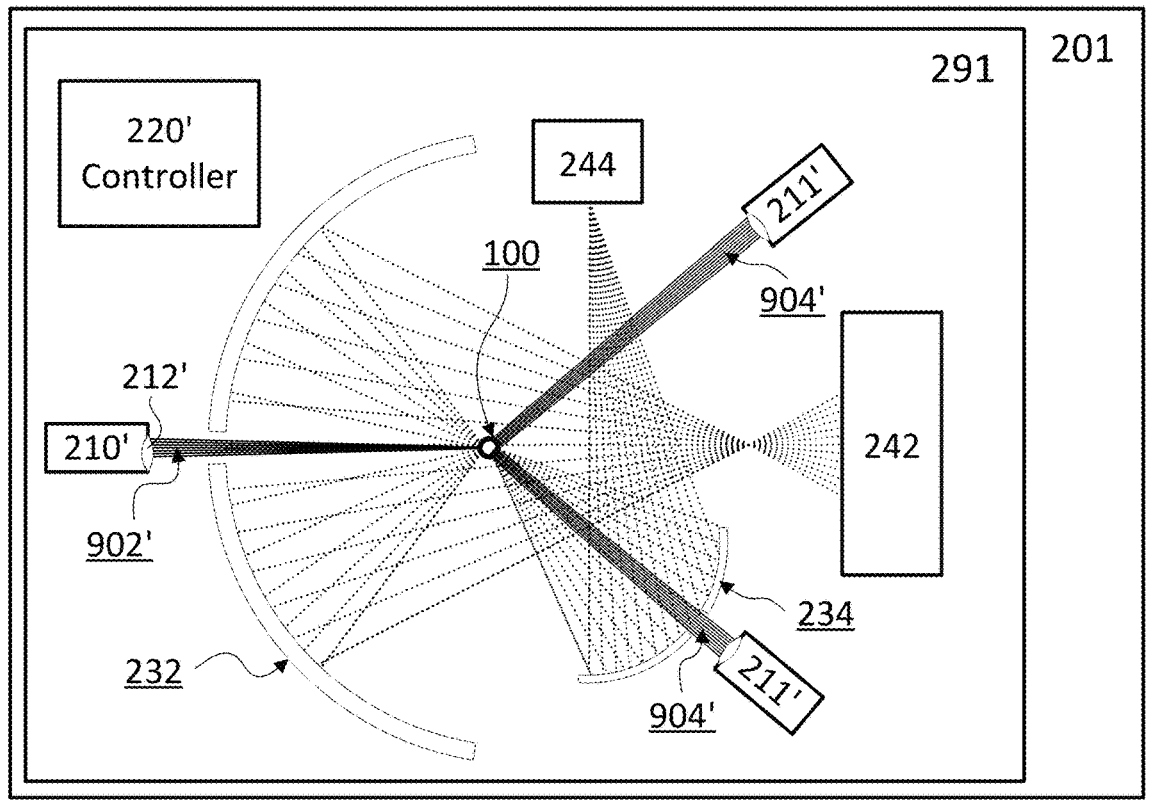

FIGS. 7 and 8 are schematic diagrams illustrating examples of system 201, in accordance with examples of the presently disclosed subject matter. The collection optical assembly of system 201 (as well as that system 200) may be implemented symmetrically, non-symmetrically, and in various degrees of symmetry. For example, in the example of FIG. 7 the collection is performed by a symmetrical arrangement of two symmetrically positioned MLM mirrors (assisted by a geometrically symmetric light assembly), and in the example of FIG. 8 the collection is performed by a nonsymmetrical arrangement of two nonsymmetric MLM mirrors. It is noted that these are just a few examples, and other combinations and implementations are obviously also possible. Furthermore, the different degrees of symmetry and asymmetry discussed above with respect to light assembly 202 of system 200 are also applicable for the optical assembly, mutatis mutandis, and are not repeated here fully for reasons of brevity. Symmetric aspects of the optical assembly may be fully symmetric, nonsymmetric, or fulfil any combination of one or more of the following types of symmetry: functional symmetry, effective symmetry, energetic symmetry, and so on. When a technical aspect of system 201 (e.g., of illumination, of collection) is "nonsymmetric" or "asymmetric" with respect to any of these definitions of symmetry, the degree of deviation from symmetry may differ. The degree of difference between implementation on the front side and on the back side of the system may depend on various system design considerations, many examples for which were provided above.

Optionally, the optical assembly of system 201 (and/or that of system 200) may include at least one optical component that interacts with the second SWR emission and does not interact with the first SWR emission. Optionally, the optical assembly of system 201 (and/or that of system 200) may include at least one optical component that interacts with the first SWR emission and does not interact with the second SWR emission.

Optionally, system 201 may include at least one first optical component selected from a first group of optical components consisting of a multilayer mirror and a grazing incidence collector that is configured to alter the propagation of the first central SWR emission, and at least one second optical component selected from a second group of optical components consisting of a multilayer mirror and a grazing incidence collector that is configured to alter the propagation of the second central SWR emission.

Optionally, the optical assembly of system 201 (and/or that of system 200) may be configured to direct the first SWR emission via a first optical port and to direct the second SWR emission via a second optical port which is optically separated from the first optical port.

Optionally, system 201 may include: (a) first beamline 252 for transmitting the first SWR emission from the first optical port towards a first auxiliary machine or a first client SWR module component 262 within system 201, and (b) second beamline 254 for transmitting the second SWR emission from the second optical port towards a second auxiliary machine or a second client SWR module component 264 within system 201. Wherein the first auxiliary machine (or module 262) is distinct than the second auxiliary machine (or module 264). By way of nonlimiting example, one of them may use SWR for lithography while the other may use SWR for inspection of wafers or other objects. Such auxiliary machines may include any type of machine which utilizes SWR, transfers or manipulates SWR, measure SWR, or interact with the emitted SWR in any other way. For example, such auxiliary machines may include any machine used in SWR-based lithography, SWR-based inspection (e.g., mask inspection, wafer inspection), SWR-based metrology, and so on.

Optionally, the optical assembly of system 201 (and/or that of system 200) may be configured to combine the first SWR emission and the second SWR emission, and to transmitting the combined SWR emission to a single auxiliary machine (e.g., two distinct beamlines 252 and 254).

Optionally the optical assembly of system 201 (and/or that of system 200) may be asymmetrical about the first central SWR propagation direction. Optionally, the optical assembly of system 201 (and/or that of system 200) may be configured to focus the first SWR emission to a focus located away from the first central SWR propagation direction. Optionally, the directing of the second SWR emission includes changing propagation of the second SWR emission using an optical component which changes the propagation of the first SWR emission.

Referring to systems 200 and 201 generally, it is noted that the discussion above focused mainly on illuminating two sides of an ionization target 100 and collecting SWR emitted from one or more of this sides. It is nevertheless noted that system 200 may also include light sources and optics for illuminating an ionization target from more than two sides, and for collecting SWR from two or more directions. For example, if an ionization target 100 moves along the Z axis (e.g., generated and propelled by a droplet generator), light (e.g., lasers) may be illuminated from three main directions on the XY plane onto three different sides of the moving ionization target 100 (e.g., three <120° sectors of the ionization targets), and SWR emitted from each of these three sides may be collected by one of three corresponding collection modules. In another example, if an ionization target 100 moves along the Z axis (e.g., generated and propelled by a droplet generator), light (e.g., lasers) may be illuminated from four main directions on the XY plane (e.g., +X, −X, +Y, −Y) onto four different sides of the moving ionization target 100 (e.g., three <90° sectors of the ionization targets), and SWR emitted from two of this sides (e.g., +X, +Y) or from all of these sides may be collected by one of the corresponding two or four collection modules. It is noted that in such case, the first side and the second side discussed with relation to systems 200 and 201 may or may not be opposed to one another. For example, considering the three directions implementation, movement cancelation may be achieved by symmetric illumination from three directions 120° apart. If three or more illumination directions are implemented, the central propagation directions of all of the different illuminations may or may not reside in a single place.

FIG. 9 illustrates method 500 for generating SWR, in accordance with examples of the presently disclosed subject matter. Referring to the examples set forth with respect to the previous drawings, method 500 may optionally be carried out by system 200. It is noted that any variation of SWR generation discussed above with respect to system 200 may be implemented, mutatis mutandis, to method 500. Not all discussion is repeated, for reasons of brevity. It is also noted that method 500 may be implemented in other SWR systems in which bidirectional illumination of an ionization target is enabled, and it is noted limited to system 200.

Step 510 includes illuminating an ionization target according to a target illumination scheme that includes at least: a first illumination of a front side of the ionization target, and a second illumination of a back side of the ionization target. The illuminating of step 520 results in inducing of emission of SWR radiation from the front side (and possibly from other parts of the ionization targets, especially from its back side). Referring to the examples set forth with respect to the previous drawings, step 510 may be executed by one or more light sources of light assembly 202, possibly under the control of controller 220.

Step 520 of method 500 includes collecting SWR emitted from the front side of the ionization target. Referring to the examples set forth with respect to the previous drawings, step 520 may be executed by optical assembly 230.

Optionally, method 500 may also include step 522 of collecting SWR emitted from the back side of the ionization target. Referring to the examples set forth with respect to the previous drawings, step 522 may be executed by optical assembly 230. If implemented, step 522 may be carried out concurrently with step 520.

Step 530 of method 500 includes directing the collected SWR toward at least one designated beam direction of the SWR system. Referring to the examples set forth with respect to the previous drawings, step 520 may be executed by optical assembly 530. Referring to the examples set forth with respect to the previous drawings, the at least one designated beam direction may optionally point in the direction of intermediate focus 192 (if applicable) or of outward optics 240.

Optionally, method 500 may implement control of the kinematic effects of the illumination on the ionization target, e.g., as discussed above with respect to system 200. For example, method 500 may optionally include determining bidirectional illumination parameters which guarantee that illuminating the ionization target using the bidirectional illumination parameters would keep a velocity component of over dense material (which may include non-ablated material) of the ionization target along a central propagation direction of the first illumination under 10 m/s (or under 0.1 m/s, under 1 m/s, under 5 m/s, or under 20 m/s). method 500 may also include, in such case, triggering bidirectional illumination of the ionization target in compliance with the determined bidirectional illumination parameters, thereby maintaining the speed under 10 m/s (e.g., maintaining the absolute value of the velocity component of over dense material (which may include non-ablated material) of the ionization target along a central propagation direction of the first illumination under 0.1 m/s, under 1 m/s, under 5 m/s, or under 20 m/s).

As discussed with respect to system 200, different timings may be used for the front side illumination and for the back side illumination. For example, method 500 may include initiating the first illumination, and initiating the second illumination at least 1ns after the initiation of the first illumination. For example, method 500 may include initiating the first illumination when a width of the ionization target is larger than 0.3 μm, and initiating the second illumination after the first illumination reduced a width of the ionization target from at least 0.3 μm to less than 0.2 μm. For example, method 500 may include terminating emission of the second illumination at least 1ns before the end of the first illumination.

All other optional differences discussed above (with respect to system 200) between the front side radiation and the back side radiation may also be implemented, mutatis mutandis, for method 500. For example, method 500 may include executing stage 510 such that an energy of the second illumination is lower by a ratio of at least 1:2 with respect to an energy of the first illumination. For example, method 500 may include executing stage 510 such that a central wavelength of the first illumination is longer than a central wavelength of the second illumination by at least 20%.

Optionally, method 500 may include bidirectionally shaping the ionization target prior to the emission of the first illumination and of the second illumination using at least a front side preliminary illumination and a back side preliminary illumination.

Optionally, method 500 may include bidirectionally shaping the ionization target using the first illumination and the second illumination, and ionizing the ionization target after the bidirectional shaping using at least one third illumination toward the front side, resulting in emission of the SWR toward the optical assembly. Optionally, method 500 may include bidirectionally shaping the ionization target using the first illumination and the second illumination, and ionizing the ionization target after the bidirectional shaping using at least one third illumination toward the front side and at least one fourth illumination toward the back side, resulting in emission of the SWR toward the optical assembly.

Optionally, method 500 may implement bidirectional illumination but unidirectional collection from the front side only. For example, method 500 may include outputting SWR emission consisting of SWR collected by the optical assembly from the front side of the ionization target and discarding any SWR radiation emitted from the back side of the ionization target (if any).

Optionally, method 500 may be implemented towards a thin ionization target (in the sense discussed above), implement bidirectional illumination once the ionization target was sufficiently ablated to become a thin target, or otherwise differentiate between exciting illumination directed towards ionization target at different times, corresponding to its thinning, e.g., as discussed above with respect to system 200. For example, in step 510 a thickness of the ionization target when illuminated by the first illumination and the second illumination meets a thinness criteria ensuring that parts of the ionization target are concurrently heated by both the first illumination and the second illumination. For example, a thickness of a preserved part of the ionization target between the first side and the second side along a cross-target axis is less than 250 nm upon beginning of SWR emission from the ionization target and/or upon beginning of the second illumination.

Optionally, method 500 may include controlling spatial alignment of the first illumination and of the second illumination during a concurrent emission of the first illumination and of the second illumination.

Regarding the efficient burning of the ionizable target material discussed above with respect to system 200, it is noted that optionally method 500 may include determining bidirectional illumination timing parameters for minimizing an amount of neutral ejecta ejected from the ionization target, thereby minimizing deterioration of the system; and bidirectionally illuminating (e.g., at least partly concurrently) the ionization target in compliance with the determined bidirectional illumination timing parameters.

Optionally, method 500 may further include applying electromagnetic forces within a vacuum chamber in which the ionization target is heated, for steering ions away from the ionization target and collection optics.

It is noted that method 500 may be used either in a unidirectional collection format (collecting SWR emitted only from the front side of the ionization target) in a bidirectional collection format (collecting SWR emitted from both the front side of the ionization target and the back side of the ionization target). For example, method 500 may optionally include collecting backward-emitted SWR emitted from the back side of the ionization target and directing the collected backward-emitted SWR toward a predefined beam direction of the SWR system. The predefined beam direction may be the same beam direction as the aforementioned "designated beam direction" or different therefrom.

According to an aspect of the invention, a non-transitory computer-readable medium for controlling a SWR system is disclosed, the non-transitory computer-readable medium including instructions stored thereon, that when executed on a processor, perform the steps of:
  a. Determining bidirectional illumination parameters for a bidirectional target illumination scheme, the determining including: (a) determining first illumination parameters for first illumination of a first side of an ionization target, the first illumination parameters comprising at least first timing parameters and first power parameters; (b) determining second illumination parameters for first illumination a back side of the ionization target, the second illumination parameters comprising at least second timing parameters and second power parameters.
    The first illumination parameters and the second illumination parameters dictate different operation settings for the first illumination and for the second illumination in at least one of: illumination start time, illumination end time, illumination duration, power level, and central wavelength; and
  b. Triggering illuminations of the ionization target according to the bidirectional target illumination scheme, comprising triggering at least the first illumination and the second illumination, thereby inducing emission of SWR radiation from the front side toward an optical assembly which is configured to collect and direct the SWR radiation toward a designated beam direction of the SWR system. It should be noted that the emission of SWR from the front side results from both the first illumination and the second illumination. The contribution of the back side illumination may be in varying degrees of contribution (some examples including energetically contributing to the heating of the front side, shaping the ionization target to a more efficient shape).

Referring to the examples set forth previously, it is noted that the non-transitory computer-readable medium may include instructions to be executed by controller 220. Referring to the examples set forth previously, it is noted that the non-transitory computer-readable medium may include instructions for execution steps of method 500 and/or for controlling the execution of steps of method 500. It is noted that the non-transitory computer-readable medium may include further instructions for executing or controlling all other operational aspects of system 200 and/or steps or variations of system 500, even if such variations are not discussed explicitly in the context of the non-transitory computer-readable medium for reasons of brevity of the disclosure.

FIG. 10 illustrates method 600 for generating short wave radiation (SWR), in accordance with examples of the presently disclosed subject matter. Referring to the examples set forth with respect to the previous examples, method 600 may optionally be executed by system 200 and/or by system 201. While not necessarily so, method 600 may optionally be combined with any combination of one or more steps of method 500.

Step 610 of method 600 includes illuminating a first side of an ionization target, thereby ionizing the first side of the ionization target to emit first SWR emission having a first central SWR propagation direction. Referring to the examples set for with respect to the previous drawings, step 610 may be executed by one or more light sources 210.

Step 620 of method 600 includes illuminating a second side of the ionization target, thereby ionizing the second side of the ionization target to emit second SWR emission having a second central SWR propagation direction. Optionally, the second central SWR propagation direction may be substantially opposing the first propagation direction; however, other geometrical configurations may also be implemented (e.g., as discussed with respect to FIG. 8). Optionally, step 620 may be executed concurrently or partly concurrently to step 610; however, this is not necessary so. Optionally, the first SWR and the second SWR may be spatially distinct; however, this is not necessarily so. Referring to the examples set for with respect to the previous drawings, step 620 may be executed by one or more light sources 210 and/or 211.

Step 630 of method 600 includes collecting the first SWR emission by a first optical assembly. The collecting of stage 630 includes collecting first central SWR emission propagating along the first central SWR propagation direction. Referring to the examples set for with respect to the previous drawings, step 630 may be executed by optical assembly 230, or by first collection module 232.

Step 640 of method 600 includes collecting the second SWR emission by a second optical assembly. The collecting of stage 640 includes collecting second central SWR emission propagating along the second central SWR propagation direction. Optionally, step 640 may be executed concurrently or partly concurrently to step 630; however, this is not necessary so. Referring to the examples set for with respect to the previous drawings, step 640 may be executed by optical assembly 230, e.g., by second collection module 234.

Step 650 of method 600 includes directing the first SWR emission and the second SWR emission towards at least one optical port (e.g., from which it can be transferred to one or more auxiliary systems or modules, for example in order to be used in lithography, shadowgraphy, or in any process in which SWR is useful.). Referring to the examples set for with respect to the previous drawings, step 620 may be executed by optical assembly 230, e.g., by collection modules 232 and 234.

Optionally, the collecting by the second optical assembly may include interacting with the second SWR emission by at least one optical component of the second optical assembly which does not interact with the first SWR emission. Optionally, the collecting by the first optical assembly may include interacting with the first SWR emission by at least one optical component of the first optical assembly which does not interact with the second SWR emission.

Optionally, the collecting of the first SWR emission may include altering the propagation of the first central SWR emission by at least one first optical component selected from a first group of optical components consisting of a multilayer mirror and a grazing incidence collector, and the collecting of the second SWR emission may include (possibly at the same time) altering the propagation of the second central SWR emission by at least one second optical component selected from a second group of optical components consisting of a multilayer mirror and a grazing incidence collector.

Optionally, stage 650 may include directing the first SWR emission via a first optical port and directing the second SWR emission via a second optical port which is optically separated from the first optical port. Optionally, method 600 may include transmitting the first SWR emission from the first optical port towards a first auxiliary machine, and transmitting the second SWR emission from the second optical port towards a second auxiliary machine, distinct from the first auxiliary machine.

Optionally, method 600 may include combining the first SWR emission and the second SWR emission, and transmitting (in stage 650) the combined SWR emission to a single auxiliary machine.

Optionally, the first optical assembly includes a multilayer mirror, and the second optical assembly includes a grazing incidence collector.

Optionally, the collecting of the first SWR may be asymmetric about the first central SWR propagation direction. Optionally, the collecting of the second SWR may be asymmetric about the second central SWR propagation direction. A nonlimiting example is illustrated in FIG. 8. The collector used for collecting of the front side SWR emission (e.g., in optical module 230, 232) may be located on-axis or off axis. The collector used for collecting of the back side SWR emission (e.g., in optical module 230, 234) may be located on-axis or off axis.

Optionally, the collecting of stage 630 may include focusing the first SWR emission (e.g., in the first instance of focusing, if multiple focusing are implemented) to a focus located away from the first central SWR propagation direction.

Optionally, the directing of the second SWR emission in step 650 may include changing propagation of the second SWR emission using an optical component which changes the propagation of the first SWR emission (also in step 650).

Sn Plasma SWR Emission Enhancement by Double-Sided Laser Illumination

The following paragraphs discuss different aspects of Sn plasma SWR emission enhancement using double-sided laser illumination. The emitted SWR may be EUV emission, or any other type of SWR emission. Whenever EUV is mentioned in the following paragraphs, SWR may be implemented, mutatis mutandis.

Extreme-ultraviolet (EUV) light sources, standing at the heart of contemporary nanolithography techniques, naturally raise an ongoing need for advancement in their power and efficiency. This study introduces a novel double-sided laser illumination scheme aimed at enhancing EUV emission from laser-produced Sn plasma. Experiments were conducted using Sn targets of varying thicknesses to evaluate the resulting effect on EUV output intensity. A significant increase in EUV emission to the collection side was observed with double-sided illumination, particularly for thinner targets. For targets with thicknesses ranging between 60 and 20 nm, an increase between 50% and 150% in EUV emission was detected in comparison to regular single-sided illumination. These results have crucial implications for the enhancement of output power and energy efficiency in EUV sources, indicating that double-sided laser illumination could be a viable approach for next-generation EUV light sources.

State of the art nanolithography is based on extreme-ultraviolet (EUV) light, at wavelength of 13.5 nm, emitted from a laser-produced Sn plasma. The advancement of EUV lithography technology creates an ever-increasing demand for higher output power and better energy efficiency of EUV sources. One way by which these goals can be pursued is by developing more sophisticated illumination schemes and careful tailoring of the interaction between the driving laser and the plasma. The disclosure below explores an illumination approach where a thin Sn target is hit from both its sides by the driving laser. Such a technique has been reported before in other realms of plasma physics, where characteristic temperatures are much higher4, and is adapted here to the production of EUV radiation. From a fundamental point of view, as the driving laser light is being absorbed in the target the heat it imparts has a characteristic penetration length. Where the target is much thicker than this length, the two interaction regions between the laser and the target on either side are decoupled and the EUV output into a given side is not expected to be highly affected by the addition of the laser illumination onto the other. Conversely, when the target is thin enough compared to this length scale, the two interaction regions can be considered as coupled, with illumination of the laser from one side of the target affecting the temperature profile of the plasma on the other side of it. This can ultimately affect the spectrum and intensity of the EUV emitted to that other side. That effect is of interest since it has the potential to be utilized for increasing EUV output in the existing methods, under conditions where simple scaling up of the intensity of a single-sided driving laser is not preferred. Additionally, it might suggest a scheme for the incorporation of solid-state lasers into EUV sources, without them replacing the existing CO2 lasers altogether. Thus, the main objective of the current work was to test whether the addition of a back side driving laser can increase the EUV output into the front (collection) side of a thin target, compared to only driving it using laser from the front side. This required precise control of the target thickness and to that end, solid Sn films were used as targets, suspended and exposed from both sides. The resulting effect of the double-sided illumination on the EUV emitted from the Sn plasma was then studied, for a varying thickness of the Sn layer and laser intensity.

Figure 11:
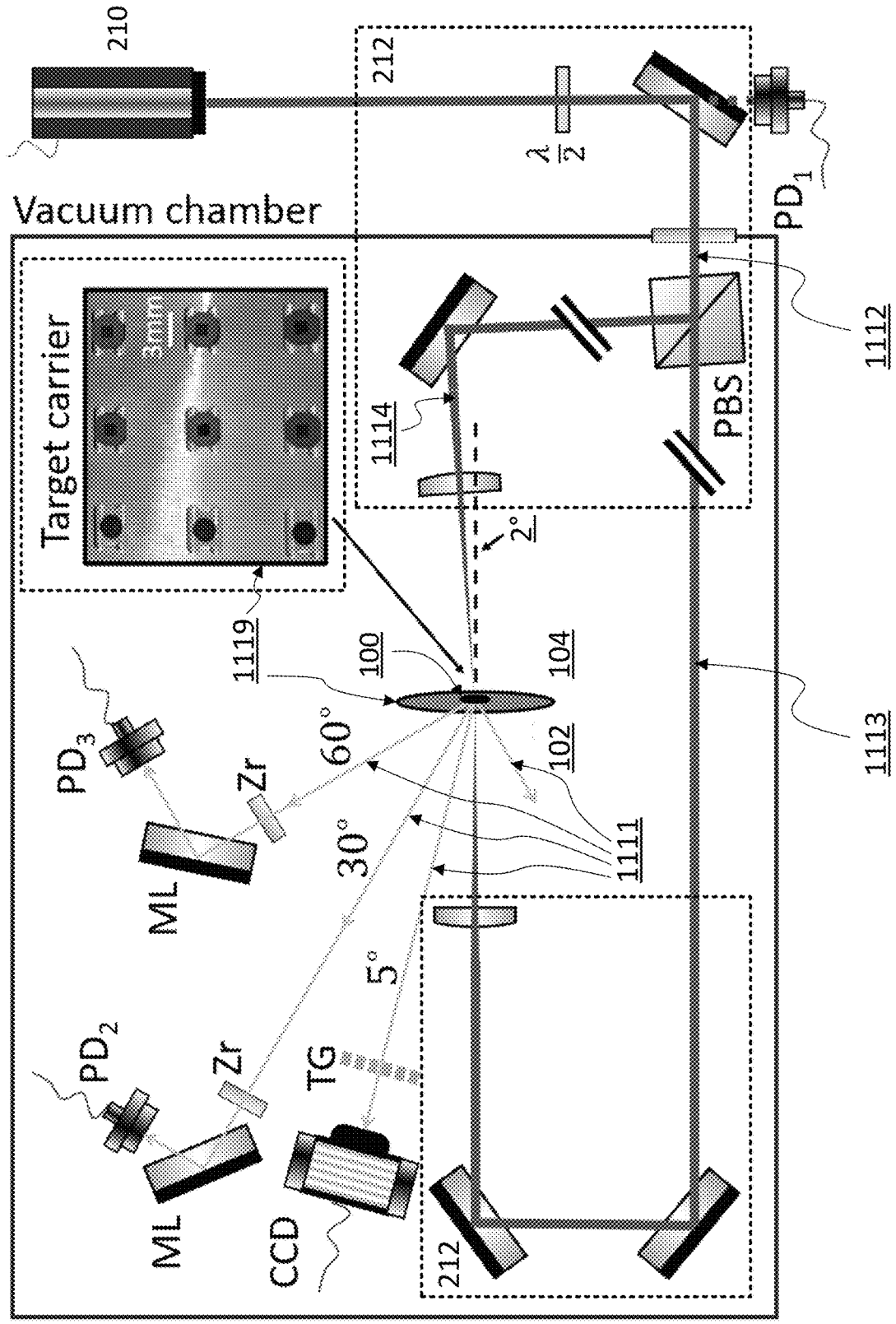
FIG. 11 illustrates a setup of a system in which a laser pulse is split using a polarizing beam splitter (PBS) and directed on equally long paths to hit a target from both sides simultaneously.

FIG. 11 is an illustration of the experimental setup (not to scale) of system 1110: The laser pulse of a single light source 210 (in this case, a laser) was split on a polarizing beam splitter (PBS, part of optics 212) and directed on equally long paths to hit the ionization target 100 from both sides simultaneously. Both beams were focused through f=15 cm lenses to form overlapping spots both having ~150 μm FWHM, with the front beam normal to the target's surface and the rear beam at a 2° angle to it. A transmission grating (TG) and behind it a CCD camera are positioned at 5° to the normal, spectrally resolving the EUV radiation. Two photodiodes ($PD_2$ and $PD_3$) were positioned at 30° and 60°. The light collected into the photodiodes was filtered through a thin Zr film and a multilayer (ML) mirror. Leakage of the laser's energy was collected into $PD_1$, tracking the individual pulse energy and triggering readout of all other devices. Diagram 1119 of FIG. 11 includes an image of the target carrier and six ionization targets 100 mounted in it. The target slots on the leftmost column are empty, showing the hole that allows the rear beam to hit the target. It will be clear to a person who is of skill in the art that system 1110 of FIG. 11 may be a variation of system 200. It is noted that any detailed discussed below with (e.g., with respect to system 1110) may be implemented, mutatis mutandis, to any one of systems 200 and 201 and methods 500 and 600.

The experimental setup is illustrated in FIG. 11. Positioned in a vacuum chamber at ~$10^{-4}$ Pa, the targets were illuminated by an Nd:YAG laser having wavelength of 1064 nm, pulse length of 10 ns FWHM, and pulse energy up to 0.8 J on the target. Amplitude Surelight III laser was used. The illumination was applied in one of two ways: one where all laser energy is directed to the front side of the target, and one where it splits into equal intensities hitting both sides. Both beams were focused to obtain a spot size of ~150 μm, and the two spots were aligned to be fully overlapping on the target plane. Additionally, the front beam was aligned normal to the target's surface, while the rear beam was at a small, 2° angle, in order to avoid a closed loop in the optical path that might damage the laser system. A photodiode (Thorlabs DET10A), marked by $PD_1$ on FIG. 11, was aligned to measure the residual leakage of the laser pulse through one of the mirrors, and used to record the individual pulse energy and also to trigger the readout from all other devices. The full beam line of the laser is drawn (not to scale) is denoted 1112 in FIG. 11 prior to being split, and the split beams directed toward the first side and the second side are denoted 1113 and 1114.

Rays 1111 in FIG. 11 illustrate the EUV light emitted by the Sn plasma once the target is hit by the laser. To study the properties of that emission, a spectrometer was positioned at 5° angle to the target's normal, consisting of a high contrast sinusoidal transmission grating (2850 lines/mm) and a CCD camera (Oxford Instruments Andor iKon-M), overall attaining 0.225 nm spectral resolution at 13.5 nm. To study the angular and temporal distribution of the EUV pulse, two EUV-optimized photodiodes (Optodiode SXUVHS) were positioned at 30° and 60° normal to the target, both behind a Zn film and a multilayer mirror (Edmund optics EUV flat mirror 45° AOI, Wavelength rage: 12.92-13.90 nm).

Figure 15:
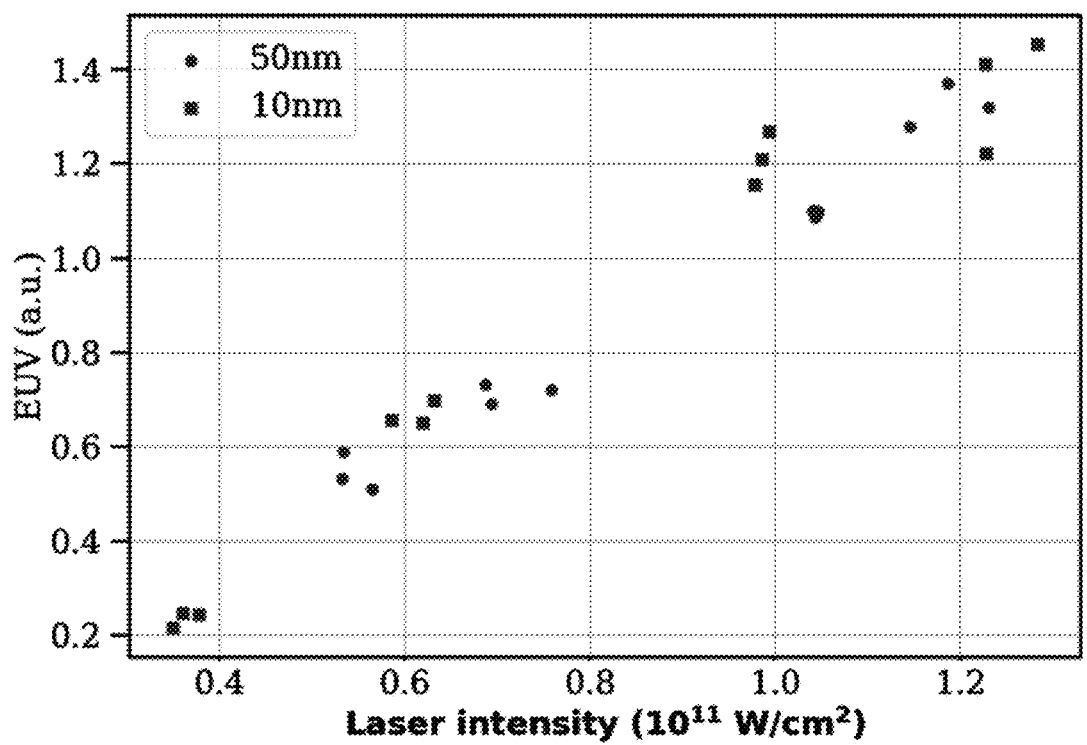

The target preparation method aimed to provide a precise control of the initial thickness of the solid Sn layer, while allowing them to be illuminated from both sides. Each Sn target, with thickness ranging between 20 nm and 170 nm, was thus deposited by evaporation on a SiN membranes (Micro to Nano EM-Tec) whose thickness was 10, 20 or 50 nm. The membranes had lateral dimension 0.5×0.5 mm or 1×1 mm, and they were suspended inside a 200 μm-thick Si frame with an external diameter of 3 mm. The dies were then mounted on a stainless-steel carrier having a 1.5 mm hole at the center of each target slot, thus exposing the target from both sides, as demonstrated in 1119. FIG. 15 illustrates the EUV output vs. laser intensity, where the SiN membrane was 50 nm-thick (red) and 10 nm-thick (blue). The Sn layer thickness is 60 nm and all shots are double sided. As shown, no observable effect was found for the variation in the Sn membrane thickness.

Figure 12:
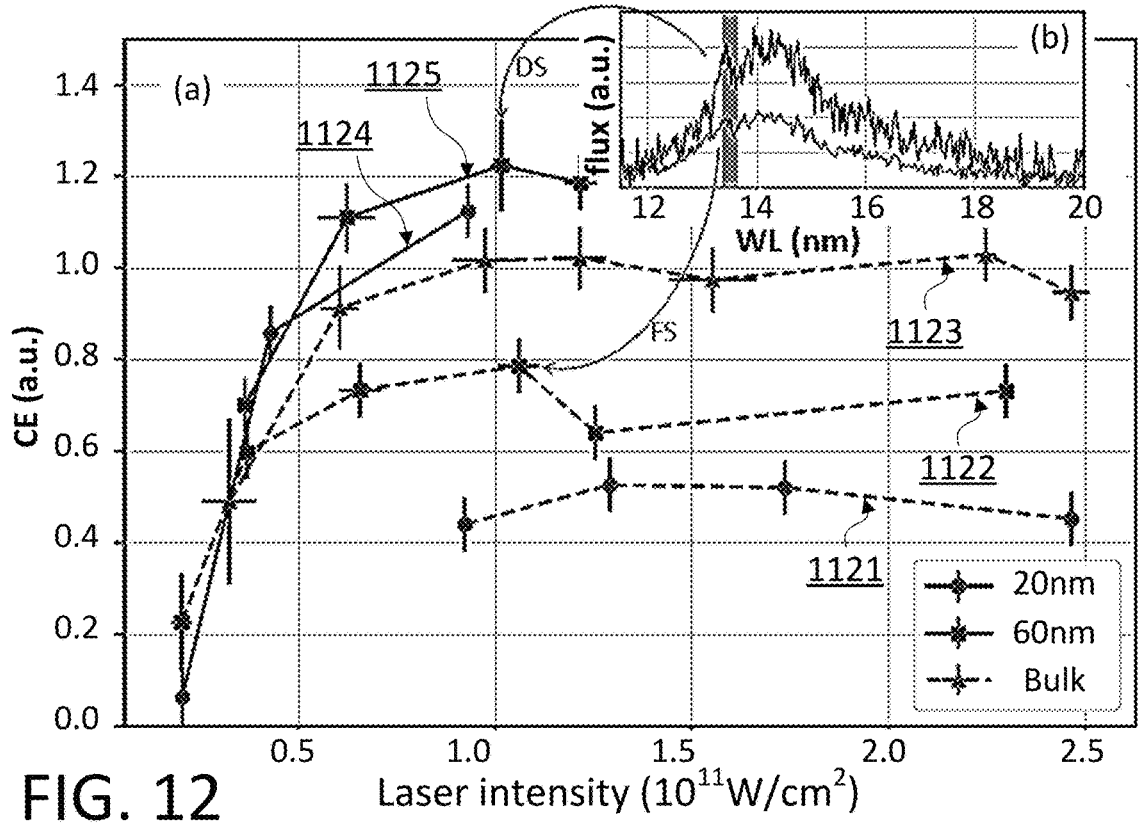
FIGS. 12, 13, 14, 15, 16A-16C, 17, and 18A-18C illustrate experimental results collected using the system of FIG. 11.
Figure 17:
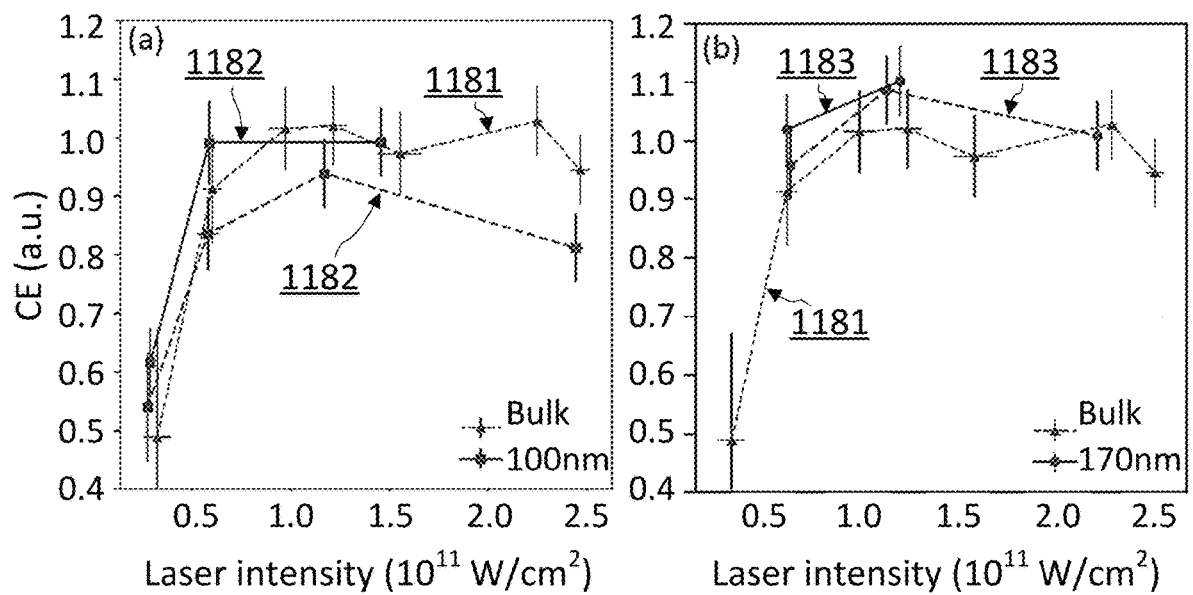

With these settings, the EUV emission from the Sn plasma was studied for targets of different thicknesses. This was repeated with the laser either hitting the targets from the front side only, or from both sides. Two specific spectra recorded by the CCD are shown as an example in diagram (b) of FIG. 12, with the shaded area marking the standard 2% band around 13.5 nm. Defining the laser to EUV conversion efficiency (CE) as the ratio between the EUV output energy to laser energy per side of the target, the experiment tracked the CE as the pulse energy was scanned. A bulk target was also tested under the same experimental conditions, providing a setup-independent reference to standard methods. The results are summarized by diagram (a) of FIG. 12 for a bulk target (1123), and 60 nm (1125, 1122) and 20 nm thin targets (1124, 1121). Dashed lines mark front side shots, solid lines mark double-sided shots and the intensity reported on the abscissa is per side. The bulk target used was a few mm thick, planar Sn. The same set of experiments was also repeated for targets 100 and 170 nm thick, and for clarity these were not included in diagram (a) of FIG. 12, but can be found in FIG. 17. FIG. 17 illustrates conversion efficiency (CE) from laser to EUV vs. laser intensity I, for bulk targets (denoted 1171), 100 nm thick targets (denoted 1172) and 170 nm thick targets (denoted 1173). Dashed lines represent front side shots and solid lines are double sided shots. Here too, the CE values are normalized by the value of the bulk at I=$10^{11}$ W/cm², and the reported intensity is per side.

Figure 13:
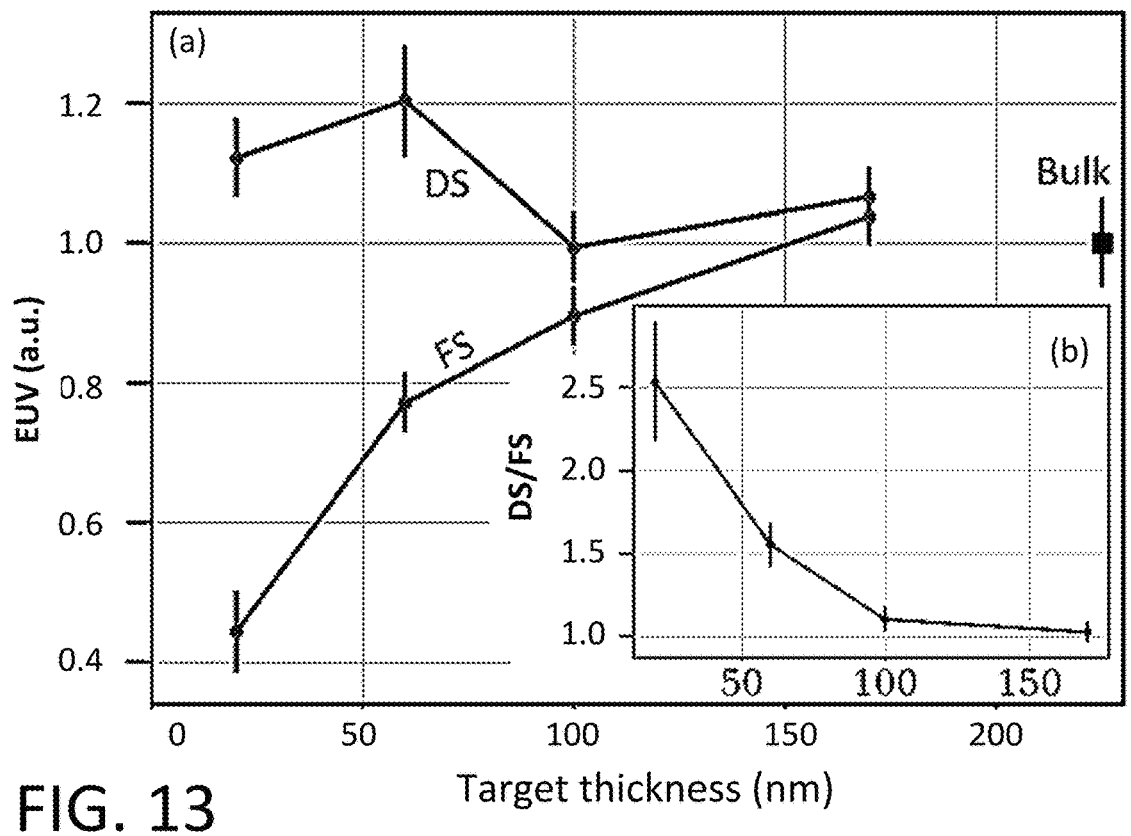

Diagram (a) of FIG. 13 is a normalized EUV output power vs. target thickness, at I=$10^{11}$ W/cm² per side. Front side shots are denoted FS, double-sided shots are denoted DS, and the point representing bulk shots is denoted "bulk". The latter was shifted to appear on the same thickness scale. Diagram (b) of FIG. 13 illustrates the EUV output with double-sided illumination, divided by the output with front side illumination, per target thickness. Diagram (a) of FIG. 13 shows a cross section through the data, presenting the normalized EUV output vs. thickness of the target, at I=$10^{11}$ W/cm². As shown, for target thickness ≤100 nm and intensities of the order of $10^{11}$ W/cm², the addition of the back side illumination resulted with an enhancement of the EUV emission output to the front side. This manifested as a change of trend in the EUV output as the target thickness was reduced: with front side illumination only, the decay in EUV output with target thickness is clearly shown as the blue curve. Conversely, with double-sided illumination not only such decay was not observed, but rather an increase, with the 60 nm and 20 nm targets yielding 20%(±8%) and 12%(±6%) enhancement of the EUV emission compared to the baseline of the bulk, respectively. Dividing the two curves of diagram (a) of FIG. 13 by each other, the ratio shown in diagram (b) of FIG. 13 was obtained, per target thickness. This ratio quantifies the increase of the EUV output resulting from the addition of the back side illumination. Notably, at target thickness ≤40 nm (by linear interpolation) this ratio becomes larger than 2. This is an indication that in this thickness range the front and back side regions of interaction are indeed strongly coupled, as such an enhancement cannot be explained solely by transmission of EUV light from the back side through the target: EUV radiation emitted from the back side of the target in the forward direction still has to travel through the target before it escapes to front side. As the target re-absorbs some of that radiation in the way, transmission alone can give rise to maximum enhancement ratio which is lower than 2. Thus, it is obvious that coupling between the front and back sides of the target contributes significantly to the enhancement of EUV output to the front side also in targets thicker than 40 nm.

As a final basic experimental observation, looking at the angularly-resolved data from the EUV photodiodes, a similar enhancement resulting from the addition of back side illumination was observed in the emission into 30° and 60°. Additionally, the angular distribution was found to be non-uniform, with the emission into 30° being significantly stronger than the emission into 60°, as demonstrated in supplementary note C. Such a directionality of the emission is indeed expected for an experiment where the pulse length is 10 ns and the spot size ~150 µm.

With these results at hand, the context of practical EUV sources is considered next. One now can understand that in order to employ an effective double-sided illumination scheme for these sources, one should optimize within the new parameter space (of wavelength, intensity, pulse length, etc.) of the back side laser illumination, which is beyond the scope of the current letter. Nevertheless, considering these sources, where the laser pulse often has duration on the order of ~100 ns, the present experimental findings may offer an insight into the dynamics of such a long ablation process, despite being conducted using a 10 ns-long pulse. For that sake, the data presented in FIG. 3a can be interpreted as approximating a temporal sequence, representing the EUV emission evolution as the target undergoes successive thinning from right to left on the figure. This offers a snapshot-like view into what one might expect in a longer laser-target interaction, where the laser continuously ablates the target material, ultimately reaching a full burn-through.

Denoting the EUV output from a target of thickness a that is hit by a 10 ns laser by f(a), the EUV output in the case of a long laser pulse, F(A) is proportional to the integral:

$$F(A) \propto \int_0^A f(a)da \quad (1)$$

where A is the initial thickness of the target. Note that the amount of target material that is being ablated during the 10 ns of the laser pulse is unknown in the current experimental scheme, but it can be assumed to be roughly equal between different measurements, due to the formation of a quasi-stationary ablation front.

It should also be noted that transmission of laser light through the targets was monitored by tracking relative changes in the laser signal reaching the CCD. As shown in detail in supplementary note D, there is more than an order of magnitude difference in the transmission of the laser through the target, for consecutive target thicknesses. This shows that the target thicknesses used are spaced such that there is no significant overlap between snapshots within that interpretation, which supports the validity if the integral of Eq. 1 for the current data set. Additionally, this suggests that for $I=10^{11}$ W/cm$^2$ at least for target thickness ≥60 nm, more than 90% of the laser energy is absorbed in the target.

Figure 14:
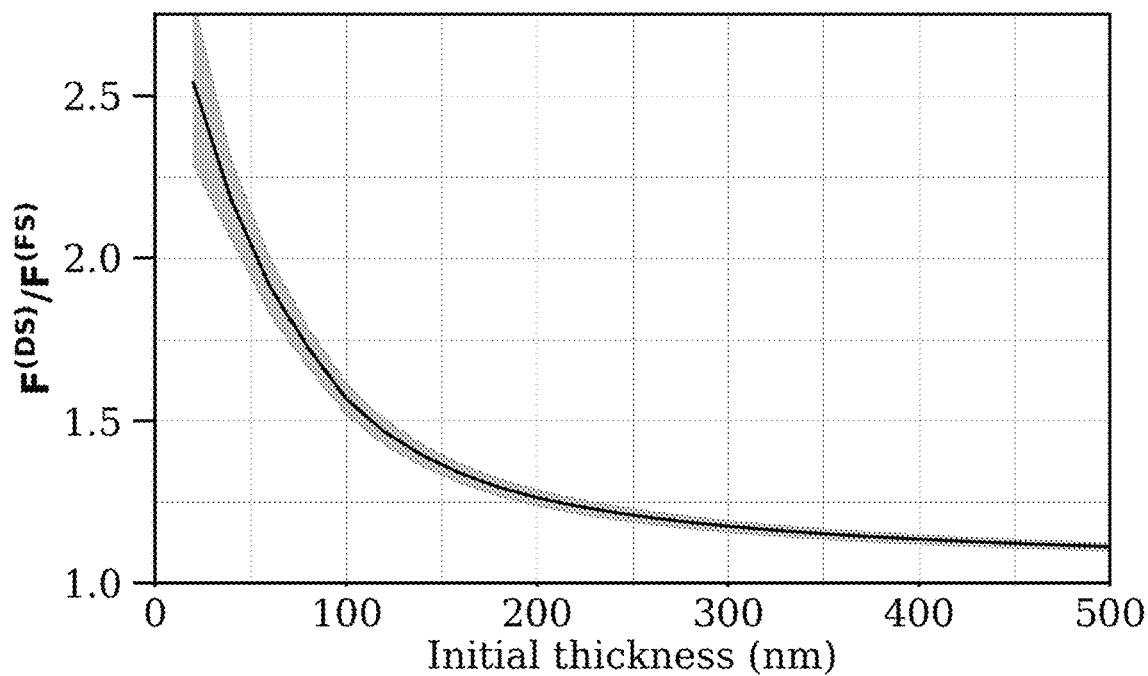

The integral of Eq. 1 was calculated for varying A, once for front side and once for double-sided illumination. The ratio between the two results, $F^{(DS)}(A)/F^{(FS)}(A)$ is plotted in FIG. 14. Naturally, the effect grows as the initial thickness is smaller, but as shown, a significant 17% enhancement is predicted for targets which are initially 300 nm thick. FIG. 14. Illustrates the projected enhancement of EUV output due to addition of back side illumination in a long laser pulse that burns through the full target, vs. the initial thickness of the target. Calculated according to Eq. 1, as the ratio between the integral F(A) for double-sided illumination, to its calculated value for front sided illumination, per initial target thickness A.

It is stressed that the enhancement ratios shown in FIG. 14 should not be thought of simply as a prediction of what is expected if double-sided illumination is applied in an existing EUV source: while these sources utilize liquid droplets and a long laser pulse, in the current experiment each measurement begins with a planar, solid and uniform target, that is hit by a 10 ns pulse. On the other hand, the method used here provides a precise control of the target mass, which eliminates confounding effects due to spatial inhomogeneities. Additionally, the time scale of the formation of an ablation front is known to be ~100 ps (see, for example, M. M. Basko, V. G. Novikov, and A. S. Grushin, Physics of Plasmas 22, 053111 (2015)), which means that the contribution to the recorded spectrum from that stage is negligible on the 10 ns scale of the whole measurement. As a result, the method used here provides good isolation of the fundamental effect of hitting the target from both its sides by the driving laser, and how it depends on the mass and/or thickness of the target.

Figure 18A:
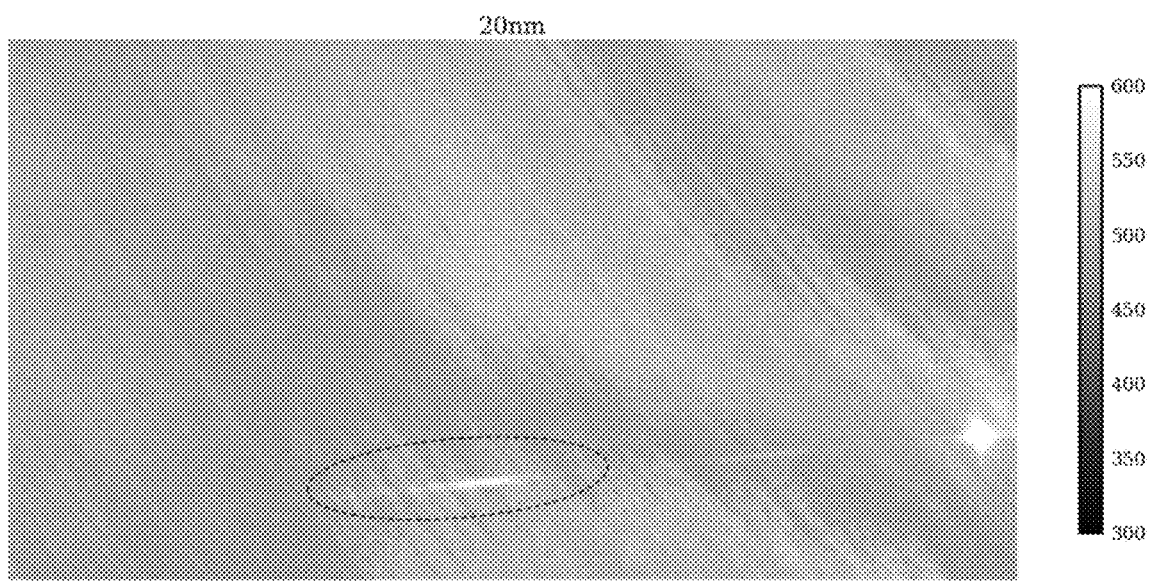
Figure 18B:
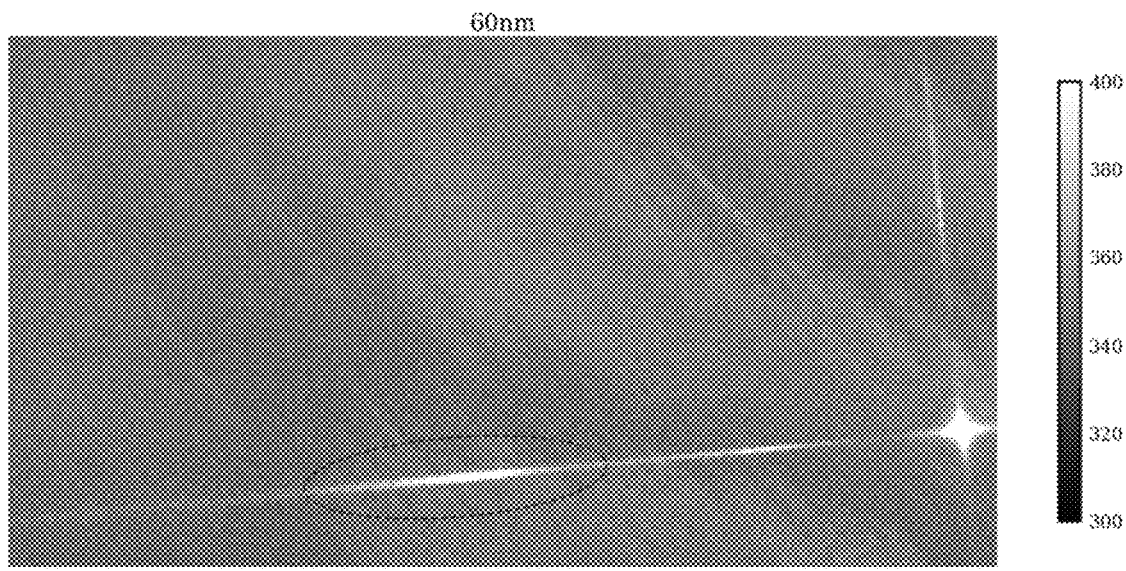
Figure 18C:
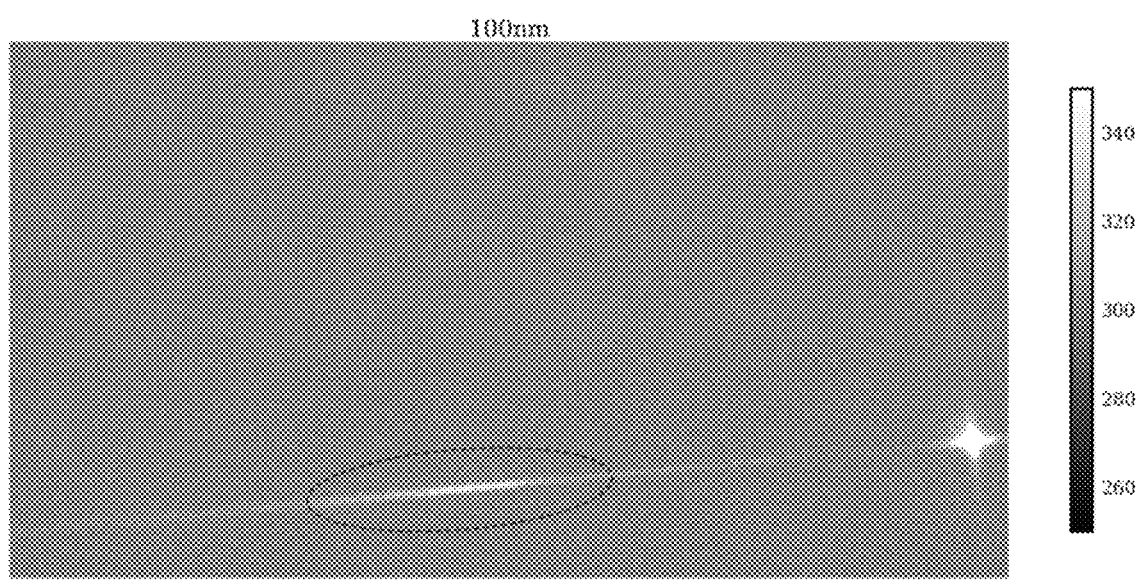

FIGS. 18A-18C are three raw images recorded on the CCD, for three target thicknesses under double-sided illumination. The intensity per side was around $10^{11}$ W/cm$^2$ in all three and the images are shown here as captured, without any processing. One can clearly observe the background pattern, associated with burn-through of the target, such that some of the laser energy from the back side beam scatters through the spectrometer and reaches the CCD. This pattern did not appear under front side illumination alone, and as clearly shown below, it vanished quickly with the increase of target thickness. The raw images of FIGS. 18A-18C are taken from double sided shots at different thicknesses:

a. FIG. 18A: 20 nm with $I=9\cdot10^{10}$ W/cm$^2$,
    b. FIG. 18B: 60 nm with $I=10^{11}$ W/cm$^2$,
    c. FIG. 18C: 100 nm with $I=6\cdot10^{10}$ W/cm$^2$, The dashed ellipses mark the signal corresponding to the 1st order of the diffraction pattern, which makes the EUV spectrum.

Finally, a comprehensive discussion of the physical mechanisms underlying the EUV emission enhancement reported here is beyond the scope of this work. Nevertheless, it should be generally noted that these findings stand to reason, from the fundamental point of view presented at the beginning. While the laser energy is mostly absorbed around the layer of critical density, several mechanisms are known to transfer energy deeper, into denser regions of the target: emission and re-absorption of radiation, thermal diffusion and convection, and electron transfer. When this transported energy is injected from both sides of a thin target, it is expected to add up, potentially extending the region where in-band EUV emission occurs. 1D radiation hydrodynamics simulations of the experiment were conducted, for an 80 nm thick target, in order to provide further insight to the underlying physical processes. As demonstrated in FIGS. 16A-16C, heat injected by the laser on either side expands through the target and heats the target material on the opposite side. As a result, the addition of the back side laser indeed leads to higher plasma temperature on the front side of the target, starting a few ns after the onset of the driving laser.

Figure 16A:
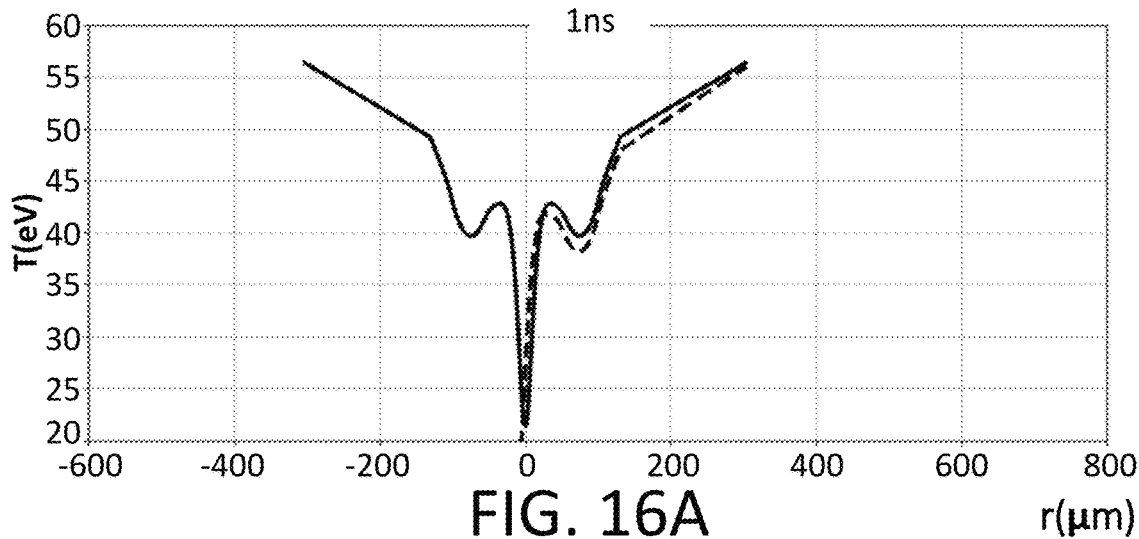
Figure 16B:
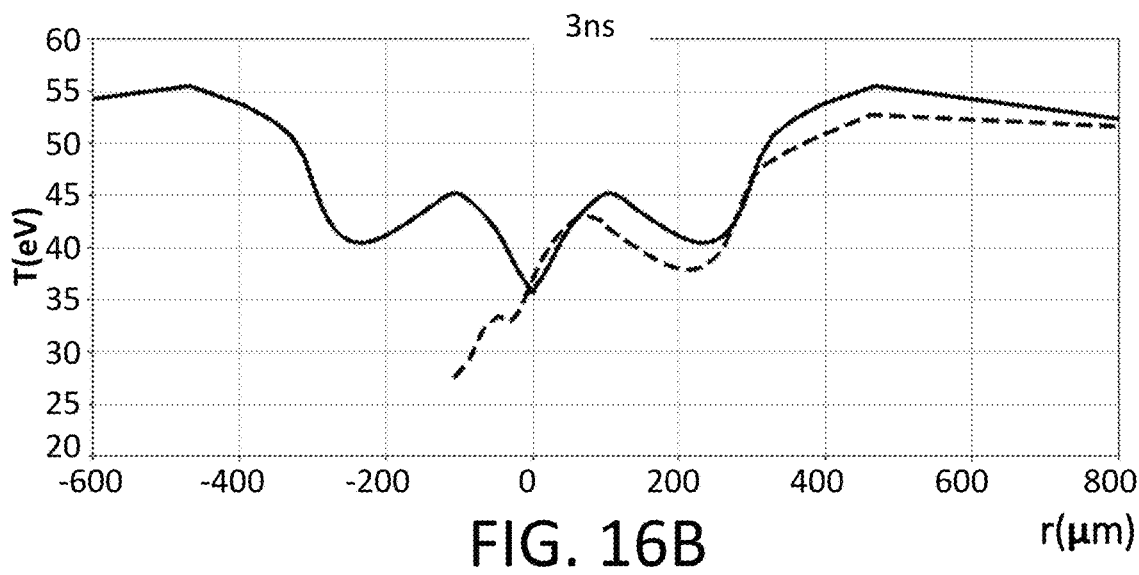
Figure 16C:
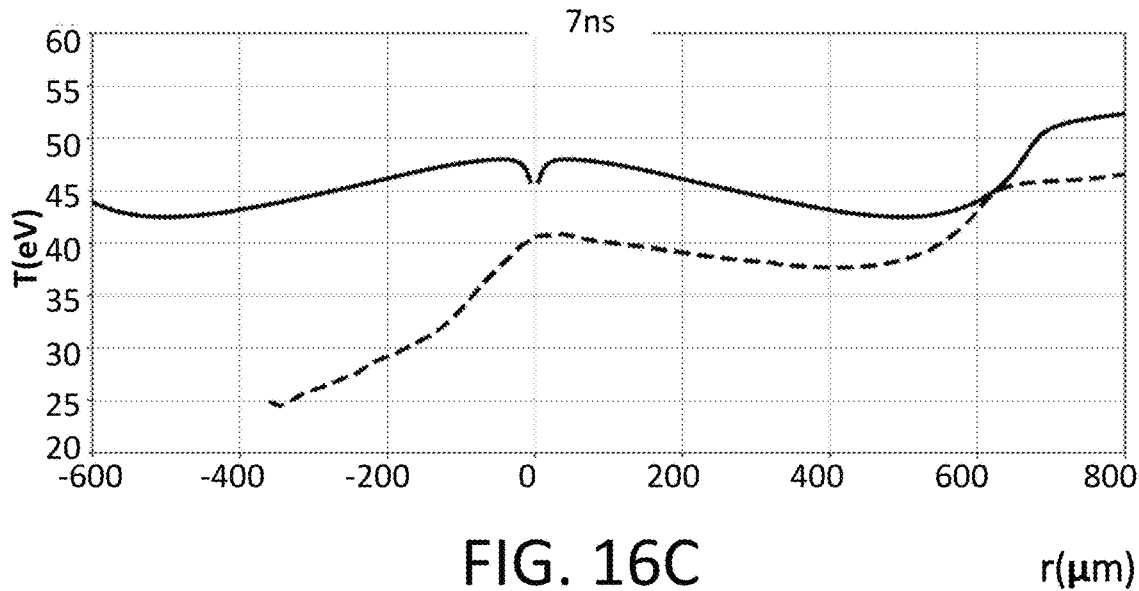

FIGS. 16A-16C illustrate radiation hydrodynamic simulation of an 80 nm thick target, when driven by a $10^{11}$ W/cm$^2$ of 1064 nm laser, either only from the front side (dashed line) or from both sides (solid line). Here, the positive direction of r corresponds to the front side of the target. The spatial profile of the temperature is shown Ins (FIG. 16A), 3 ns (FIG. 16B) and 7 ns (FIG. 16C) after the beginning of the simulation.

In summary, it was demonstrated that double-sided laser illumination significantly boosts the EUV emission from laser-produced Sn plasma. Using a 1064 nm laser with an intensity of $10^{11}$ W/cm$^2$ and a pulse duration of 10 ns, this enhancement was observed in solid targets with thicknesses up to 100 nm, becoming markedly more pronounced in thinner targets. Notably, the enhancement exceeded 100% for targets up to around 40 nm in thickness, indicating that in this thickness range it is strongly driven by coupling of the front and back interaction regions of the target.

Extrapolating these results to a scenario where long laser pulses are used, we have found that the cumulative EUV output (weighing together contribution from earlier times, when the target is relatively thick, with later times when it is thinner) was amplified by 17% and 10% for initial target thicknesses of 300 nm and 500 nm, respectively. These findings underscore the potential of double-sided illumination as a viable and effective strategy for enhancing the performance of next-generation EUV sources. In particular, this method has the potential to be useful in situations where straightforward scaling up of the energy of an existing front side laser is not feasible.

Taking into account the inherent advantages of solid-state lasers, such as their high wall-plug efficiency and extended penetration depth into the plasma, it becomes evident that this illumination scheme can be judiciously optimized to fully leverage these benefits in practical EUV light sources.

According to an aspect of the invention, there is disclosed a bidirectional Short-Wave Radiation (SWR) generation and collection system that includes:
  a. a light assembly, including at least one light source, the light assembly being configured to: (i) illuminate a first side of an ionization target, thereby ionizing the first side of the ionization target to emit first SWR emission having a first central SWR propagation direction, and (ii) illuminate a second side of the ionization target, thereby ionizing the second side of the ionization target to emit second SWR emission having a second central SWR propagation direction substantially opposing the first central SWR propagation direction; and
  b. an optical assembly configured to: (i) collect by a first optical assembly the first SWR emission that propagates along the first central SWR propagation direction, (ii) collect by a second optical assembly the second SWR emission propagating along the second central SWR propagation direction; and (iii) direct the first SWR emission and the second SWR emission towards at least one optical port.

Optionally, the bidirectional SWR generation and collection system may be implemented such that the optical assembly includes at least one optical component that interacts with the second SWR emission and does not interact with the first SWR emission.

Optionally, the bidirectional SWR generation and collection system may include at least one first optical component selected from a first group of optical components consisting of a multilayer mirror and a grazing incidence collector that is configured to alter the propagation of the first central SWR emission, and at least one second optical component selected from a second group of optical components consisting of a multilayer mirror and a grazing incidence collector that is configured to alter the propagation of the second central SWR emission.

Optionally, the bidirectional SWR generation and collection system may be implemented such that optical assembly is configured to direct the first SWR emission via a first optical port and to direct the second SWR emission via a second optical port which is optically separated from the first optical port.

Optionally, the bidirectional SWR generation and collection system may include a first beamline for transmitting the first SWR emission from the first optical port towards a first auxiliary machine, and a second beamline for transmitting the second SWR emission from the second optical port towards a second auxiliary machine, distinct from the first auxiliary machine.

Optionally, the bidirectional SWR generation and collection system may be implemented such that the optical assembly is configured to combine the first SWR emission and the second SWR emission, and to transmitting the combined SWR emission to a single auxiliary machine.

Optionally, the bidirectional SWR generation and collection system may be implemented such that the first optical assembly includes a multilayer mirror and the second optical assembly includes a grazing incidence collector.

Optionally, the bidirectional SWR generation and collection system may be implemented such that the optical assembly is asymmetrical about the first central SWR propagation direction.

Optionally, the bidirectional SWR generation and collection system may be implemented such that the optical assembly is configured to focus the first SWR emission to a focus located away from the first central SWR propagation direction.

According to an aspect of the invention, there is disclosed a method for bidirectional generation and collection of SWR that includes at least the following steps:
  a. illuminating a first side of an ionization target, thereby ionizing the first side of the ionization target to emit first SWR emission having a first central SWR propagation direction.
  b. illuminating a second side of the ionization target, thereby ionizing the second side of the ionization target to emit second SWR emission having a second central SWR propagation direction substantially opposing the first central SWR propagation direction.
  c. collecting the first SWR emission by a first optical assembly, the collecting including collecting first central SWR emission propagating along the first central SWR propagation direction.
  d. collecting the second SWR emission by a second optical assembly, the collecting including collecting second central SWR emission propagating along the second central SWR propagation direction.
  e. directing the first SWR emission and the second SWR emission towards at least one optical port.

Optionally, the method for bidirectional generation and collection of SWR may be implemented such that the collecting by the second optical assembly includes interacting with the second SWR emission by at least one optical component of the second optical assembly which does not interact with the first SWR emission.

Optionally, the method for bidirectional generation and collection of SWR may be implemented such that the collecting of the first SWR emission including altering the propagation of the first central SWR emission by at least one first optical component selected from a first group of optical components consisting of a multilayer mirror and a grazing incidence collector, and such that the collecting of the second SWR emission including altering the propagation of the second central SWR emission by at least one second optical component selected from a second group of optical components consisting of a multilayer mirror and a grazing incidence collector Optionally, the method for bidirectional generation and collection of SWR may include transmitting the first SWR emission from the first optical port towards a first auxiliary machine, and transmitting the second SWR emission from the second optical port towards a second auxiliary machine, distinct from the first auxiliary machine.

Optionally, the method for bidirectional generation and collection of SWR may include combining the first SWR emission and the second SWR emission, and transmitting the combined SWR emission to a single auxiliary machine.

Optionally, the method for bidirectional generation and collection of SWR may be implemented such that the first optical assembly includes a multilayer mirror and the second optical assembly includes a grazing incidence collector.

Optionally, the method for bidirectional generation and collection of SWR may be implemented such that the collecting of the first SWR is asymmetrical about the first central SWR propagation direction.

Optionally, the method for bidirectional generation and collection of SWR may be implemented such that the collecting includes focusing the first SWR emission to a focus located away from the first central SWR propagation direction.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention. It will be appreciated that the embodiments described above are cited by way of example, and various features thereof and combinations of these features can be varied and modified. While various embodiments have been shown and described, it will be understood that there is no intent to limit the invention by such disclosure, but rather, it is intended to cover all modifications and alternate constructions falling within the scope of the invention, as defined in the appended claims.

What is claimed is:

1. A Short-Wave Radiation (SWR) system, the system comprising:
    a light assembly, comprising at least one light source, the light assembly being configured to:
        illuminate a front side of an ionization target with first illumination; and
        illuminate a back side of the ionization target with second illumination;
    a controller, configured to control the light assembly for illuminating the ionization target from the front side of the ionization target using the first illumination and at least partly concurrently illuminating the ionization target from the back side of the ionization target using the second illumination; and
    an optical assembly configured to collect SWR emitted from the front side of the ionization target and to direct the collected SWR toward a designated beam direction of the SWR system, wherein the SWR emitted from the front side results from a target illumination scheme that comprises at least the first illumination and the second illumination.

2. The SWR system of claim 1, wherein the controller is configured to:
    determine bidirectional illumination parameters, which guarantee that illuminating the ionization target using the bidirectional illumination parameters would keep a velocity component of a preserved part of the ionization target along a central propagation direction of the first illumination under 1 m/s; and
    trigger bidirectional illumination of the ionization target in compliance with the determined bidirectional illumination parameters, thereby maintaining the speed under 1 m/s.

3. The SWR system of claim 1, wherein the controller is configured to control the light assembly to initiate the second illumination at least 1 ns after the initiation of the first illumination.

4. The SWR system of claim 1, wherein the controller is configured to end the second illumination before the end of the first illumination.

5. The SWR system of claim 1, wherein an energy of the second illumination is lower by a ratio of at least 1:2 with respect to an energy of the first illumination.

6. The SWR system of claim 1, wherein the SWR output of the SWR system consists of SWR collected by the optical assembly from the front side of the ionization target.

7. The SWR system of claim 1, wherein the light assembly comprises a first group of at least one light source collectively configured to emit the first illumination, and a second group of at least one light source collectively configured to emit the second illumination, wherein the SWR output of the SWR system consists of SWR collected by the optical assembly from the front side of the ionization target.

8. The SWR system of claim 1, wherein the second illumination increases the amount of SWR emitted from the first side by at least 10%.

9. The SWR system of claim 1, wherein an optical conversion efficiency of SWR generation being a ratio between: (a) the power of SWR collected from the front side by the optical assembly, and (b) the light power of the first illumination may be at least 20% higher when both the front side and the back side of the ionization target are illuminated compared to the when only one side of the ionization target is illuminated.

10. The SWR system of claim 1, wherein a central wavelength of the first illumination is longer than a central wavelength of the second illumination by at least 20%.

11. The SWR system of claim 1, wherein the light assembly comprises a group of at least one gas laser collectively configured to emit the first illumination, and a group of at least one solid-state laser collectively configured to emit the second illumination.

12. The SWR system of claim 1, wherein the controller is further configured to control a front side preliminary illumination and a back side preliminary illumination of the ionization target, prior to the first illumination and the second illumination, in order to modify a shape of the ionization target.

13. The SWR system of claim 1, wherein the first illumination and the second illumination modify a shape of the ionization target, wherein the target illumination scheme further comprises a third illumination controllably irradiated toward the front side, wherein the third illumination ionizes material of the ionization target, resulting in emission of the SWR toward the optical assembly.

14. The SWR system of claim 1, wherein the controller is configured to control the emission of the first illumination and of the second illumination for bidirectional reshaping of the ionization target, and to control emission of a third illumination toward the first side which ionizes material of the ionization target, resulting in emission of the SWR toward the optical assembly.

15. The SWR system of claim 1, wherein a thickness of the ionization target when illuminated by the first illumination and the second illumination meets a thinness criteria ensuring that parts of the ionization target are concurrently heated by both the first illumination and the second illumination.

16. The SWR system of claim 1, wherein a thickness of a preserved part of the ionization target between the first side and the second side along a cross-target axis is less than 250 nm upon beginning of the second illumination.

17. The SWR system of claim 1, wherein the controller is further configured to control spatial alignment of the first illumination and of the second illumination during a concurrent emission of the first illumination and of the second illumination.

18. The SWR system of claim 1, wherein the controller is configured to:
apply bidirectional illumination parameters for minimizing an amount of neutral ejecta ejected from the ionization target, thereby minimizing deterioration of the system; and
trigger bidirectional illumination of the ionization target in compliance with the determined bidirectional illumination timing parameters.

19. The SWR system of claim 1, wherein the optical assembly is further configured to collect backward-emitted SWR emitted from the second side of the ionization target and to direct the collected backward-emitted SWR toward a predefined beam direction of the SWR system.

20. The SWR system of claim 1, further comprising an electromagnetic ion steering module operable to induce electromagnetic forces for steering ions away from the ionization target.

21. A method for generating Short-Wave Radiation (SWR), the method comprising:
illuminating an ionization target according to a target illumination scheme that comprises at least a first illumination of a front side of the ionization target and a second illumination of a back side of the ionization target, thereby inducing emission of SWR radiation from the front side;
collecting the SWR emitted from the front side of the ionization target; and
directing the collected SWR toward a designated beam direction of the SWR system.

22. The method of claim 21, comprising initiating the first illumination, and initiating the second illumination at least 1 ns after the initiation of the first illumination.

23. The method of claim 21, comprising terminating emission of the second illumination at least 1ns before the end of the first illumination.

24. The method of claim 21, comprising outputting SWR emission consisting of SWR collected by the optical assembly from the front side of the ionization target and discarding any SWR radiation emitted from the back side of the ionization target.

25. The method of claim 21, wherein a central wavelength of the first illumination is longer than a central wavelength of the second illumination by at least 20%.

26. The method of claim 21, comprising bidirectionally shaping the ionization target using the first illumination and the second illumination, and ionizing the ionization target after the bidirectional shaping using a third illumination toward the front side, resulting in emission of the SWR toward the optical assembly.

27. The method of claim 21, wherein a thickness of the ionization target when illuminated by the first illumination and the second illumination meets a thinness criteria ensuring that parts of the ionization target are concurrently heated by both the first illumination and the second illumination.

28. The method of claim 21, comprising:
determining bidirectional illumination timing parameters for minimizing an amount of neutral ejecta ejected from the ionization target, thereby minimizing deterioration of the system; and
bidirectionally illuminating the ionization target in compliance with the determined bidirectional illumination timing parameters.

29. The method of claim 21, further comprising applying electromagnetic forces within a vacuum chamber in which the ionization target is ablated, for steering ions away from the ionization target.

30. A non-transitory computer-readable medium for controlling a SWR system, comprising instructions stored thereon, that when executed on a processor, perform the steps of:
determining bidirectional illumination parameters for a bidirectional target illumination scheme, the determining comprising:
determining first illumination parameters for first illumination of a first side of an ionization target, the first illumination parameters comprising at least first timing parameters and first power parameters;
determining second illumination parameters for first illumination a back side of the ionization target, the second illumination parameters comprising at least second timing parameters and second power parameters;
wherein the first illumination parameters and the second illumination parameters dictate different operation settings for the first illumination and for the second illumination in at least one of: illumination start time, illumination end time, illumination duration, power level, and central wavelength; and
triggering illuminations of the ionization target according to the bidirectional target illumination scheme, comprising triggering at least the first illumination and the second illumination, thereby inducing emission of SWR radiation from the front side toward an optical assembly which is configured to collect and direct the SWR radiation toward a designated beam direction of the SWR system.

* * * * *